(12) United States Patent
Uchida et al.

(10) Patent No.: US 7,074,350 B2
(45) Date of Patent: Jul. 11, 2006

(54) BRAZING FILLER METAL

(75) Inventors: Hitoshi Uchida, Kodaira (JP); Junji Satou, Kawagoe (JP)

(73) Assignee: Citizen Watch Co., Ltd., Tokyo (JP)

( * ) Notice: Subject to any disclaimer, the term of this patent is extended or adjusted under 35 U.S.C. 154(b) by 333 days.

(21) Appl. No.: 10/332,982

(22) PCT Filed: Mar. 20, 2002

(86) PCT No.: PCT/JP02/02670

§ 371 (c)(1), (2), (4) Date: Jan. 23, 2003

(87) PCT Pub. No.: WO02/076669

PCT Pub. Date: Oct. 3, 2002

(65) Prior Publication Data

US 2004/0089850 A1 May 13, 2004

(30) Foreign Application Priority Data

| Mar. 23, 2001 | (JP) | ................................ 2001-84205 |
| Sep. 17, 2001 | (JP) | ............................. 2001-280882 |
| Dec. 4, 2001 | (JP) | ............................. 2001-369401 |

(51) Int. Cl.
*H01B 1/02* (2006.01)
*B23K 35/30* (2006.01)
(52) U.S. Cl. ....................... 252/514; 420/511; 106/1.23
(58) Field of Classification Search ................ 252/514; 420/511; 106/1.23
See application file for complete search history.

(56) References Cited

U.S. PATENT DOCUMENTS

| 4,444,719 A | 4/1984 | Sakakibara et al. |
| 4,810,313 A * | 3/1989 | Morales ........................ 148/24 |
| 5,240,172 A | 8/1993 | Steinke et al. |

FOREIGN PATENT DOCUMENTS

| GB | 2279662 | * | 1/1995 |
| GB | 1 469 856 | | 4/1997 |

(Continued)

OTHER PUBLICATIONS

Communication from European Patent Office dated Jun. 4, 2004 in Application No. EP 02 71 3175 enclosing partial European search report.

*Primary Examiner*—Mark Kopec
(74) *Attorney, Agent, or Firm*—Westerman, Hattori, Daniels & Adrian, LLP

(57) ABSTRACT

A brazing filler metal is composed of gold, silver, copper, and an additive element including at least one kind of element out of aluminum, bismuth, gallium, germanium, indium, antimony, silicon, tin, lead, tellurium, and thallium, as main constituents thereof, wherein a total composition ratio of the additive element is in a range of more than 1 wt. % to less than 36 wt. %, and a composition ratio of the gold is less than 80 wt. %, and a composition ratio of the silver is less than 42 wt. %, so that the brazing filler metal joins metals for use as members of which decorativeness in external appearance is required, such as stainless steel and so on, at a low temperature which does not cause the crystal structure thereof to be coarsened, while securing excellent corrosion resistance and sufficient joining strength.

8 Claims, 13 Drawing Sheets

FOREIGN PATENT DOCUMENTS

| | | |
|---|---|---|
| JP | 53-29225 | 3/1978 |
| JP | 57-59039 | 12/1982 |
| JP | 60-59146 | 12/1985 |
| JP | 61-10235 | 3/1986 |
| JP | 62-16751 | 4/1987 |
| JP | 62-212095 | 9/1987 |
| JP | 62-214161 | 9/1987 |
| JP | 01-062296 | 3/1989 |
| JP | 64-66097 | 3/1989 |
| JP | 01-273321 | 11/1989 |
| JP | 2-9558 | 3/1990 |
| JP | 03-138095 | 6/1991 |
| JP | 3-66996 | 10/1991 |
| JP | 4-238691 * | 8/1992 |
| JP | 4-238692 | 8/1992 |
| JP | 7-70671 | 3/1995 |
| JP | 7-70672 | 3/1995 |
| JP | 7-29214 | 4/1995 |
| JP | 7-238333 | 9/1995 |
| JP | 8-49027 | 2/1996 |
| JP | 8-52589 | 2/1996 |
| JP | 8-108267 | 4/1996 |
| JP | 2549387 | 8/1996 |
| JP | 2731434 | 12/1997 |
| JP | 10-96184 | 4/1998 |
| JP | 3150744 | 1/2001 |
| JP | 2001-237279 | 8/2001 |

* cited by examiner

BRAZING FILLER METAL

TECHNICAL FIELD

The invention relates to a brazing filler metal with which brazing having excellent corrosion resistance and sufficient joining strength can be implemented, and in particular, to a brazing filler metal which is suitable for use in brazing of metals of which decorativeness in external appearance is required, such as stainless steel, titanium metal, and titanium alloy, and with which brazing can be implemented at a temperature which does not cause the crystal structure thereof to be coarsened.

BACKGROUND TECHNOLOGY

Brazing has been known for ages as one of metalworking techniques whereby mating metals can be joined with each other with relative ease. Since brazing is among important metalworking techniques of even today, it is applied to a wide variety of industrial sectors, and kinds of brazing filler metal for use in the brazing cover a broad spectrum.

For some kinds of metals and their alloy, however, there has not been found an effective brazing filler metal as yet. Stainless steel is one of such metals. As stainless steel has excellent properties such as less corrosiveness because of high corrosion resistance and high resistance to acid and heat, it is in widespread use in various industrial sectors, and is used even for metallic articles (for example, a wrist watch, the frame of eyeglasses) of which decorativeness in external appearance is required.

By the way, as described in an article titled "Story of Stainless Steel" compiled by Japan Institute Standards Organization (issued by Japan Institute Standards Organization Press), silver solder and nickel solder have been well known as conventional brazing filler metals for use in brazing of members made of stainless steel (referred to hereinafter merely as "stainless steel members").

Silver solder as a brazing filler metal has its own melting point in a range of from about 800 to 1000° C. Examples of a brazing filler metal include a brazing filler metal with which brazing can be executed at a temperature not higher than 800° C., for example, BAg-8 (melting point: 780° C.) according to the JIS specification, which is at times put to use in brazing of the stainless steel members. However, such a brazing filler metal as described is not in much use for brazing in fabrication of metallic articles such as a wrist watch, and the frame of eyeglasses, of which decorativeness in external appearance is required, because the brazing filler metal has poor corrosion resistance and is prone to initiation of corrosion of the stainless steel members after brazing.

Examples of nickel solder include BNi-2 (melting point: 1000° C.) according to the JIS specification. Normally, there occurs no coarsening of the crystal structure in a reducing atmosphere such as hydrogen at about not higher than 800° C. In this case, however, since this brazing filler metal has a high melting point which is higher than 800° C., brazing is executed using this brazing filler metal, thereby causing the crystal structure of the brazed stainless steel members to be coarsened. Accordingly, in the case of brazing the stainless steel members with BNi-2, there is the need for taking steps of removing coarsened portions of the crystal structure thereof by grinding, and so forth, and subsequently applying thereto mirror-finish, and the like. It should be noted that members to be brazed which are objects of brazing are called "base metals" in the following description, which mainly denote stainless steel members in the invention. When stainless steel is used as base metals, the "crystal coarsening temperature of the base metals" in this case is set at 800° C.

On the other hand, a brazing filler metal (melting point: 1000 to 1200° C.) containing Cr, Fe, Si, and Ni as main constituents thereof suitable for stainless steel is disclosed in the Japanese publication of examined patent application No. 61-10235, which discloses that brazing was implemented at 1050 to 1250° C. using the brazing filler metal. This brazing filler metal, however, also has a melting point not lower than the crystal coarsening temperature of the base metals, thus causing the crystal structure of the stainless steel members to be coarsened after brazing.

As a method of joining stainless steel members together, welding is in widespread use besides brazing. Welding has no problem in respect of joining strength and corrosion resistance, however, there emerge spots where the stainless steel members need to be heated locally to a high temperature for implementing joining. As a result, there have emerged spots where a temperature is in excess of the crystal coarsening temperature of the base metals, causing the crystal structure thereof to be coarsened, so that welding has a drawback in that portions of the stainless steel members, worked on by welding, require post-working. Also, there are times when projection welding is applied for joining of stainless steel members whereby welding is executed by causing electric current to flow through projections of the stainless steel members, formed for the purpose of welding. The projection welding, however, has had a drawback in that, if the stainless steel members to be joined with each other are complex in construction, it becomes difficult to cause uniform concentration of electric current on the projections of the stainless steel members, thus resulting in difficulty with welding.

As described in the foregoing, conventional techniques for joining the stainless steel members have not offered any joining techniques capable of securing excellent corrosion resistance and sufficient joining strength, and further, capable of implementing joining at a temperature which does not cause the crystal structure thereof to be coarsened.

The invention has been developed to solve the problems as described above, and it is an object of the invention to provide a brazing filler metal for use in brazing of metals such as stainless steel, used in members of which decorativeness in external appearance is required, wherein brazing can be implemented at a temperature which does not cause the crystal structure thereof to be coarsened while securing excellent corrosion resistance and sufficient joining strength.

DISCLOSURE OF THE INVENTION

A brazing filler metal according to the invention has a composition comprising gold, silver, copper, and an additive element comprising at least one kind of element out of aluminum, bismuth, gallium, germanium, indium, antimony, silicon, tin, lead, tellurium, and thallium, as main constituents thereof, wherein a total composition ratio of the additive element from more than 1 wt. % to less than 36 wt. %, and a composition ratio of the gold is less than 80 wt. %, and a composition ratio of the silver is less than 42 wt. %.

With the above-described brazing filler metal, the total composition ratio of the additive element is preferably in a range of about 2 to about 35 wt. %.

Further, in the above-described brazing filler metal, it is preferable that the composition ratio of the gold is more than 34 wt. %, and the composition ratio of the silver is more than 5 wt. %. The composition ratio of the silver is preferably in a range of about 6 to about 41 wt. %.

Furthermore, it is more preferable that the composition ratio of the gold is in a range of about 47 to about 64 wt. %, and the composition ratio of the silver is in a range of about 6 to about 20 wt. %.

This invention provides a brazing filler metal having a composition comprising gold, silver, copper, and germanium, as main constituents thereof, wherein a composition ratio of the germanium is in a range of more than 4 wt. % to less than 24 wt. %, and a composition ratio of the gold is more than 34 wt. %, and a composition ratio of the silver is less than 41 wt. %.

With this brazing filler metal, the composition ratio of the germanium is preferably in a range of about 5 to about 23 wt. %.

Further, it is preferable that the composition ratio of the gold is in a range of about 35 to about 80 wt. %, the composition ratio of the silver is in a range of about 5 to about 40 wt. %, and the composition ratio of the germanium is in a range of about 10 to about 19 wt. %. Further more, the composition ratio of the silver is preferably in a range of about 6 to about 40 wt. %.

This invention also provides a brazing filler metal having a composition comprising gold, silver, copper, and silicon, as main constituents thereof, wherein a composition ratio of the silicon is in a range of more than 0.9 wt. % to less than 19 wt. %, a composition ratio of the gold is more than 40 wt. %, and a composition ratio of the silver is in a range of more than 4 wt. % to less than 37 wt. %.

With this brazing filler metal, the composition ratio of the silicon is in a range of about 1 to about 18 wt. %. Further, it is preferable that the composition ratio of the gold is in a range of about 41 to about 79 wt. %, and the composition ratio of the silver is in a range of about 5 to about 36 wt. %.

This invention also provides a brazing filler metal having a composition comprising gold, silver, copper, and at least any one kind of element out of germanium, silicon, and tin, as main constituents thereof, wherein a total composition ratio of the germanium, silicon, and tin is in a range of more than 1 wt. % to less than 35 wt. %, a composition ratio of the gold is less than 80 wt. %, and a composition ratio of the silver is less than 42 wt. %.

With this brazing filler metal, the total composition ratio of the germanium, silicon, and tin is preferably in a range of about 2 to about 34 wt. %. Further, it is preferable that the composition ratio of the gold is in a range of about 47 to about 64 wt. %, and the composition ratio of the silver is in a range of about 6 to about 20 wt. %.

This invention also provides a brazing filler metal having a composition comprising gold, silver, copper, palladium, and an additive element comprising at least one kind of element out of aluminum, bismuth, gallium, germanium, indium, antimony, silicon, tin, lead, tellurium, and thallium, as main constituents thereof, wherein a total composition ratio of the additive element is in a range of more than 1 wt. % to less than 38 wt. %, a composition ratio of the gold is less than 82 wt. %, a composition ratio of the palladium is less than 34 wt. %, and a composition ratio of the silver is less than 47 wt. %.

With the above-described brazing filler metal, the composition ratio of the palladium is preferably not more than about 33 wt. %.

Further, in the above-described brazing filler metal, it is preferable that the composition ratio of the gold is more than 33 wt. %, and the composition ratio of the silver is more than 4 wt. %. Furthermore, it is preferable that the composition ratio of the gold is in a range of about 51 to about 56 wt. %, and the composition ratio of the silver is in a range of about 5 to about 20 wt. %.

This invention also provides a brazing filler metal having a composition comprising gold, silver, copper, palladium, a first additive element comprising at least one kind of element out of aluminum, bismuth, gallium, germanium, indium, antimony, silicon, tin, lead, tellurium, and thallium, and a second additive element comprising at least one element out of lithium and manganese, as main constituents thereof, wherein a total composition ratio of the first additive element is in a range of more than 1 wt. % to less than 38 wt. %, a composition ratio of the gold is less than 78 wt. %, a total composition ratio of the second additive element is less than 3 wt. %, a composition ratio of the palladium is less than 32 wt. %, and a composition ratio of the silver is less than 48 wt. %.

With this brazing filler metal, the total composition ratio of the first additive element is preferably in a range of about 2 to about 37 wt. %.

Further, with this brazing filler metal, the composition ratio of the gold is preferably more than 33 wt. %, and the composition ratio of the silver is preferably more than 5 wt. %. Furthermore, it is preferable that the composition ratio of the gold is in a range of about 34 to about 77 wt. %, and the composition ratio of the silver is in a range of about 6 to about 47 wt %.

Further, this invention also provides a brazing filler metal having a composition comprising gold, silver, copper, palladium, nickel, a first additive element comprising at least one kind of element out of aluminum, bismuth, gallium, germanium, indium, antimony, silicon, tin, lead, tellurium, and thallium, and a second additive element comprising at least one element out of lithium and manganese, as main constituents thereof, wherein a total composition ratio of the first additive element is in a range of more than 1 wt. % to less than 35 wt. %, a composition ratio of the gold is less than 74 wt. %, a total composition ratio of the second additive element is less than 3 wt. %, a composition ratio of the palladium is less than 31 wt. %, a composition ratio of the nickel is less than 16 wt. %, and a composition ratio of the silver is less than 47 wt. %.

With this brazing filler metal, the total composition ratio of the first additive element is preferably in a range of about 2 to about 34 wt. %. Further, it is preferable that the composition ratio of the gold is more than 35 wt. %, and the composition ratio of the silver is more than 6 wt. %. Furthermore, it is preferable that the composition ratio of the gold is in a range of about 36 to about 73 wt. %, and the composition ratio of the silver is in a range of about 7 to about 46 wt. %.

Moreover, this invention also provides a brazing filler metal having a composition comprising gold, silver, copper, palladium, and germanium, as main constituents thereof, wherein a composition ratio of the germanium is in a range of more than 4 wt. % to less than 26 wt. %, a composition ratio of the gold is in a range of more than 28 wt. % to less than 76 wt. %, a composition ratio of the palladium is less than 36 wt. %, and a composition ratio of the silver is less than 51 wt. %.

With brazing filler metal, the composition ratio of the germanium is preferably in a range of about 5 to about 25 wt. %. Further, it is preferable that the composition ratio of the gold is in a range of about 29 to about 75 wt. %, and the composition ratio of the silver is in a range of about 5 to about 50 wt. %.

Further, this invention also provides a brazing filler metal having a composition comprising gold, silver, copper, palladium, and silicon, as main constituents thereof, wherein a composition ratio of the silicon is in a range of more than 0.9 wt. % to less than 17 wt. %, a composition ratio of the gold is in a range of more than 30 wt. % to less than 72 wt. %, a composition ratio of the palladium is less than 38 wt. %, and a composition ratio of the silver is in a range of more than 2 wt. % to less than 34 wt. %.

With this brazing filler metal, the composition ratio of the silicon is preferably in a range of about 1 to about 16 wt. %. Further, it is desirable that the composition ratio of the gold is in a range of about 40 to about 71 wt. %, the composition ratio of the silver is in a range of about 3 to about 32 wt. %, and the composition ratio of the palladium is in a range of about 5 to about 37 wt. %.

Furthermore, this invention also provides a brazing filler metal having a composition comprising gold, silver, copper, palladium, and at least any one kind of element out of germanium, silicon, and tin, as main constituents thereof, wherein a total composition ratio of the germanium, silicon, and tin is in a range of more than 1 wt. % to less than 38 wt. %, a composition ratio of the gold is less than 83 wt. %, a composition ratio of the palladium is less than 35 wt. %, and a composition ratio of the silver is less than 49 wt. %.

With this brazing filler metal, the total composition ratio of the germanium, silicon, and tin is preferably in a range of about 2 to about 37 wt. %. Further, it is preferable that the composition ratio of the gold is in a range of about 53 to about 56 wt. %, and the composition ratio of the silver is in a range of about 5 to about 18 wt. %.

Further, this invention is preferably a brazing filler metal having a composition comprising gold, silver, copper, palladium, nickel, and at least any one kind of element out of germanium, silicon, and tin, as main constituents thereof, wherein a total composition ratio of the germanium, silicon, and tin is in a range of more than 1 wt. % to less than 37 wt. %, a composition ratio of the gold is less than 74 wt. %, a composition ratio of the palladium is less than 27 wt. %, a composition ratio of the nickel is less than 18 wt. %, and a composition ratio of the silver is less than 47 wt. %.

Further, the total composition ratio of the germanium, silicon, and tin is preferably in a range of about 2 to about 36 wt. %. It is more desirable that the composition ratio of the gold is in a range of about 52 to about 54 wt. %, and the composition ratio of the silver is in a range of about 5 to about 19 wt. %.

BEST MODE FOR CARRYING OUT THE INVENTION

Figure 1:
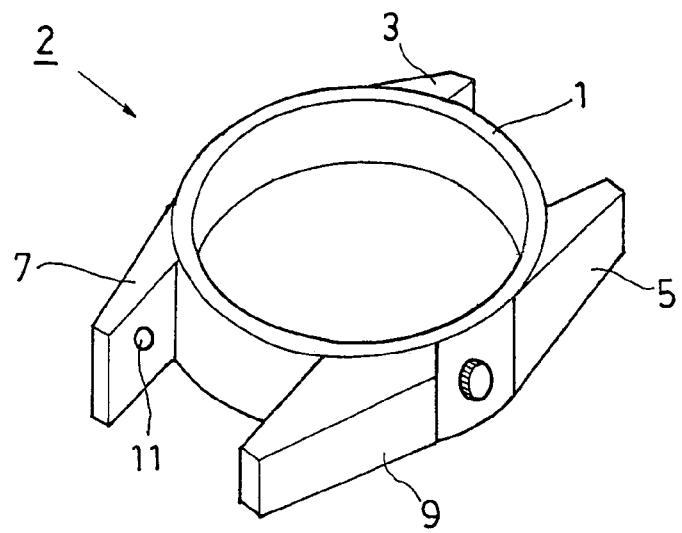
FIG. 1 is a perspective view showing a case fabricated by joining four pieces of watch appearance portions to a case body.

Embodiments of a brazing filler metal according to the invention are described in detail hereinafter with reference to the accompanying drawings.

(First Brazing Filler Metal)

Firstly, a Au—Ag—Cu based brazing filler metal which is a first brazing filler metal according to the invention is described hereinafter. The Au—Ag—Cu based brazing filler metal is composed of, as main constituents, gold (Au), metals having homogeneous solubility with Au, and an additive element composed of elements of metal or semiconductor. As the metals having homogeneous solubility with Au, silver (Ag), and copper (Cu) are used in this embodiment. Besides, as the additive element, at least one kind of element is used which is selected from among aluminum (Al), bismuth (Bi), gallium (Ga), germanium (Ge), indium (In), antimony (Sb), silicon (Si), tin (Sn), lead (Pb), tellurium (Te), and thallium (Tl). The Au—Ag—Cu based brazing filler metal is produced by the following process. The process comprises the steps of firstly weighing respective quantities of Au, Ag, Cu, and the additive element such that composition ratios as desired are obtained, respectively, and producing an alloy by melting the respective metals by means of the vacuum melting process. Subsequently, the alloy is subjected to working into a slender foil-like shape (ribbon-like shape) about 60 μm thick in an argon (Ar) atmosphere.

Now, 12 samples being Examples numbered from 1-1 to 1-12 shown in Table 1 and 8 samples being Comparative Examples numbered from 1-1 to 1-8 shown in Table 2, 20 samples, in total, of different Au—Ag—Cu based brazing filler metals, were prepared by varying a composition ratio (wt. %) of each of Au, Ag, and Cu as appropriate as well as varying the kind and a composition ratio (wt. %) of each of the elements constituting the additive element as appropriate. In this event, the samples were prepared using one kind of element out of Si, Te, and Bi and using two or more kinds of elements out of them as the additive element. The two or more kinds of elements of the additive element are as follows:

Si and In (Examples 1-2, 1-7 to 1-9, and Comparative Examples 1-5 and 1-6

Ge, Al, and Sb (Example 1-3); Ge, In, and Ga (Example 1-4)

Bi, Sn, and Te (Example 1-5)

Pb, Si, and Tl (Example 1-6 and Comparative Example 1-3)

Al, In, and Te (Comparative Example 1-4)

Ge and Sb (Examples 1-10 to 1-12 and Comparative Examples 1-7 and 1-8)

To examine properties of the respective prepared samples, brazing was implemented using as the base metals stainless steel members whose material is set to SUS316L. The selected properties of the respective samples are six items from a) to f) shown in Table 1 and Table 2, that is, a) melting point (° C.), b) brazing temperature (° C.), c) wettability against SUS316L, d) crystal coarsening of SUS316L, e) joining strength (MPa), and f) corrosion resistance. The samples which are considered as suitable brazing filler metals as the object of the invention are set to be Examples and the samples whose properties are compared with those of the respective Examples are set to be Comparative Examples. Note that e) joining strength and f) corrosion resistance are checked by conducting the following tests.

(Joining Strength Tests and Corrosion Resistance Tests of Brazing Filler Metals)

Figure 3:
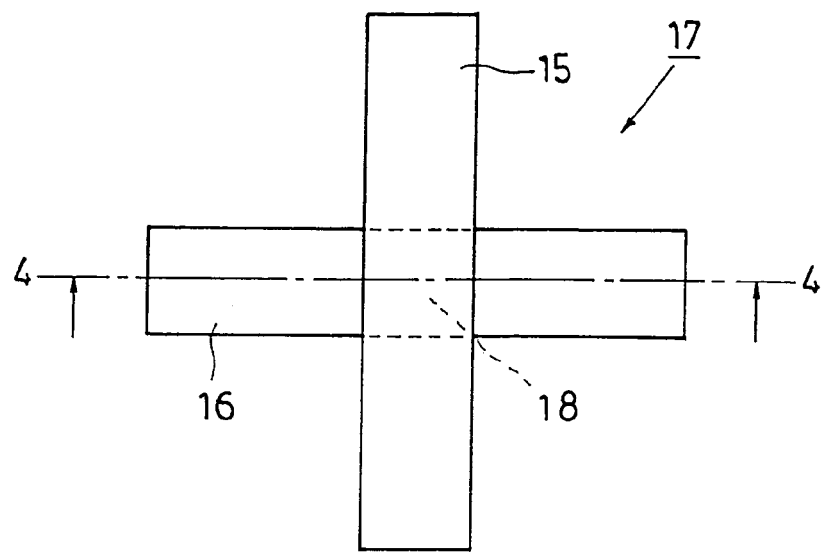
FIG. 3 is a plan view showing a metallic member consisting of two stainless steel sheets, overlapped so as to cross each other.
Figure 4:
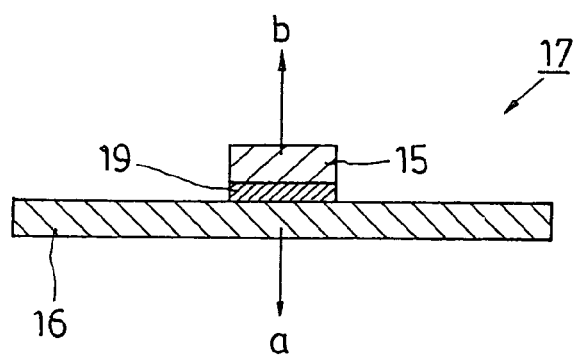
FIG. 4 is a sectional view taken on line 4—4 in FIG. 3.

A metallic member 17 shown in FIG. 3 was produced to conduct the joining strength and corrosion resistance tests of the brazing filler metals thereon. The metallic member 17 is produced as follows: firstly, two stainless steel sheets, 15, 16, each about 25 mm in length×about 5 mm in width×about 1 mm in thickness, are overlapped so as to cross each other, and a brazing filler metal 19 is sandwiched between the two stainless steel sheets 15, 16 at an intersection 18 where the two stainless steel sheets 15, 16 are in contact with each other. As the brazing filler metal 19, each of the above-described 20 samples is used. The intersections 18 were secured with a tool (not shown), and subsequently the two stainless steel sheets 15, 16 were heated at respective brazing temperatures shown in Tables 1 and 2, respectively for ten minutes and then rapidly cooled in a hydrogen reducing atmosphere. Thereby, 20 patterns of the metallic member 17 are prepared using the respective samples.

Joining strength was measured by conducting a tensile test whereby the stainless steel sheets 15, 16 were pulled in the direction of thickness, a and b, respectively, by use of a tool (not shown). Corrosion resistance was checked by conducting the CASS test specified by ISO3370 on the respective Samples of the metallic member 17.

Further, for the sake of comparison, the metallic member 17 were prepared by the previously described procedure, as the brazing filler 19, using nickel solder (82.45 wt. % of Ni, 7 wt. % of Cr, 3 wt. % of B, 4.5 wt. % of Si, 3 wt. % of Fe, and 0.05 wt. % of C) and silver solder (58 wt. % of Ag, 32 wt. % of Cu, and 10 wt. % of Pd) well known as the conventional brazing filler metals and corrosion resistance tests and joining strength tests were conducted thereon. The results of such tests are shown in Table 3. In Table 3, a number affixed to a symbol for the respective metal elements indicates the composition ratio of the respective elements composing the respective brazing filler metals. For example, in the case of Comparative Example 1-10, the composition ratio of Ag is 58 wt. %, that of Cu 32 wt. %, and that of Pd 10 wt. %.

As shown in Table 3, the melting points of the conventional brazing filler metals exceed 800° C. In contrast to these, the melting point of any of the brazing filler metals of Examples 1-1 to 1-12 was not higher than 800° C. as shown in Table 1, and the brazing temperatures for these were also not higher than 800° C. The melting points of the brazing filler metals of Comparative Examples 1-1 to 1-4 and 1-6, however, exceeded 800° C. as shown in Table 2, and their brazing temperatures also exceeded 800° C. (when the melting point exceeded 800° C., crystal of SUS316L was caused to be coarsened in any of the samples). Regarding the wettability against SUS316L, while all of the samples of Examples 1-1 to 1-12 provided excellent results, the samples of Comparative Examples 1-1 to 1-7 provided just slightly good results which were not sufficient. Besides, coarsening of crystal structure of SUS316L occurred in any of the conventional brazing filler metals (Comparative Examples 1-9 and 1-10) and also in Comparative Examples 1-1 to 1-4 and 1-6. In contrast to this, coarsening of crystal structure was not seen in any of Examples 1-1 to 1-12. The joining strengths of Examples were 590 MPa even at the minimum, and any of them was better than those of the conventional brazing filler metals. Regarding the corrosion resistance, Examples 1-1 to 1-12 and Comparative Examples other than Comparative Example 1-8 exhibited excellent results.

It can be said on the basis of the results shown in Table 1 to Table 3 that the composition ratios of the respective metal elements, that is, Au, Ag, and Cu, and the kind of additive element and the composition ratio thereof, necessary for the respective Au—Ag—Cu based brazing filler metals to conform to the brazing filler metal as the object of the invention are as follows:

Firstly, to conform to the brazing filler metal as the object of the invention, each of the Au—Ag—Cu based brazing filler metals needs to have a melting point below the crystal coarsening temperature of the base metals and be able to join the base metals at a low temperature (referred to hereinafter as low temperature joining) which does not cause the crystal structure of the base metals to be coarsened. When stainless steel members are set as the base metals, the crystal coarsening temperature thereof is set to 800° C., so that the melting point of the brazing filler metal should be not higher than 800° C. (this condition is regarded as "Condition A").

While the respective samples of Examples 1-1 to 1-12 satisfy Condition A, the samples of Comparative Examples 1-1 to 1-4 and 1-6 do not satisfy Condition A. Since Comparative Examples 1-1 to 1-4 and 1-6 and Examples 1-1 to 1-12 have common ranges of respective composition ratios of Au, Ag, and Cu, it is difficult to specify Condition A based only on the respective composition ratios of Au, Ag, and Cu.

On the other hand, when the total composition ratio of the additive element is no more than 1 wt. % and when it reaches 36 wt. % as in Comparative Examples 1-1 to 1-4, the melting points exceed 800° C., so that the samples thereof do not satisfy Condition A. However, any of samples satisfying Condition A as shown in Example 1-1 to 1-12 has a total composition ratio of the additive element which is in a range of more than 1 wt. % to less than 36 wt. %. Therefore, to satisfy Condition A, the total composition ratio of the additive element needs to be in a range of more than 1 wt. % to less than 36 wt. %. In this point of view, it can be said, particularly on the basis of values shown in Examples 1-1 to 1-12, that the total composition ratio of the additive element is preferably in a range of about 2 to about 35 wt. %. Further, even if the total composition ratio of the additive element is within this range, when the composition ratio of Au reaches 80 wt. % as shown in Comparative Example 16, the melting point exceeds 800° C., so that the sample does not satisfy Condition A. In contrast to this, when the composition ratio of Au is less than 80 wt. % as shown in Examples 1-1 to 1-12, any of the samples satisfies Condition A. Accordingly, in order to satisfy Condition A, the composition ratio of Au is only required to be less than 80 wt. %, and is preferably not more than about 79 wt. %.

Secondly, to conform to the brazing filler metal as the object of the invention, each of the Au—Ag—Cu based brazing filler metals needs to have an excellent corrosion resistance (this condition is regarded as "Condition B"). In the respective samples in Table 1 and Table 2, only the sample of Comparative Example 1-8 is insufficient and the other samples are excellent in corrosion resistance. The sample shown in Comparative Example 1-8 has a composition ratio of Ag at 42 wt. %, and any of the other samples has a composition ratio of Ag of less than 42 wt. %. Accordingly, Condition B is satisfied when the composition ratio of Ag is less than 42 wt. %.

Thirdly, to conform to the brazing filler metal as the object of the invention, each of the Au—Ag—Cu based brazing filler metals needs to secure a sufficient joining strength (this condition is regarded as "Condition C"). In Table 1 and Table 2, the samples satisfying both the aforementioned Conditions A and B have joining strengths of 590 MPa even at the minimum, and any of them exhibited a value better than those of the conventional brazing filler metals (Comparative Examples 1-9 and 1-10). Accordingly, any of the samples satisfying both the aforementioned Conditions A and B satisfies Condition C.

Further, in both cases where the composition ratio of Au is 34 wt. % as shown in Comparative Example 1-5 and where the composition ratio of Ag is 5 wt. % as shown in Comparative Example 1-7, the wettability is insufficient against stainless steel. Therefore, even when the aforementioned Conditions A and B are satisfied, it is preferable that the composition ratio of Au is more than 34 wt. %, and the composition ratio of Ag is more than 5 wt. %. Besides, even when the composition ratio of Ag is more than 5 wt. %, particularly when the composition ratio of Ag is in a range of about 6 to about 41 wt. %, the color of the brazing filler metal increases in grade of silver gray of Ag to be closer to the color of stainless steel. As a result, when the stainless steel members are joined together using the brazing filler metal, a portion thereof joined by the brazing can be made less conspicuous, so that the brazing filler metal is preferable to join members of which decorativeness in external appearance is required (for, example, a later-described case).

In consideration that the samples of Examples 1-10 and 1-11 are particularly excellent in wettability against stainless steel, it is preferable that the samples have a composition ratio of Au and a composition ratio of Ag satisfying the following conditions, in addition to the aforementioned conditions.

The composition ratio of Au is in a range of about 47 to about 64 wt. %.

The composition ratio of Ag is in a range of about 6 to about 20 wt. %.

When the composition ratio of Ag is in a range of 6 to about 20 wt. %, a brazing filler metal was provided which has such a good wettability against stainless steel to spread particularly extensively on the surface thereof.

As described in the foregoing, the Au—Ag—Cu based brazing filler metal is suited for low temperature joining, provided that the composition ratio of the additive element and the composition ratio of Au fall within the ranges satisfying Condition A, and the composition ratio of Ag falls within the range satisfying Condition B, and thus can join base metals without causing crystal structure thereof to be coarsened. In this case, the face condition of the stainless steel members, prior to joining, is maintained, so that the Au—Ag—Cu based brazing filler metal is more preferable than the conventional brazing filler metals (nickel based brazing filler metal and silver based brazing filler metal). Further, excellent corrosion resistance is secured, and joining strength is better than those of the conventional brazing filler metals to provide sufficient joining strength. Consequently, when satisfying these conditions, the Au—Ag—Cu based brazing filler becomes a brazing filler metal satisfying all of three requirements, that is, enabling low temperature joining and securing excellent corrosion resistance and sufficient joining strength. This brazing filler metal becomes a preferable brazing filler metal for fabricating a stainless steel member (for example, a later-described case 2) by brazing. Furthermore, provided that both Au and Ag satisfy the aforementioned conditions, this brazing filler metal becomes a more preferable brazing filler metal having further improved wettability against stainless steel.

Figure 6:
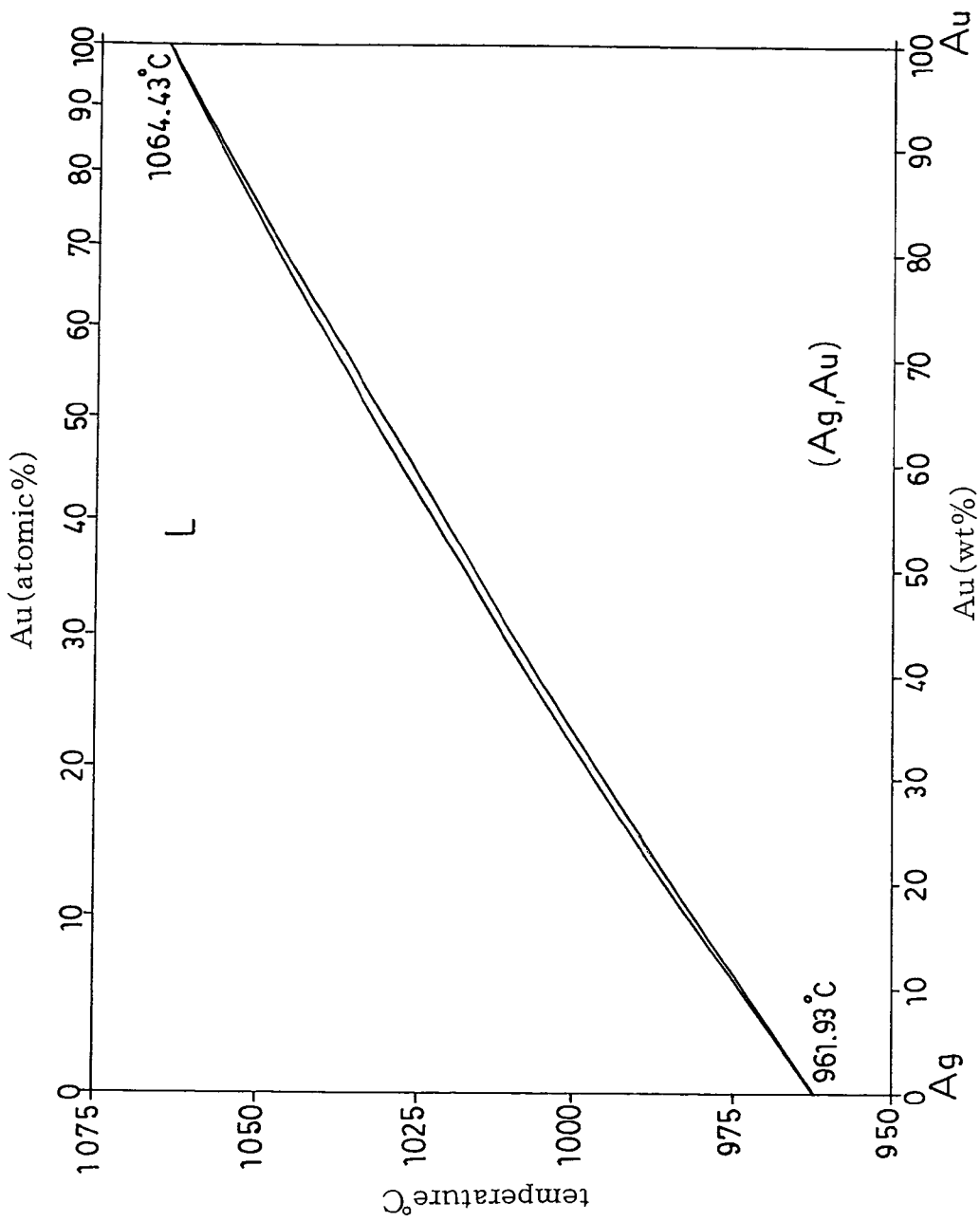
FIG. 6 is a phase diagram of a binary system of Ag—Au, the horizontal axis thereof showing a composition ratio of Au to Ag while the vertical axis thereof showing a melting point.

Next, the reason why the Au—Ag—Cu based brazing filler metal composed of those metal elements at respective specified ratios as described above can conform to the brazing filler metal as the object of the invention is described in detail hereinafter with reference to phase diagrams of binary systems of alloys, shown in FIGS. 6 to 11, respectively. FIG. 6 is a phase diagram of a binary system of Ag—Au, the horizontal axis thereof showing a composition ratio of Au to Ag while the vertical axis thereof showing a melting point, FIG. 7 a phase diagram of a binary system of Cu—Au, the horizontal axis thereof showing a composition ratio of Au to Cu while the vertical axis thereof showing a melting point, and FIG. 8 a phase diagram of a binary system of Ag—Cu, the horizontal axis thereof showing a composition ratio of Cu to Ag while the vertical axis thereof showing a melting point. FIG. 9 is a phase diagram of a binary system of Au—Ge, the horizontal axis thereof showing a composition ratio of Ge to Au while the vertical axis thereof showing a melting point, FIG. 10 a phase diagram of a binary system of Au—Si, the horizontal axis thereof showing a composition ratio of Si to Au while the vertical axis thereof showing a melting point, and FIG. 11 a phase diagram of a binary system of Au—Sn, the horizontal axis thereof showing a composition ratio of Sn to Au while the vertical axis thereof showing a melting point. Detailed description on each of the phase diagrams is stated in detail, respectively, in Literature 1 given below.

Literature 1: "Binary Alloy Phase Diagrams", Vol. 1, Vol. 2, American Society for Metals, Metals Park, Ohio 44073

As shown in FIG. 6, in the case of a Ag—Au alloy, its melting point is gradually lowered from about 1064° C. according as the composition ratio of Au is decreased. Upon the composition ratio of Au reaching 0, the melting point reaches the lowest temperature of about 961° C.

Figure 7:
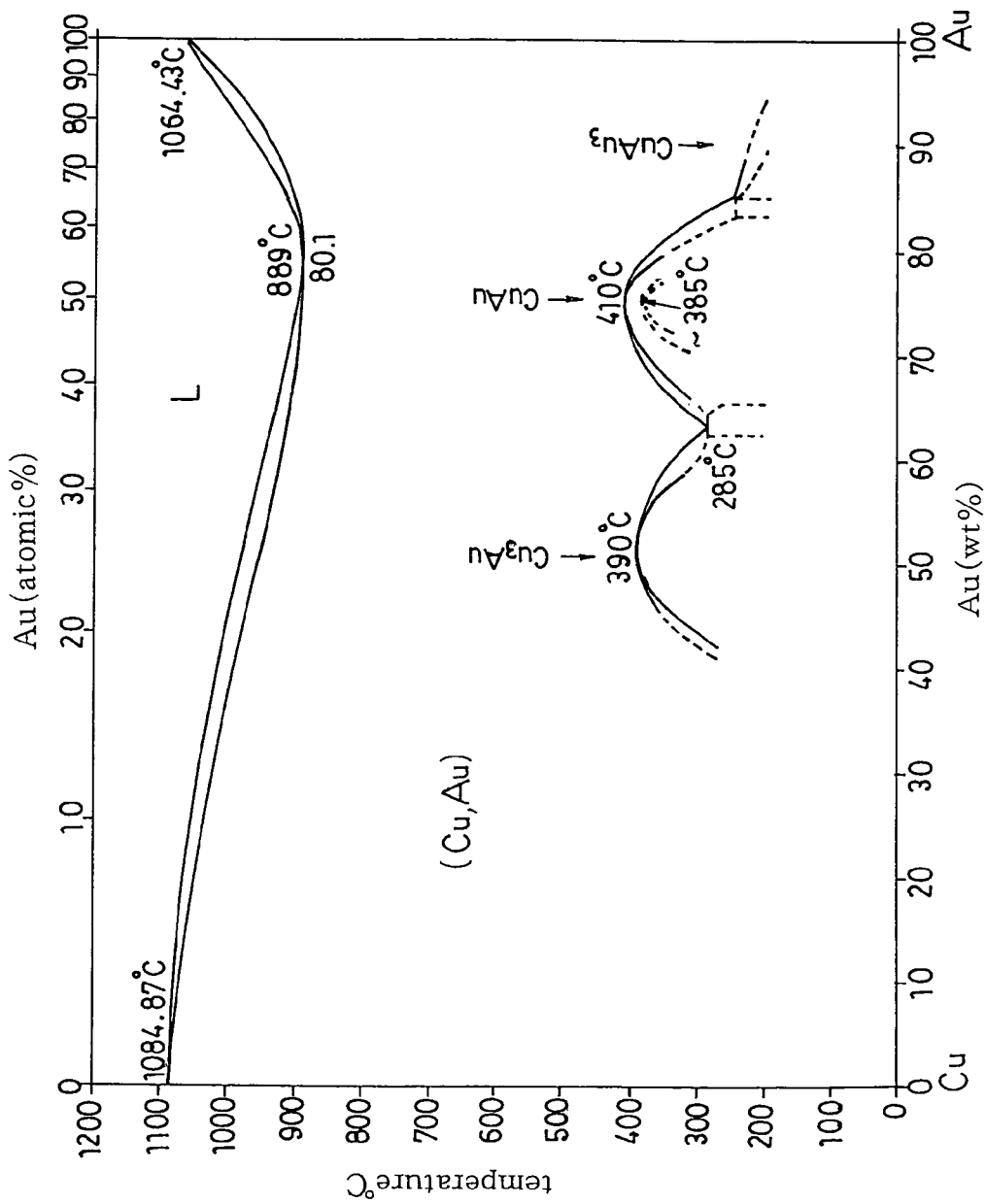
FIG. 7 is a phase diagram of a binary system of Cu—Au, the horizontal axis thereof showing a composition ratio of Au to Cu while the vertical axis thereof showing a melting point.

As shown in FIG. 7, in the case of a Cu—Au alloy, its melting point is gradually lowered from about 1064° C. according as the composition ratio of Au is decreased. Upon the composition ratio of Au reaching about 80 wt. %, the melting point reaches the lowest temperature of about 889° C. and then rises up to about 1084° C. upon the composition ratio of Au reaching 0.

Figure 8:
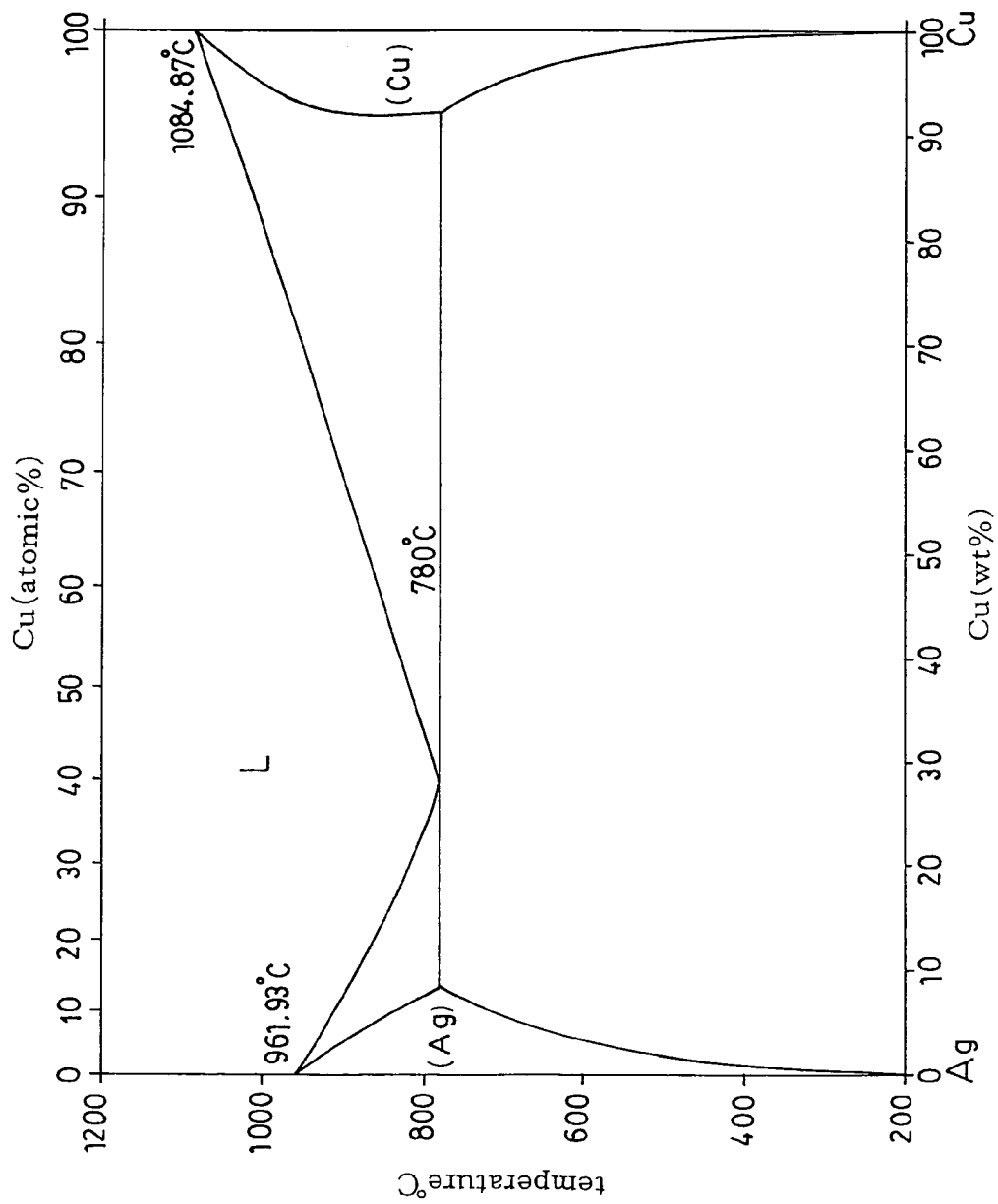
FIG. 8 is a phase diagram of a binary system of Ag—Cu, the horizontal axis thereof showing a composition ratio of Cu to Ag while the vertical axis thereof showing a melting point.
Figure 9:
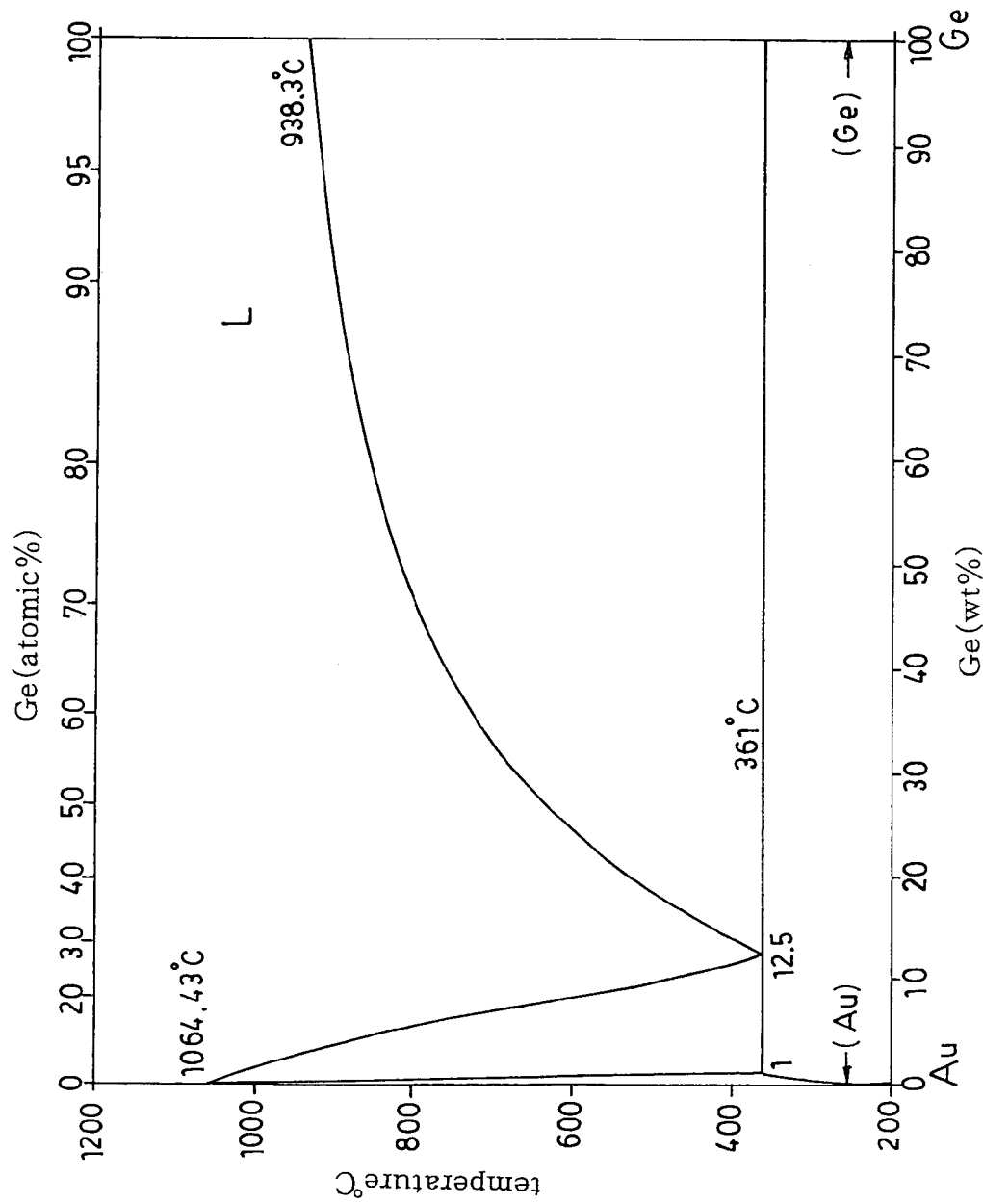
FIG. 9 is a phase diagram of a binary system of Au—Ge, the horizontal axis thereof showing a composition ratio of Ge to Au while the vertical axis thereof showing a melting point.

As shown in FIG. 8, in the case of a Ag—Cu alloy, its melting point is gradually lowered from about 1084° C. according as the composition ratio of Cu is decreased. Upon the composition ratio of Cu reaching about 28 wt. % (the composition ratio of Ag reaching about 72 wt. %), the melting point reaches the lowest temperature of about 780° C. In this event, there occurs a eutectic composition of the Ag—Cu alloy with a melting point being drastically lowered. A state of such a eutectic composition is designated as a eutectic of Ag—Cu.

In the Au—Ag—Cu based brazing filler metal, the additive element is added to Au, Ag, and Cu. Each element of the additive element has a eutectic point that when the composition ratio of the element to Au reaches a certain value, the melting point of an alloy formed with Au is drastically lowered. This eutectic point is referred hereafter to as a eutectic of additive element (the additive element (for example, Ge) might form a eutectic composition with Ag).

Figure 10:
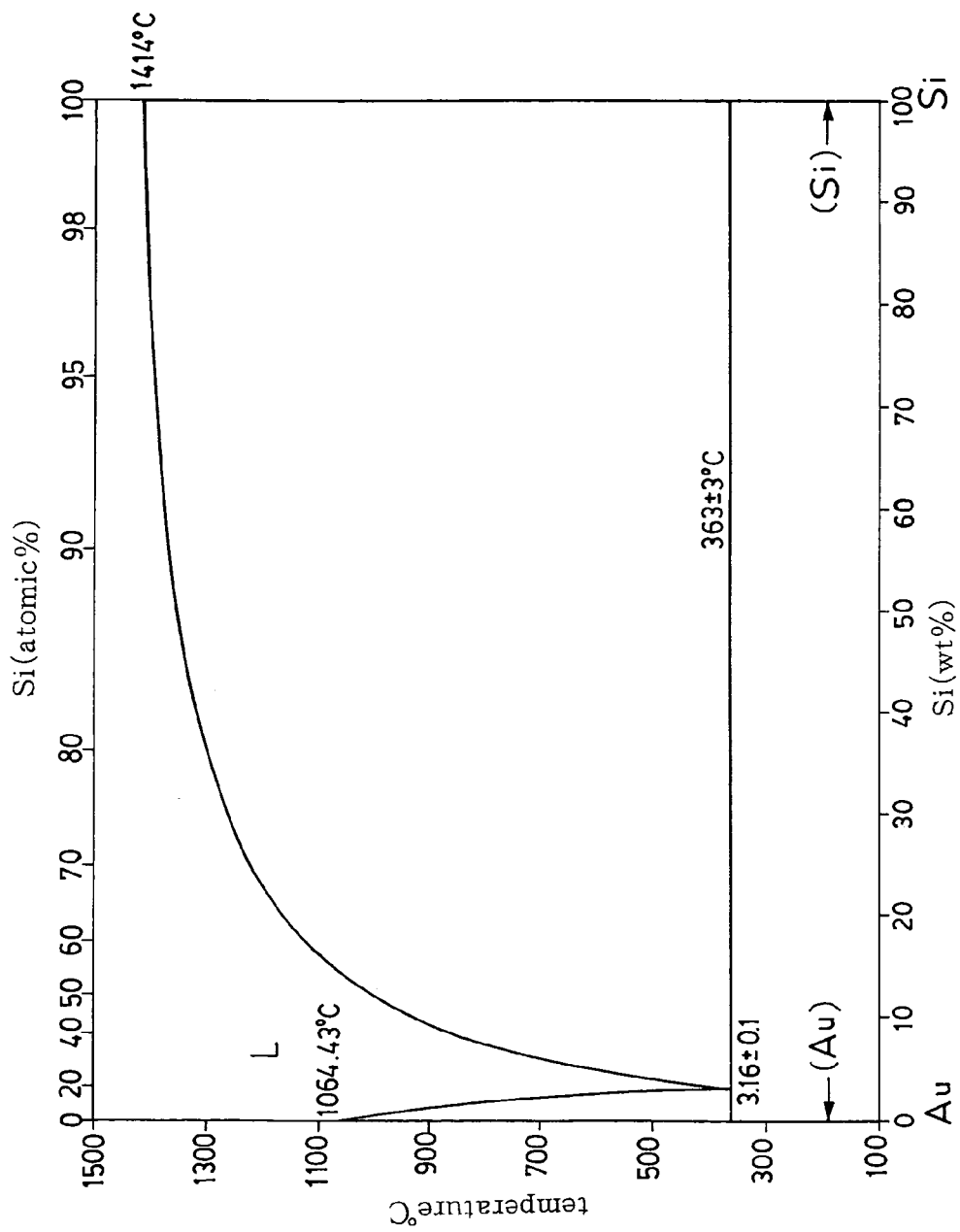
FIG. 10 is a phase diagram of a binary system of Au—Si, the horizontal axis thereof showing a composition ratio of Si to Au while the vertical axis thereof showing a melting point.
Figure 11:
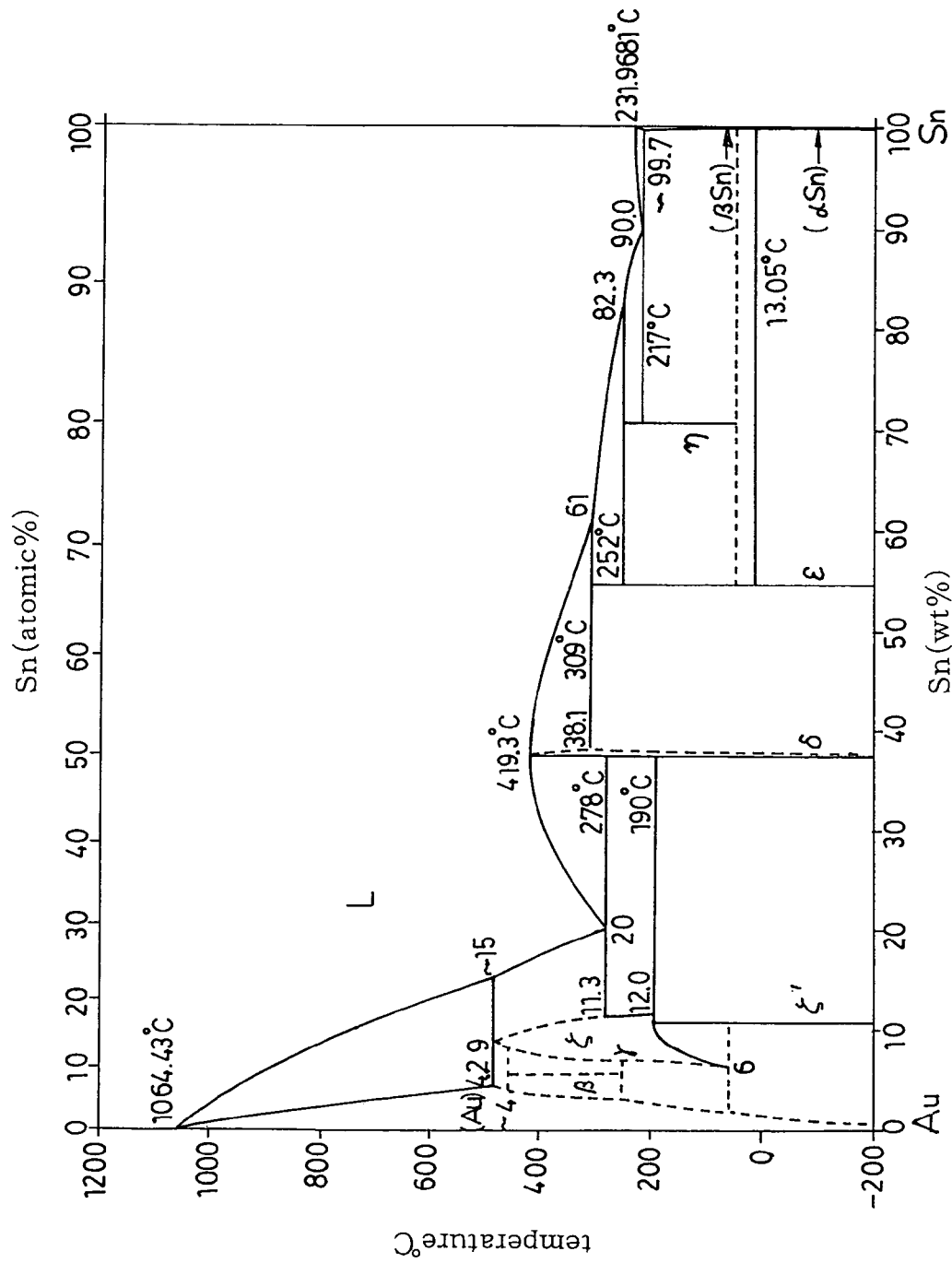
FIG. 11 is a phase diagram of a binary system of Au—Sn, the horizontal axis thereof showing a composition ratio of Sn to Au while the vertical axis thereof showing a melting point.

The eutectic of additive element is described in detail, taking three cases of Au—Ge, Au—Si, and Au—Sn as examples, with reference to the phase diagrams of binary systems of alloys shown in FIGS. 9 to 11.

As shown in FIG. 9, in the case of a Au—Ge alloy, its melting point is gradually lowered from about 938° C. according as the composition ratio of Ge is decreased. Upon the composition ratio of Ge reaching about 12.5 wt. % (with the composition ratio of Au reaching about 87.5 wt. %), the melting point reaches the lowest temperature of about 361° C. and then rises up to about 1064° C. The Au—Ge alloy forms a composition forming eutectic (eutectic composition) upon this state where the melting point is at the lowest. A state of such a eutectic composition is designated as a eutectic of Au—Ge.

As shown in FIG. 10, in the case of a Au—Si alloy, its melting point is gradually lowered from about 1414° C. according as the composition ratio of Si is decreased. Upon the composition ratio of Si reaching about 3.2 wt. % (with the composition ratio of Au reaching about 96.8 wt. %), the melting point reaches the lowest temperature of about 363° C. and then rises up to about 1064° C. The Au—Si alloy forms a eutectic composition upon this state where the melting point is at the lowest. A state of such a eutectic composition is designated as a eutectic of Au—Si.

As shown in FIG. 11, in the case of a Au—Sn alloy, its melting point is gradually lowered from about 1064° C. according as the composition ratio of Sn is increased. Upon the composition ratio of Sn reaching about 20 wt. % (with the composition ratio of Au reaching about 80 wt. %), the melting point is lowered to about 278° C., then rises up to about 419° C., and is lowered again. The Au—Sn alloy forms a eutectic composition when the melting point is lowered to about 278° C. A state of such a eutectic composition is designated as a eutectic of Au—Sn.

As any of the three Au—Ge, Au—Si, and Au—Sn alloys forms a eutectic composition with its melting point being drastically lowered, each of the alloys of Au and the additive element has the property of the melting point thereof being drastically lowered due to the formation of the eutectic composition. In view of the above fact, it is reasoned that the Au—Ag—Cu based brazing filler metal is able to conform to the brazing filler metal as the object of the invention, in the case of a specific composition wherein the above-described eutectic of Ag—Cu and the eutectic of the additive element can be utilized. Each of Ag and Cu is, however, a metal having homogeneous solubility with Au and is in effect substituted for Au. Therefore, addition of Ag and Cu at improper ratios may result in deviation of the composition ratios of Au and the additive element, respectively, from those required for the eutectic composition. As a result, a decrease in melting point due to the eutectic of the additive element is no longer expected and occurrence of uniform solid solution becomes also difficult.

From the viewpoints described above, the respective composition ratios of Au, Ag, and Cu, and the additive element, composing the Au—Ag—Cu based brazing filler metal, have respective ranges required for obtaining the brazing filler metal as the object of the invention, and it is reasoned that the respective composition ratios fall within the respective ranges found from the results of the tests.

To sum up, the Au—Ag—Cu based brazing filler metal according to the invention is turned into a brazing filler metal which is capable of low temperature joining and is excellent both in joining strength and corrosion resistance, utilizing the eutectic of Ag—Cu as well as the eutectic of Au and the additive element, provided that the same satisfies all of the following conditions 1) to 3). In this case, coarsening of the crystal structure of stainless steel members being the base metals is not caused but the surface condition thereof, prior to joining, is maintained, so that the stainless steel members can be joined together without loss of the decorativeness of the external appearance.

Condition 1) The total composition ratio of at least one kind of element of the additive element is in a range of more than 1 wt. % to less than 36 wt. %.

Condition 2) The composition ratio of Au is less than 80 wt. %.

Condition 3) The composition ratio of Ag is less than 42 wt. %.

Further, the Au—Ag—Cu based brazing filler metal even with the above composition is improved in wettability against stainless steel, provided that the same satisfies the following Condition 4).

Condition 4) The composition ratio of Au is more than 34 wt. %, and the composition ratio of Ag is more than 5 wt. %.

The Au—Ag—Cu based brazing filler metal has a color which is increased in the degree of silver gray of Ag to be closer to the color of stainless steel, provided that the same further satisfies the following Condition 5) in addition to the above conditions.

Condition 5) The composition ratio of Ag is in a range of about 6 to about 41 wt. %.

Furthermore, the Au—Ag—Cu based brazing filler metal can be further improved in wettability against stainless steel, provided that the same satisfies the following Conditions 6) and 7).

Condition 6) The composition ratio of Au is in a range of about 47 to about 64 wt. %.

Condition 7) The composition ratio of Ag is in a range of about 6 to about 20 wt. %.

(Second Brazing Filler Metal)

Subsequently, a Au—Ag—Cu—Ge based brazing filler metal which is a second brazing filler metal according to the invention is described hereinafter. This brazing filler metal is composed of, as main constituents, four kinds of elements Au, Ag, Cu, and Ge, and is thus produced by limiting the above-described additive element of the first brazing filler metal only to one kind of element Ge. This brazing filler metal is different in element but is produced by the same method as that of the first brazing filler metal.

Ten samples being Examples numbered from 2-1 to 2-10 and 7 samples being Comparative Examples numbered from 2-1 to 2-7 shown in Table 4, 17 samples, in total, of different Au—Ag—Cu—Ge based brazing filler metals, were prepared by varying a composition ratio (wt. %) of each of Au, Ag, Cu, and Ge as appropriate. To examine properties of the respective prepared samples, brazing was implemented using as the base metals stainless steel members whose material is set to SUS316L. The respective samples were examined on the two items, a) melting point and c) wettability against SUS316L. The four samples of Examples 2-8 and 2-9 and Comparative Examples 2-6 and 2-7 were examined on the other four items, b) brazing temperature, d) crystal coarsening of SUS316L, e) joining strength, and f) corrosion resistance. The results thereof are shown in Table 5. It should be noted that the indication of "Example" and "Comparative Example" is the same as that of the first brazing filler metal. The e) joining strength and f) corrosion resistance are checked in the same manner as that of the first brazing filler metal.

As shown in Table 4, the melting points of the samples of Examples 2-1 to 2-10 are 780° C. (Example 2-4) even at the maximum, and the melting point of any of the samples is thus not higher than 800° C. The melting points of the samples of Comparative Examples 2-1 to 2-3, however, exceed 800° C. Regarding the wettability against SUS316L, while all of the samples of Examples 2-1 to 2-10 provided excellent results, the samples of Comparative Examples 2-1 to 2-5 and Comparative Example 2-7 other than Comparative Example 2-6 provided just slightly good results which were not sufficient. Besides, as shown in Table 5, while the brazing temperature for the sample of Comparative Example 2-7 exceeded 800° C., that for any of the other samples was lower than 800° C. Crystal coarsening of SUS316L occurred in the sample of Comparative Example 2-7, and not in the other samples. The joining strengths of the samples were 840 MPa even at the minimum, and any of them was better than those of the conventional brazing filler metals. Regarding the corrosion resistance, any of the samples other than Comparative Example 2-6 exhibited an excellent result.

The Au—Ag—Cu—Ge based brazing filler metal also needs to satisfy, similarly to the first brazing filler metal, the above-described three conditions A, B and C, and, from the results shown in Tables 4 and 5, the conditions for satisfaction are as follows:

Condition A)

Since Comparative Examples 2-1 to 2-3 and Examples 2-1 to 2-10 have common ranges of respective composition ratios of Ag and Cu, it is difficult to specify Condition A based only on the respective composition ratios of Ag and Cu.

Next, when the composition ratio of Ge is no more than 4 wt. % and when it reaches 24 wt. % as shown in Comparative Examples 2-1 to 2-3, the melting points exceed 800° C., so that the samples thereof do not satisfy Condition A. However, any of samples satisfying Condition A as shown in Example 2-1 to 2-10 has a composition ratio of Ge which is in a range of more than 4 wt. % to less than 24 wt. %. Therefore, to satisfy Condition A, the composition ratio of Ge needs to be in a range of more than 4 wt. % to less than 24 wt. %. In this point of view, it can be said, particularly on the basis of values shown in Examples 2-1 to 2-10, that the composition ratio of Ge is preferably in a range of about 5 to about 23 wt. %. However, even if the composition ratio of Ge is within this range, when the composition ratio of Au reaches 34 wt. % as shown in Comparative Example 2-3, the melting point exceeds 800° C., so that the sample does not satisfy Condition A. In contrast to this, when the composition ratio of Au is more than 34 wt. % as shown in Examples 2-1 to 2-10, the melting points become lower than 800° C., and thus the samples satisfy Condition A. Accordingly, in order to satisfy Condition A, the composition ratio of Au is only required to be more than 34 wt. %, and is preferably not less than about 35 wt. %.

Condition B)

Only the sample of Comparative Example 2-6 is insufficient and the other samples are excellent in corrosion resistance. The sample shown in Comparative Example 2-6 has a composition ratio of Ag at 41 wt. %, and the other samples have composition ratios of Ag at less than 41 wt. %. Accordingly, Condition B is satisfied when the composition ratio of Ag is less than 41 wt. %.

Condition C)

The samples satisfying both the aforementioned Conditions A and B have joining strengths of 880 MPa even at the minimum, and any of them exhibited a value better than those of the conventional brazing filler metals. Accordingly, the samples satisfying both the aforementioned Conditions A and B satisfy Condition C.

Further, even the samples satisfying Conditions A and B are particularly improved in wettability against stainless steel, provided that the same satisfy all of the following conditions as in Examples 2-4 to 2-10.

The composition ratio of Au is in a range of about 35 to about 80 wt. %.

The composition ratio of Ag is in a range of about 5 to about 40 wt. %.

The composition ratio of Ge is in a range of about 10 to about 19 wt. %.

Particularly when the composition ratio of Ag is in a range of about 6 to about 40 wt. %, the color of the brazing filler metal becomes closer to silver gray, so that a portion of stainless steel members joined by the brazing can be made less conspicuous.

As described in the foregoing, the Au—Ag—Cu—Ge based brazing filler metal becomes a brazing filler metal satisfying all of the three requirements, that is, enabling low temperature joining and securing excellent corrosion resistance and sufficient joining strength, provided that the composition ratios of Ge and Au respectively fall within the aforementioned ranges satisfying Condition A, and the composition ratio of Ag falls within the aforementioned range satisfying Condition B. Furthermore, provided that the composition ratios of Au, Ag, and Ge are respectively within the above-described ranges for excellent wettability against stainless steel, the Au—Ag—Cu—Ge based brazing filler metal is improved in wettability against stainless steel. In this case, the brazing filler metal spreads extensively on the surfaces of the stainless steel members, thus facilitating the joining work, and, as a result, the brazing filler metal becomes more preferable.

Next, the reason why the Au—Ag—Cu—Ge based brazing filler metal composed of those metal elements at respective specified ratios as described above can conform to the brazing filler metal as the object of the invention is described in detail hereinafter with reference to phase diagrams of binary systems of alloys, shown in FIGS. 12 and 13, respectively with the above-described FIGS. 8 and 9.

Figure 12:
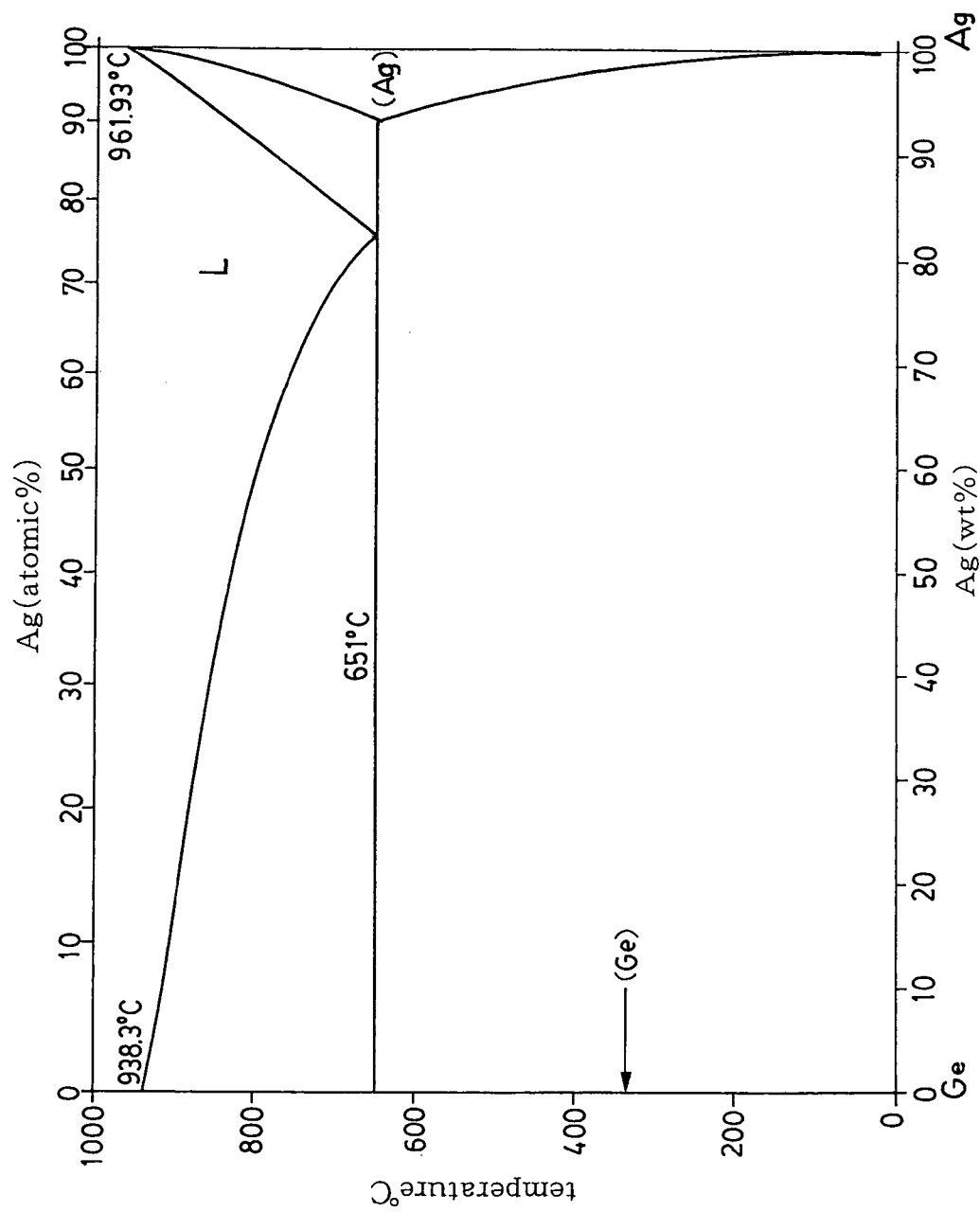
FIG. 12 is a phase diagram of a binary system of Ag—Ge, the horizontal axis thereof showing a composition ratio of Ag to Ge while the vertical axis thereof showing a melting point.
Figure 13:
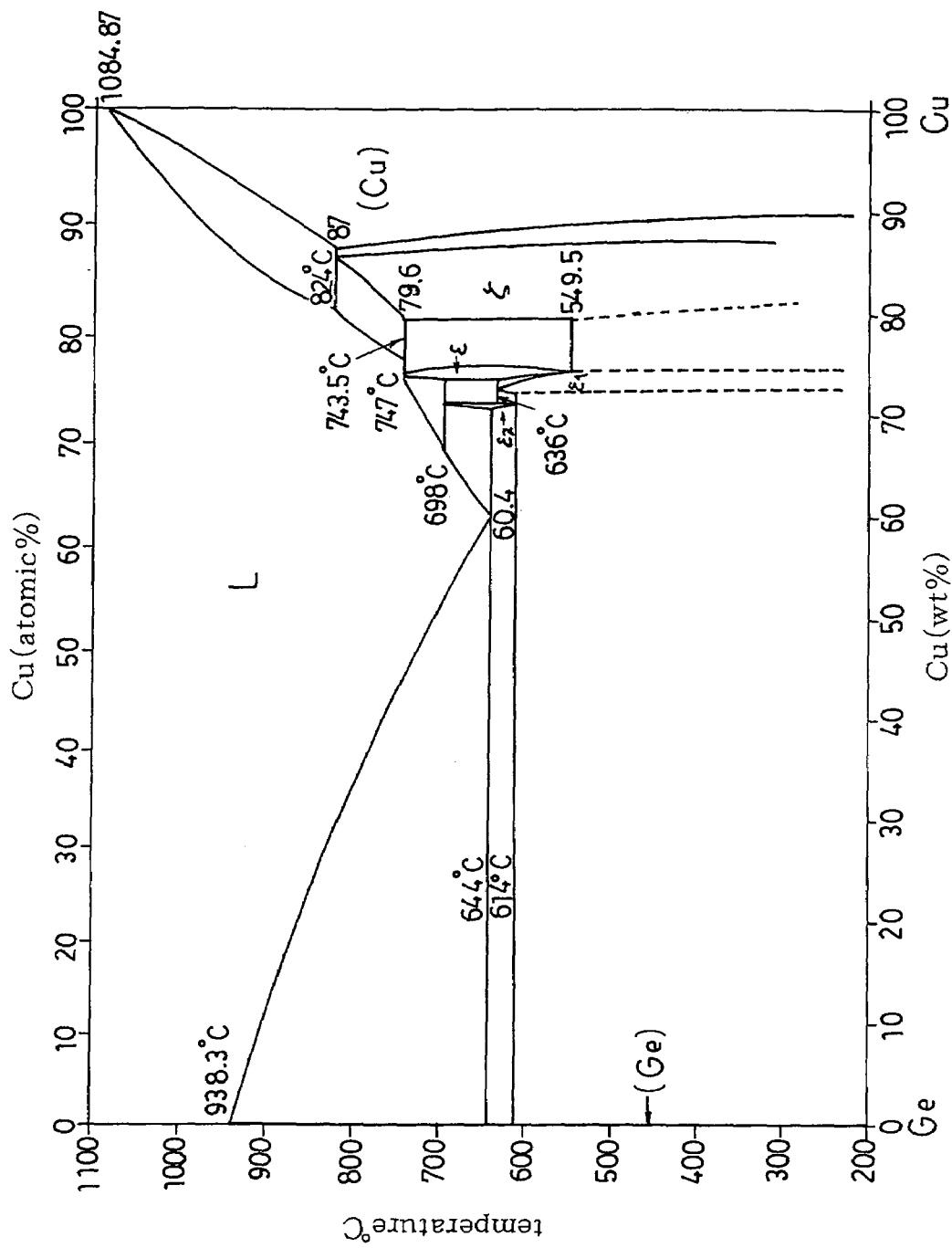
FIG. 13 is a phase diagram of a binary system of Cu—Ge, the horizontal axis thereof showing a composition ratio of Cu to Ge while the vertical axis thereof showing a melting point.

FIG. 12 is a phase diagram of a binary system of Ag—Ge, the horizontal axis thereof showing a composition ratio of Ag to Ge while the vertical axis thereof showing a melting point, FIG. 13 a phase diagram of a binary system of Cu—Ge, the horizontal axis thereof showing a composition ratio of Cu to Ge while the vertical axis thereof showing a melting point, and detailed description on each of the phase diagrams is stated, respectively, in the foregoing Literature 1.

As shown in FIG. 12, in the case of a Ag—Ge alloy, its melting point is gradually lowered from about 938° C. according as the composition ratio of Ag is increased. Upon the composition ratio of Ag reaching about 84 wt. % (the composition ratio of Ge reaching about 16 wt. %), the melting point reaches the lowest temperature of about 651° C., and then rises up to about 961° C. While there occurs a eutectic composition of the Ag—Ge alloy, its melting point is drastically lowered. A state of such a eutectic composition is designated as a eutectic of Ag—Ge.

As shown in FIG. 13, in the case of a Cu—Ge alloy, its melting point is gradually lowered from about 938° C. according as the composition ratio of Cu is increased. Upon the composition ratio of Cu reaching about 60.4 wt. % (the composition ratio of Ge reaching about 39.6 wt. %), the melting point reaches the lowest temperature of about 644° C., and then rises up to about 1084° C. upon the composition ratio of Cu reaching 100. There occurs a eutectic composition of the Cu—Ge alloy upon this state where the melting point is at the lowest. A state of such a eutectic composition is designated as a eutectic of Cu—Ge.

Since the second brazing filler metal is produced by adding Ge to Au—Ag—Cu, there is a conceivable composition utilizing the eutectic of Ag—Cu, similarly to the first brazing filler metal. Further, as shown in FIGS. 9, 12 and 13, when the composition ratio of Ge to Au, Ag, and Cu reaches certain values, Ge forms eutectics with Au, Ag, and Cu. Besides, when there occur eutectic compositions of the Au—Ge alloy, the Ag—Ge alloy, and the Cu—Ge alloy in which they respectively form the eutectic of Au—Ge, the eutectic of Ag—Ge, and the eutectic of Cu—Ge as described above, their melting points are lowered. However, since each of Ag and Cu to be added is in effect substituted for Au, addition of Ag and Cu in improper amounts may result in deviation from those required for the eutectic compositions. It is reasoned that when the second brazing filler metal has a specific composition utilizing any of the eutectic of Au—Ge, the eutectic of Ag—Ge, the eutectic of Cu—Ge, its melting point is lowered, and when it has a specific composition utilizing all of them, the melting point is further lowered. Therefore, the respective composition ratios of Au, Ag, Cu, and Ge, composing the Au—Ag—Cu—Ge based brazing filler metal, have respective ranges required for obtaining the brazing filler metal as the object of the invention, and it is reasoned that the respective composition ratios fall within the respective ranges found from the results of the tests shown in Tables 4 and 5 described above.

To sum up, the Au—Ag—Cu—Ge based brazing filler metal according to the invention is turned into a brazing filler metal which is capable of low temperature joining and is excellent both in joining strength and corrosion resistance, utilizing four eutectics, that is, the eutectic of Ag—Cu, the eutectic of Au—Ge, the eutectic of Ag—Ge, and the eutectic of Cu—Ge, provided that the same satisfies all of the following conditions 8) to 10).

Condition 8) The composition ratio of Ge is in a range of more than 4 wt. % to less than 24 wt. %.

Condition 9) The composition ratio of Au is more than 34 wt. %.

Condition 10) The composition ratio of Ag is less than 41 wt. %.

Furthermore, the Au—Ag—Cu—Ge based brazing filler metal even with the above composition can be further improved in wettability against stainless steel, provided that the same satisfies all of the following conditions 11) to 13).

Condition 11) The composition ratio of Au is in a range of about 35 to about 80 wt. %.

Condition 12) The composition ratio of Ag is in a range of about 5 to about 40 wt. %.

Condition 13) The composition ratio of Ge is in a range of about 10 wt. to about 19 wt. %.

(Third Brazing Filler Metal)

Subsequently, a Au—Ag—Cu—Si based brazing filler metal which is a third brazing filler metal according to the invention is described hereinafter. This brazing filler metal is composed of, as main constituents, four kinds of elements Au, Ag, Cu, and Si, and is thus produced by limiting the above-described additive element of the first brazing filler metal only to one kind of element Si. This brazing filler metal is different in element but is produced by the same method as that of the first brazing filler metal.

Eleven samples being Examples numbered from 3-1 to 3-11 and 6 samples being Comparative Examples numbered from 3-1 to 3-6 shown in Table 6, 17 samples, in total, of different Au—Ag—Cu—Si based brazing filler metals, were prepared by varying a composition ratio (wt. %) of each of Au, Ag, Cu, and Si as appropriate. To examine properties of the respective prepared samples, brazing was implemented using as the base metals stainless steel members whose material is set to SUS316L. The respective samples were examined, similarly to the second brazing filler metal, on the two items, a) melting point and c) wettability against SUS316L. The four samples of Examples 3-9 and 3-10 and Comparative Examples 3-5 and 3-6 were examined on the other four items. The results thereof are as shown in Table 7. It should be noted that the indication of "Example" and "Comparative Example" is the same as that of the first brazing filler metal. The e) joining strength and f) corrosion resistance are checked in the same manner as that of the first brazing filler metal.

As shown in Table 6, the melting points of the samples of Examples 3-1 to 3-11 are 782° C. (Example 3-1) even at the maximum, and the melting point of any of the samples is thus not higher than 800° C. The melting points of the samples of Comparative Examples 3-1 to 3-3 and 3-5, however, exceed 800° C. Regarding the wettability against SUS316L, while all of the samples of Examples 3-1 to 3-11 provided excellent results, the samples of Comparative Examples 3-2 to 3-5 other than Comparative Examples 3-1 and 3-6 provided just slightly good results which were not sufficient. Besides, as shown in Table 7, while the brazing temperature for the sample of Comparative Example 3-5 exceeded 800° C., that for any of the other samples was lower than 800° C. Crystal coarsening of SUS316L occurred in the sample of Comparative Example 3-5, and not in the other samples. The joining strengths of the samples were 770 MPa even at the minimum, and any of them was better than those of the conventional brazing filler metals. Regarding the corrosion resistance, any of the samples other than Comparative Example 3-6 exhibited an excellent result.

The Au—Ag—Cu—Si based brazing filler metal also needs to satisfy, similarly to the first brazing filler metal, the above-described three conditions A, B and C, and, from the results shown in Tables 6 and 7, the conditions for satisfaction are as follows:

Condition A)

Since Comparative Examples 3-1 to 3-3 and 3-5 and Examples 3-1 to 3-11 have common ranges of respective composition ratios of Au, Ag and Cu, it is difficult to specify Condition A based only on the respective composition ratios of Au, Ag and Cu.

Next, when the composition ratio of Si is no more than 0.9 wt. % and when it reaches 19 wt. % as shown in Comparative Examples 3-1 to 3-3, the melting points exceed 800° C., so that the samples thereof do not satisfy Condition A. However, any of samples satisfying Condition A as shown in Example 3-1 to 3-11 has a composition ratio of Si which is in a range of more than 0.9 wt. % to less than 19 wt. %. Therefore, to satisfy Condition A, the composition ratio of Si needs to be in a range of more than 0.9 wt. % to less than 19 wt. %. In this point of view, it can be said, particularly on the basis of values shown in Examples 3-1 to 3-11, that the composition ratio of Si is preferably in a range of about 1 to about 18 wt. %. However, even if the composition ratio of Si is limited to this range, when the composition ratio of Au reaches 40 wt. % as shown in Comparative Example 3-3, the melting point exceeds 800° C., so that the sample does not satisfy Condition A. In contrast to this, when the composition ratio of Au is more than 40 wt. % as shown in Examples 3-1 to 3-11, the melting points become lower than 800° C., and thus the samples satisfy Condition A. Accordingly, in order to satisfy Condition A, the composition ratio of Au needs to be more than 40 wt. %. Further, even if the composition ratio of Au is limited to this range, when the composition ratio of Ag reaches 4 wt. % as shown in Comparative Example 3-5, the melting point exceeds 800° C., so that the sample does not satisfy Condition A. In contrast to this, when the composition ratio of Ag is more than 4 wt. % as shown in Examples 3-1 to 3-11, the melting points become lower than 800° C., and thus the samples satisfy Condition A. Accordingly, in order to satisfy Condition A, the composition ratio of Ag is only required to be more than 4 wt. %, and is preferably not less than about 5 wt. %.

Condition B)

Only the sample of Comparative Example 3-6 is insufficient and the other samples are excellent in corrosion resistance. The sample shown in Comparative Example 3-6 has a composition ratio of Ag at 37 wt. %, and the other samples have composition ratios of Ag at less than 37 wt. %. Accordingly, Condition B is satisfied when the composition ratio of Ag is less than 37 wt. %.

Condition C)

The samples satisfying both the aforementioned Conditions A and B have joining strengths of 770 MPa even at the minimum, and any of them exhibited a value better than those of the conventional brazing filler metals. Accordingly, the samples satisfying both the aforementioned Conditions A and B satisfy Condition C.

Further, even the samples satisfying Conditions A and B are particularly improved in wettability against stainless steel, provided that the same satisfy all of the following conditions as in Examples 3-5 to 3-11.

The composition ratio of Au is in a range of about 41 to about 79 wt. %.

The composition ratio of Ag is in a range of about 5 to about 36 wt. %.

As described in the foregoing, the Au—Ag—Cu—Si based brazing filler metal becomes a brazing filler metal satisfying all of the three requirements, that is, enabling low temperature joining and securing excellent corrosion resistance and sufficient joining strength, provided that the composition ratios of Si, Au, and Ag respectively fall within the aforementioned ranges satisfying Condition A, and the composition ratio of Ag falls within the aforementioned range satisfying Condition B. Furthermore, provided that the composition ratios of Au and Ag are respectively within the above-described ranges for excellent wettability against stainless steel, the Au—Ag—Cu—Si based brazing filler metal is improved in wettability against stainless steel. In this case, the brazing filler metal spreads extensively on the surfaces of the stainless steel members, thus facilitating the joining work, and, as a result, the brazing filler metal becomes more preferable.

Next, the reason why the Au—Ag—Cu—Si based brazing filler metal composed of those metal elements at respective specified ratios as described above can conform to the brazing filler metal as the object of the invention is described in detail hereinafter with reference to a phase diagram of a binary system of an alloy shown in FIG. 14 with the above-described FIGS. 8 and 10.

Figure 14:
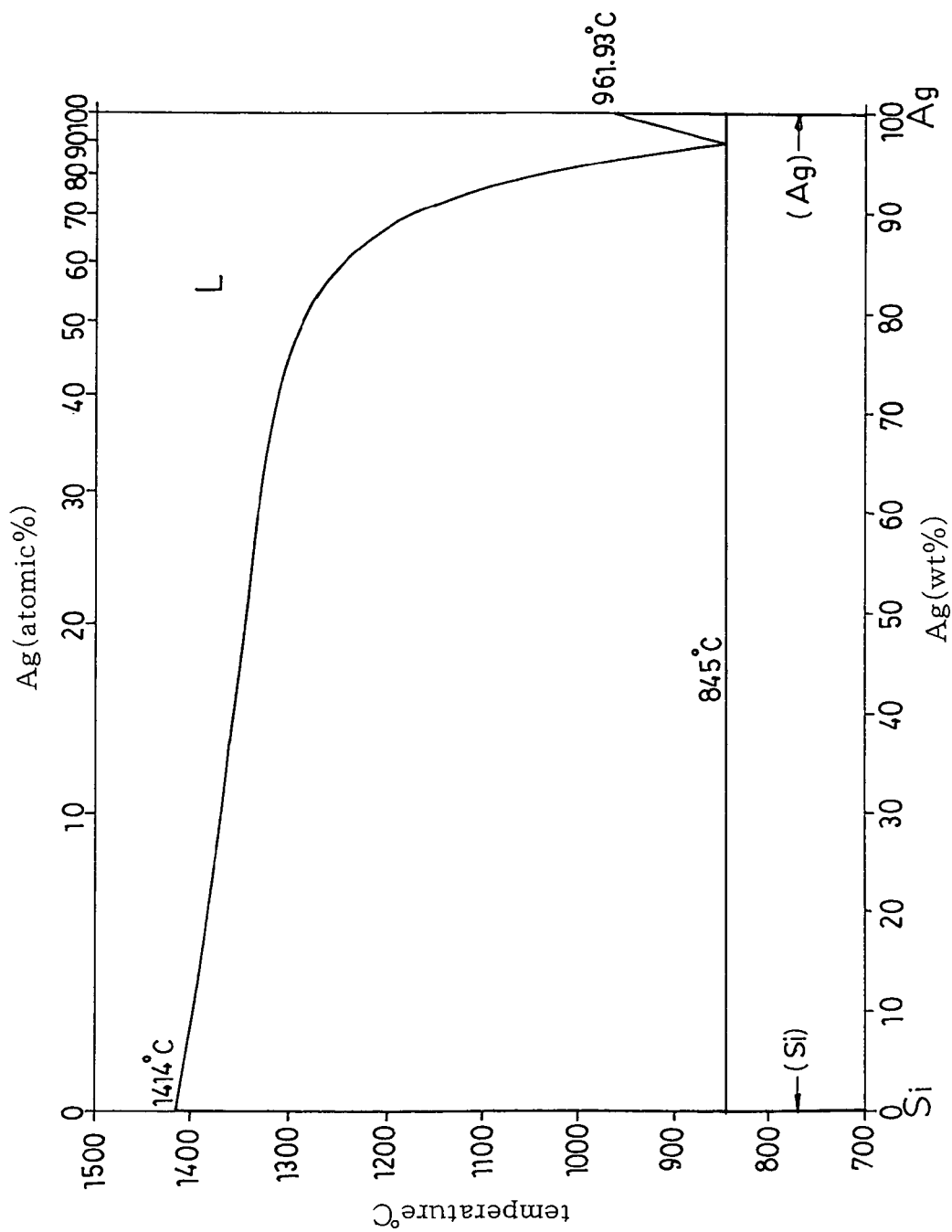
FIG. 14 is a phase diagram of a binary system of Si—Ag, the horizontal axis thereof showing a composition ratio of Ag to Si while the vertical axis thereof showing a melting point.

FIG. 14 is a phase diagram of a binary system of Si—Ag, the horizontal axis thereof showing a composition ratio of Ag to Si while the vertical axis thereof showing a melting point, and detailed description on the phase diagram is stated in the foregoing Literature 1.

In the case of a Ag—Si alloy, its melting point is gradually lowered from about 1414° C. according as the composition ratio of Ag is increased. Upon the composition ratio of Ag reaching about 97 wt. % (the composition ratio of Si reaching about 3 wt. %), the melting point reaches the lowest temperature of about 845° C., and then rises up to about 961° C. When there occurs a eutectic composition of the Ag—Si alloy, its melting point is drastically lowered. A state of such a eutectic composition is designated as a eutectic of Ag—Si.

Since the third brazing filler metal is produced by adding Si to Au—Ag—Cu, there is a conceivable composition utilizing a eutectic of Ag—Cu, similarly to the first brazing filler metal. Further, as shown in FIGS. 10 and 14, when the composition ratio of Si to Au or Ag reaches a certain value, Si forms a eutectic with Au or Ag. Besides, when there occur eutectic compositions of the Au—Si alloy and the Ag—Si alloy in which they respectively form the eutectic of Au Si and the eutectic of Ag—Si as described above, their melting points are lowered. However, addition of Ag and Cu in improper amounts may result in deviation from those required for the eutectic compositions. Therefore, the respective composition ratios of Au, Ag, Cu, and Si, composing the Au—Ag—Cu—Si based brazing filler metal, have respective ranges required for obtaining the brazing filler metal as the object of the invention, and it is reasoned that the respective composition ratios fall within the respective ranges found from the results of the tests shown in Tables 6 and 7 described above.

To sum up, the Au—Ag—Cu—Si based brazing filler metal according to the invention is turned into a brazing filler metal which is capable of low temperature joining and is excellent both in joining strength and corrosion resistance, utilizing three eutectics, that is, the eutectic of Ag—Cu, the eutectic of Au—Si, and the eutectic of Ag—Si, provided that the same satisfies all of the following conditions 14) to 16).

Condition 14) The composition ratio of Si is in a range of more than 0.9 wt. % to less than 19 wt. %.

Condition 15) The composition ratio of Au is more than 40 wt. %.

Condition 16) The composition ratio of Ag is in a range of more than 4 wt. % to less than 37 wt. %.

Further, the Au—Ag—Cu—Si based brazing filler metal even with the above composition can be further improved in wettability against stainless steel, provided that the same satisfies both the following conditions 17) and 18).

Condition 17) The composition ratio of Au is in a range of about 41 to about 79 wt. %.

Condition 18) The composition ratio of Ag is in a range of about 5 to about 36 wt. %.

(Fourth Brazing Filler Metal)

Subsequently, a Au—Ag—Cu—Ge—Si—Sn based brazing filler metal which is a fourth brazing filler metal according to the invention is described hereinafter. This brazing filler metal is composed of, as main constituents, Au, metals having homogeneous solubility with Au, and at least one kind of element out of Ge, Si, and Sn, and is thus produced by limiting the additive element of the above-described first brazing filler metal to the three kinds of elements Ge, Si, and Sn. As the metals having homogeneous solubility with Au, Ag and Cu are used here; It should be noted that this brazing filler metal is different in element but is produced by the same method as that of the first brazing filler metal.

Twenty-eight samples being Examples numbered from 4-1 to 4-28 and 11 samples being Comparative Examples numbered from 4-1 to 4-11 shown in Tables 8 and 9, 39 samples, in total, of different Au—Ag—Cu—Ge—Si—Sn based brazing filler metals, were prepared by varying six kinds of elements Au, Ag, Cu, Ge, Si, and Sn and a composition ratio (wt. %) of each of them as appropriate. The respective prepared samples were examined in properties on the selected six items which are the same as those of the first brazing filler metal. It should be noted that the indication of "Example" and "Comparative Example" is the same as that of the first brazing filler metal. The e) joining strength and f) corrosion resistance are checked in the same manner as that of the first brazing filler metal.

As shown in Tables 8 and 9, the melting points of the samples of Examples 4-1 to 4-28 are 743° C. (Example 4-5) even at the maximum, and the melting point of any of the samples is thus not higher than 800° C. The melting points of the samples of Comparative Examples 4-1 to 4-7 and 4-9, however, exceed 800° C. Regarding the wettability against SUS316L, while all of the samples of Examples 4-1 to 4-28 provided excellent results, any of the samples of Comparative Examples other than Comparative Example 4-11 provided a just slightly good result which was not sufficient. Besides, the brazing temperature for any of the samples of Examples 4-1 to 4-28 was lower than 800° C. Crystal coarsening of SUS316L occurred in the sample of Comparative Examples 4-1 to 4-7 and 4-9, and not in the other samples. The joining strengths of the samples were 600 MPa even at the minimum, and any of them was better than those of the conventional brazing filler metals. Regarding the corrosion resistance, any of the samples other than Comparative Example 4-11 exhibited an excellent result.

The Au—Ag—Cu—Ge—Si—Sn based brazing filler metal also needs to satisfy, similarly to the first brazing filler metal, the above-described three conditions A, B and C, and, from the results shown in Tables 8 and 9, the conditions for satisfaction are as follows:

Condition A)

Since Comparative Examples 4-1 to 4-7 and 4-9 and Examples 4-1 to 428 have common ranges of respective composition ratios of Au, Ag and Cu, it is difficult to specify Condition A based only on the respective composition ratios of Au, Ag, and Cu.

Next, when the total composition ratio of Ge, Si, and Sn is no more than 1 wt. % and when it reaches 35 wt. % as shown in Comparative Examples 4-1 to 4-7, the melting points exceed 800° C., so that samples thereof do not satisfy Condition A. However, any of samples satisfying Condition A as shown in Example 4-1 to 4-28 has a total composition ratio of Ge, Si, and Sn which is in a range of more than 1 wt. % to less than 35 wt. %. Therefore, to satisfy Condition A, the total composition ratio of Ge, Si, and Sn needs to be in a range of more than 1 wt. % to less than 35 wt. %. In this point of view, it can be said, particularly on the basis of values shown in Examples 4-1 to 4-28, that the total composition ratio of Ge, Si, and Sn is preferably in a range of about 2 to about 34 wt. %. Further, even if the total composition ratio of Ge, Si, and Sn is within this range, when the composition ratio of Au reaches 80 wt. % as shown in Comparative Example 4-9, the melting point exceeds 800° C., so that the sample does not satisfy Condition A. In contrast to this, when the composition ratio of Au is less than 80 wt. % as shown in Examples 4-1 to 4-28, any of the samples satisfies Condition A. Accordingly, in order to satisfy Condition A, the composition ratio of Au is only required to be less than 80 wt. %, and is preferably not more than about 79 wt. %.

Condition B)

Only the sample of Comparative Example 4-11 is insufficient and the other samples are excellent in corrosion resistance. The sample shown in Comparative Example 4-11 has a composition ratio of Ag at 42 wt. %, and any of the other samples has a composition ratio of Ag at less than 42 wt. %. Accordingly, Condition B is satisfied when the composition ratio of Ag is less than 42 wt. %.

Condition C)

The samples satisfying both the aforementioned Conditions A and B have joining strengths of 600 MPa even at the minimum, and any of them exhibited a value better than those of the conventional brazing filler metals. Accordingly, the samples satisfying both the aforementioned Conditions A and B satisfy Condition C.

Further, even the samples satisfying the aforementioned Conditions A and B are insufficient in wettability against stainless steel, in both cases where the composition ratio of Au is 34 wt. % as shown in Comparative Example 4-8 and where the composition ratio of Ag is 5 wt. % as shown in Comparative Example 4-10. Therefore, even when the aforementioned Conditions A and B are satisfied, it is preferable that the composition ratio of Au is more than 34 wt. %, and the composition ratio of Ag is more than 5 wt. %. Even when the composition ratio of Ag is more than 5 wt. %, particularly when the composition ratio of Ag is in a range of about 6 to about 41 wt. %, the color of the brazing filler metal increases in grade of silver gray of Ag to be closer to the color of stainless steel.

In consideration that the samples of Examples 4-26 and 4-27 are particularly excellent in wettability against stainless steel, it is preferable that the samples have a composition ratio of Au and a composition ratio of Ag satisfying the following conditions, in addition to the aforementioned conditions.

The composition ratio of Au is in a range of about 47 to about 64 wt. %

The composition ratio of Ag is in a range of about 6 to about 20 wt. %.

As described in the foregoing, the Au—Ag—Cu—Ge—Si—Sn based brazing filler metal becomes a brazing filler metal satisfying all of the three requirements, that is, enabling low temperature joining and securing excellent corrosion resistance and sufficient joining strength, provided that the total composition ratio of Ge, Si, and Sn and the composition ratio of Au respectively fall within the ranges satisfying Condition A and the composition ratio of Ag falls within the range satisfying Condition B. Furthermore, provided that the composition ratios of Au and Ag are respectively within the above-described ranges for excellent wettability against stainless steel, the Au—Ag—Cu—Ge—Si—Sn based brazing filler metal is improved in wettability against stainless steel.

Next, the reason why the Au—Ag—Cu—Ge—Si—Sn based brazing filler metal composed of those metal elements at respective specified ratios as described above can conform to the brazing filler metal as the object of the invention is described in detail hereinafter with reference to a phase diagram of a binary system of an alloy shown in FIG. 15 with the above-described FIGS. 8 to 14.

Figure 15:
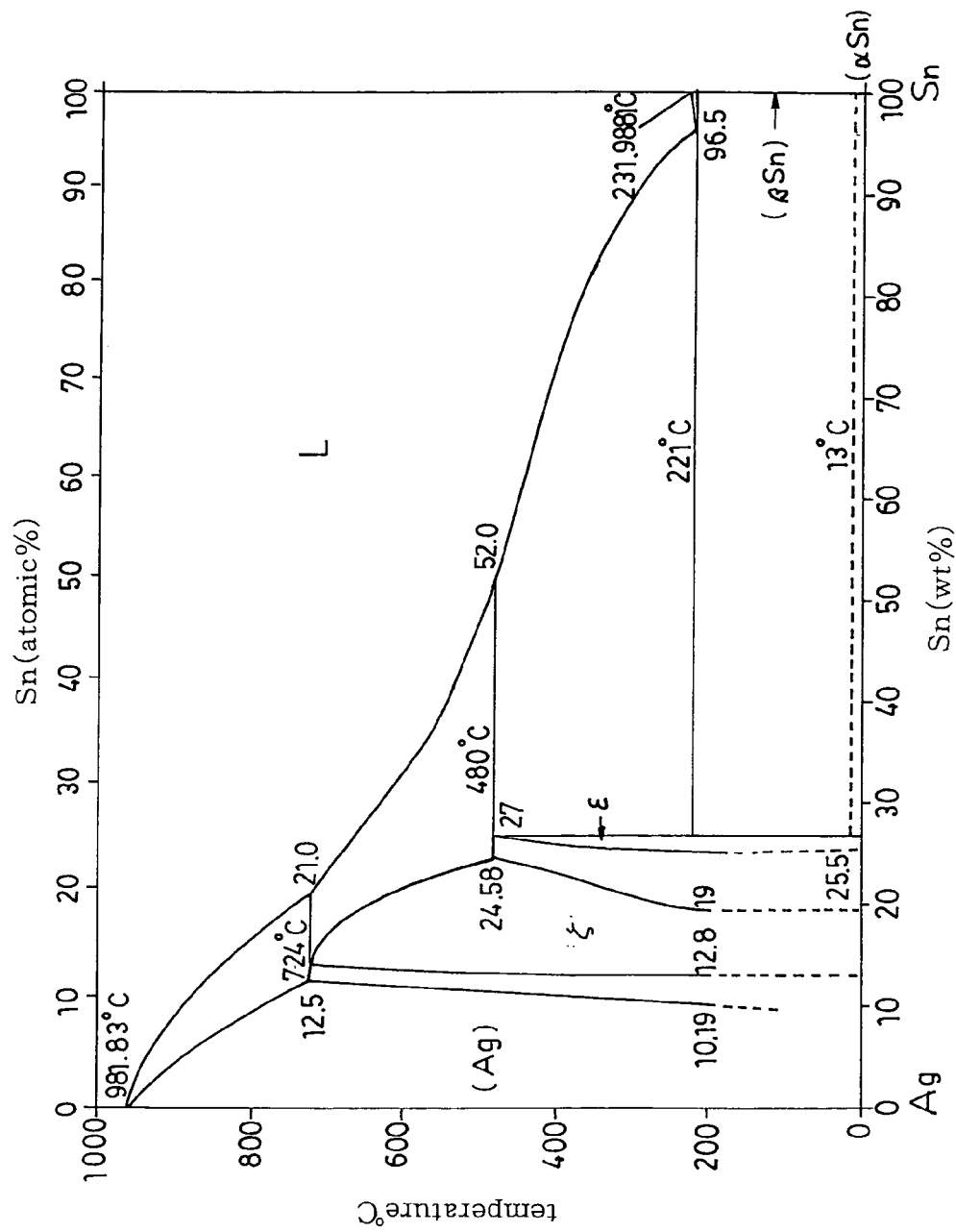
FIG. 15 is a phase diagram of a binary system of Ag—Sn, the horizontal axis thereof showing a composition ratio of Sn to Ag while the vertical axis thereof showing a melting point.

FIG. 15 is a phase diagram of a binary system of Sn—Ag, the horizontal axis thereof showing a composition ratio of Sn to Ag while the vertical axis thereof showing a melting point, and detailed description on the phase diagram is stated in the foregoing Literature 1.

In the case of a Ag—Sn alloy, its melting point is gradually lowered from about 981° C. according as the composition ratio of Sn is increased. Upon the composition ratio of Sn reaching about 96.5 wt. % (the composition ratio of Ag reaching about 3.5 wt. %), the melting point reaches the lowest temperature of about 221° C., and then rises up to about 231° C. When there occurs a eutectic composition of the Ag—Sn alloy, its melting point is lowered. A state of such a eutectic composition is designated as a eutectic of Ag—Sn.

Since the fourth brazing filler metal is produced by adding Ge, Si, and Sn to Au—Ag—Cu, there is a conceivable composition utilizing a eutectic of Ag—Cu, a eutectic of Au—Ge, a eutectic of Ag—Ge, and a eutectic of Cu—Ge, similarly to the second brazing filler metal. Further, when the composition ratio of Au to Si and Sn reaches certain values, Au forms eutectics with Si and Sn, so that there is also a conceivable composition utilizing a eutectic of Au—Si and a eutectic of Au—Sn. Further, since Ag also forms eutectics with Si and Sn when the composition ratio of Ag to Si and Sn reaches certain values, there is also a conceivable composition utilizing a eutectic of Ag—Si and a eutectic of Ag—Sn. From the above viewpoint, the melting point is lowered when the fourth brazing filler metal has a composition utilizing any of eight eutectics, that is, the eutectic of Ag—Cu, the eutectic of Au—Ge, the eutectic of Ag—Ge, the eutectic of Cu Ge, the eutectic of Au—Si, the eutectic of Au—Sn, the eutectic of Ag—Si, and the eutectic of Ag—Sn. However, since each of Ag and Cu to be added is in effect substituted for Au, addition of Ag and Cu in improper amounts may result in deviation from those required for the eutectic compositions. Therefore, the respective composition ratios of Au, Ag, Cu, Ge, Si and Sn, composing the Au—Ag—Cu—Ge—Si—Sn based brazing filler metal, have respective ranges required for obtaining the brazing filler metal as the object of the invention, and it is reasoned that the respective composition ratios fall within the ranges found from the results of the tests shown in Tables 8 and 9 described above.

To sum up, the Au—Ag—Cu—Ge—Si—Sn based brazing filler metal according to the invention is turned into a brazing filler metal which is capable of low temperature joining and is excellent both in joining strength and corrosion resistance, utilizing eight eutectics, that is, the eutectic of Ag—Cu, the eutectic of Au—Ge, the eutectic of Ag—Ge, the eutectic of Cu—Ge, the eutectic of Au—Si, the eutectic of Au—Sn, the eutectic of Ag—Si, and the eutectic of Ag—Sn, provided that the same satisfies all of the following conditions 19) to 21).

Condition 19) The total composition ratio of Ge, Si, and Sn is in a range of more than 1 wt. % to less than 35 wt. %.

Condition 20) The composition ratio of Au is less than 80 wt. %.

Condition 21) The composition ratio of Ag is less than 42 wt. %.

Further, the Au—Ag—Cu—Ge—Si—Sn based brazing filler metal becomes a more preferable brazing filler metal having improved wettability against stainless steel, provided that the same satisfies both the following conditions 22) and 23).

Condition 22) The composition ratio of Au is in a range of about 47 to about 64 wt. %.

Condition 23) The composition ratio of Ag is in a range of about 6 to about 20 wt. %.

(Fifth Brazing Filler Metal)

Subsequently, a Au—Ag—Cu—Pd based brazing filler metal which is a fifth brazing filler metal according to the invention is described hereinafter. This brazing filler metal is composed of, as main constituents, four kinds of elements Au, Ag, Cu, and palladium (Pd) having homogeneous solubility with Au, Ag, and Cu added thereto, and a first additive element added to the main constituents. The first additive element is composed of elements of metal or semiconductor, similarly to the first brazing filler metal, and is at least one kind of element out of Al, Bi, Ga, Ge, In, Sb, Si, Sn, Pb, Te, and Tl. This Au—Ag—Cu—Pd based brazing filler metal is different in element but is produced by the same method as that of the first brazing filler metal.

Thirteen samples being Examples numbered from 5-1 to 5-13 shown in Table 10 and 9 samples being Comparative Examples numbered from 5-1 to 5-9 shown in Table 11, 22 samples, in total, of different Au—Ag—Cu—Pd based brazing filler metals, were prepared by varying a composition ratio (wt. %) of each of Au, Ag, Cu, and Pd as appropriate as well as varying the kind and a composition ratio (wt. %) of each of the elements constituting the first additive element as appropriate. In this event, the samples were prepared using one kind of element out of Ga, Al, and Bi and using two or more kinds of elements out of them as the first additive element. The two or more kinds of elements of the first additive element are as follows:

Bi and Si (Example 5-2); In, Ga, and Te (Example 5-3)

Al, Ge, and Tl (Example 5-4); Pb and Sn (Example 5-5)

Sb, Ge, and Te (Example 5-6)

Sn and Bi (Example 5-7, Comparative Example 5-5)

Al and Ge (Example 5-8); Ge and Ga (Example 5-9, Comparative Example 5-6)

Sn and Sb (Example 5-10, Comparative Example 5-7)
Ge and Pb (Example 5-11)
In and Sn (Example 5-12, Comparative Example 5-8)
In and Ti (Example 5-13, Comparative Example 5-9)
Ga, Si, and Te (Comparative Example 5-3); Te, Ga and Pb (Comparative Example 5-4)

The respective prepared samples were examined in properties on the selected six items which are the same as those of the first brazing filler metal. It should be noted that the indication of "Example" and "Comparative Example" is the same as that of the first brazing filler metal. The e) joining strength and f) corrosion resistance are checked in the same manner as that of the first brazing filler metal.

As shown in Tables 10 and 11, the melting points of the samples of Examples 5-1 to 5-13 are 724° C. (Example 5-9) even at the maximum, and the melting point of any of the samples is thus not higher than 800° C. The melting points of the samples of Comparative Examples 5-1 to 5-4, 5-6, and 5-9, however, exceed 800° C. Regarding the wettability against SUS316L, while the samples of Examples 5-1 to 5-13 provided excellent results, any of the samples of Comparative Examples 5-1 to 5-9 other than Comparative Example 5-8 provided a just slightly good result which was not sufficient. Besides, the brazing temperature for any of the samples of Examples 5-1 to 5-13 was lower than 800° C. Crystal coarsening of SUS316L occurred in the samples of Comparative Examples 5-1 to 5-4, 5-6, and 5-9, and not in the other samples. The joining strengths of the samples were 590 MPa even at the minimum, and any of them was better than those of the conventional brazing filler metals. Regarding the corrosion resistance, any of the samples other than Comparative Example 5-8 exhibited an excellent result.

The Au—Ag—Cu—Pd based brazing filler metal also needs to satisfy, similarly to the first brazing filler metal, the above-described three conditions A, B and C, and, from the results shown in Tables 10 and 11, the conditions for satisfaction are as follows:

Condition A)
Since Comparative Examples 5-1 to 5-4, 5-6, and 5-9 and Examples 5-1 to 5-13 have common ranges of respective composition ratios of Au, Ag, and Cu, it is difficult to specify Condition A based only on the respective composition ratios of Au, Ag, and Cu.

Next, when the total composition ratio of the first additive element is no more than 1 wt. % and when it reaches 38 wt. % as shown in Comparative Examples 5-1 to 5-4, the melting points exceed 800° C., so that samples thereof do not satisfy Condition A. However, any of samples satisfying Condition A as shown in Example 5-1 to 5-13 has a total composition ratio of the first additive element which is in a range of more than 1 wt. % to less than 38 wt. %. Therefore, to satisfy Condition A, the total composition ratio of the first additive element needs to be in a range of more than 1 wt. % to less than 38 wt. %. In this point of view, it can be said, particularly on the basis of values shown in Examples 5-1 to 5-13, that the total composition ratio of the first additive element is preferably in a range of about 2 to about 37 wt. %. However, even if the total composition ratio of the first additive element is within this range, when the composition ratio of Au reaches 82 wt. % as shown in Comparative Example 5-6, the melting point exceeds 800° C., so that the sample does not satisfy Condition A. In contrast to this, when the composition ratio of Au is less than 82 wt. % as shown in Examples 5-1 to 5-13, any of the samples satisfies Condition A. Accordingly, in order to satisfy Condition A, the composition ratio of Au is only required to be less than 82 wt. %. Further, even if the composition ratio of Au is within this range, when the composition ratio of Pd is 34 wt. % as shown in Comparative Example 5-9, the melting point exceeds 800° C., so that the sample does not satisfy Condition A. However, if the composition ratio of Pd is less than 34 wt. %, any of the samples satisfies Condition A. Accordingly, in order to satisfy Condition A, the composition ratio of Pd is only required to be less than 34 wt. %, and is preferably not more than about 33 wt. %.

Condition B)
Only the sample of Comparative Example 5-8 is insufficient and the other samples are excellent in corrosion resistance. The sample shown in Comparative Example 5-8 has a composition ratio of Ag at 47 wt. %, and any of the other samples has a composition ratio of Ag at less than 47 wt. %. Accordingly, Condition B is satisfied when the composition ratio of Ag is less than 47 wt. %.

Condition C)
The samples satisfying both the aforementioned Conditions A and B have joining strengths of 590 MPa even at the minimum, and any of them exhibited a value better than those of the conventional brazing filler metals. Accordingly, the samples satisfying both the aforementioned Conditions A and B satisfy Condition C.

Further, in both cases where the composition ratio of Au is 33 wt. % as shown in Comparative Example 5-5 and where the composition ratio of Ag is 4 wt. % as shown in Comparative Example 5-7, any of the samples is insufficient in wettability against stainless steel. Therefore, even when the aforementioned Conditions A and B are satisfied, it is preferable that the composition ratio of Au is more than 33 wt. %, and the composition ratio of Ag is more than 4 wt. %. In particular, in order to further improve wettability against stainless steel, it can be said, from Examples 5-10 and 5-11, that it is preferable to satisfy the following two conditions.

The composition ratio of Au is in a range of about 51 to about 56 wt. %.

The composition ratio of Ag is in a range of about 5 to about 20 wt. %.

Besides, in consideration of the wettability against stainless steel, the composition ratio of Pd is preferably less than 34 wt. %. By adding Pd, the color of the brazing filler metal increases in grade of silver gray to be closer to the color of stainless steel. As a result, when the stainless steel members are brazed, a portion thereof joined can be made less conspicuous.

As described in the foregoing, the Au—Ag—Cu—Pd based brazing filler metal becomes a brazing filler metal satisfying all of the three requirements, that is, enabling low temperature joining and securing excellent corrosion resistance and sufficient joining strength, provided that the composition ratios of the first additive element, Au, and Pd fall within the aforementioned ranges satisfying Condition A, and the composition ratio of Ag falls within the range satisfying Condition B. Furthermore, provided that the composition ratio of Au, Ag, or Pd is within the above-described range for excellent wettability against stainless steel, the Au—Ag—Cu—Pd based brazing filler metal is improved in wettability against stainless steel. In this case, the brazing filler metal spreads extensively on the surfaces of the stainless steel members, thus facilitating the joining work, and, as a result, the brazing filler metal becomes more preferable.

Since the Au—Ag—Cu—Pd based brazing filler metal composed of those metal elements at respective specified ratios as described above is produced by adding Pd and the first additive element to Au—Ag—Cu, there is a conceivable composition utilizing a eutectic of Ag—Cu and a eutectic of the above-described additive element. Furthermore, Ag might form a eutectic composition with the additive element (for example, Si), and Pd might form a eutectic composition with the additive element (for example, Ge). It can be reasoned that this brazing filler metal is lowered in temperature due to the formation of these eutectics. Therefore, the respective composition ratios of Au, Ag, Cu, Pd, and the additive element, composing the Au—Ag—Cu—Pd based brazing filler metal, have respective ranges required for obtaining the brazing filler metal as the object of the invention, and it is reasoned that the respective composition ratios fall within the ranges found from the results of the tests shown in Tables 10 and 11 described above.

To sum up, it is reasoned that the Au—Ag—Cu—Pd based brazing filler metal according to the invention is turned into a brazing filler metal which is capable of low temperature joining and is excellent both in joining strength and corrosion resistance, utilizing at least the two eutectics, that is, the eutectic of Ag—Cu and the eutectic of the additive element, provided that the same satisfies all of the following conditions 24) to 27).

Condition 24) The total composition ratio of the first additive element is in a range of more than 1 wt. % to less than 38 wt. %.

Condition 25) The composition ratio of Au is less than 82 wt. %.

Condition 26) The composition ratio of Pd is less than 34 wt. %.

Condition 27) The composition ratio of Ag is less than 47 wt. %.

Further, the Au—Ag—Cu—Pd based brazing filler metal even with the above composition can be improved in wettability against stainless steel, provided that the same satisfies both the following conditions 28) and 29).

Condition 28) The composition ratio of Au is more than 33 wt. %.

Condition 29) The composition ratio of Ag is more than 4 wt. %.

Furthermore, the Au—Ag—Cu—Pd based brazing filler metal can be further improved in wettability against stainless steel, provided that the same satisfies both the following conditions 30) and 31).

Condition 30) The composition ratio of Au is in a range of about 51 to about 56 wt. %.

Condition 31) The composition ratio of Ag is in a range of about 5 to about 20 wt. %.

(Sixth Brazing Filler Metal)

Subsequently, a Au—Ag—Cu—Pd based brazing filler metal which is a sixth brazing filler metal according to the invention is described hereinafter. This brazing filler metal is different from the fifth brazing filler metal in that a second additive element is added thereto, in addition to the first additive element. The second additive element here is at least one of metal elements, manganese (Mn) and lithium (Li). This brazing filler metal is also different in element but is produced by the same method as that of the first brazing filler metal.

Thirteen samples being Examples numbered from 6-1 to 6-13 shown in Table 12 and 11 samples being Comparative Examples numbered from 6-1 to 6-11 shown in Table 13, 24 samples, in total, of different Au—Ag—Cu—Pd based brazing filler metals, were prepared by varying a composition ratio (wt. %) of each of Au, Ag, Cu, and Pd as appropriate as well as varying the kind and a composition ratio (wt. %) of each of the elements constituting the first additive element as appropriate, and varying a composition ratio (wt. %) of each of the elements constituting the second additive element as appropriate. In this event, the samples were prepared using one kind of element out of Si, Pb, and Sb and using two or more kinds of elements out of them as the first additive element. The two or more kinds of elements of the additive element are as follows:

Te and Si (Example 6-2); Ge, Sn, and Ga (Example 6-3)

Al, Sn, and Bi (Example 6-4); Ge, Sn, and Sb (Example 6-5)

Sb, Sn, and Pb (Example 6-6)

Sn and Al (Example 6-7, Comparative Example 6-5)

Bi and Ge (Example 6-8); Si and In (Example 6-9, Comparative Example 6-6)

Ge and Pb (Example 6-10, Comparative Example 6-7)

In and Ga (Example 6-11)

In and Sn (Example 6-12, Comparative Example 6-8)

In and Tl (Example 6-13, Comparative Example 6-9)

In, Ge, and Ga (Comparative Example 6-3); Ga, Si and Al (Comparative Example 6-4)

Sn and Sb (Comparative Example 6-10); Sn and Te (Comparative Example 6-11)

The respective prepared samples were examined in properties on the selected six items which are the same as those of the first brazing filler metal. It should be noted that the indication of "Example" and "Comparative Example" is the same as that of the first brazing filler metal. The e) joining strength and f) corrosion resistance are checked in the same manner as that of the first brazing filler metal.

As shown in Tables 12 and 13, the melting points of the samples of Examples 6-1 to 6-13 are 644° C. (Examples 6-1, 6-9, and 6-13) even at the maximum, and the melting point of any of the samples is thus not higher than 800° C. The melting points of the samples of Comparative Examples 6-1 to 6-4, 6-6, and 6-9 to 6-11, however, exceed 800° C. Regarding the wettability against SUS316L, while the samples of Examples 6-1 to 6-13 provided excellent results, any of the samples of Comparative Examples 6-1 to 6-7 other than Comparative Examples 6-8 to 6-11 provided a just slightly good result which was not sufficient. Besides, the brazing temperature for any of the samples of Examples 6-1 to 6-13 was lower than 800° C. Crystal coarsening of SUS316L occurred in the samples of Comparative Examples 6-1 to 6-4, 6-6, and 6-9 to 6-11, and not in the other samples. The joining strengths of the samples were 590 MPa even at the minimum, and any of them was better than those of the conventional brazing filler metals. Regarding the corrosion resistance, any of samples other than Comparative Example 6-8 exhibited an excellent result.

The Au—Ag—Cu—Pd based brazing filler metal also needs to satisfy the above-described three conditions A, B and C, and, from the results shown in Tables 12 and 13, the conditions for satisfaction are as follows:

Condition A)

Since Comparative Examples 6-1 to 6-4, 6-6, and 6-9 to 6-11 and Examples 6-1 to 6-13 have common ranges of respective composition ratios of Au, Ag, and Cu, it is difficult to specify Condition A based only on the respective composition ratios of Au, Ag, and Cu.

Next, when the total composition ratio of the first additive element is no more than 1 wt. % and when it reaches 38 wt. % as shown in Comparative Examples 6-1 to 6-4, the melting points exceed 800° C., so that samples thereof do not satisfy Condition A. However, any of samples satisfying Condition A as shown in Example 6-1 to 6-13 has a total composition ratio of the first additive element which is in a range of more than 1 wt. % to less than 38 wt. %. Therefore, to satisfy Condition A, the total composition ratio of the first additive element needs to be in a range of more than 1 wt. % to less than 38 wt. %. In this point of view, it can be said, particularly on the basis of values shown in Examples 6-1 to 6-13, that the total composition ratio of the first additive element is preferably in a range of about 2 to about 37 wt. %. However, even if the total composition ratio of the first additive element is within this range, when the composition ratio of Au reaches 78 wt. % as shown in Comparative Example 6-6, the melting point exceeds 800° C., so that the sample does not satisfy Condition A. In contrast to this, when the composition ratio of Au is less than 78 wt. % as shown in Examples 6-1 to 6-13, any of the samples satisfies Condition A. Accordingly, in order to satisfy Condition A, the composition ratio of Au is only required to be less than 78 wt. %. Further, even if the composition ratio of Au is within this range, when the second additive element is added at the composition ratio 3 wt. % in total as shown in Comparative Examples 6-10 and 6-11, the melting points exceed 800° C., so that the samples do not satisfy Condition A. Accordingly, in order to satisfy Condition A, the total composition ratio of the second additive element needs to be less than 3 wt. %. Further, when the composition ratio of Pd reaches 32 wt. % as shown in Comparative Example 6-9, the melting point exceeds 800° C., so that the sample does not satisfy Condition A. However, if the composition ratio of Pd is less than 32 wt. %, any of the samples satisfies Condition A. Accordingly, in order to satisfy Condition A, the composition ratio of Pd is only required to be less than 32 wt. %, and is preferably not more than about 31 wt. %.

Condition B)

Only the sample of Comparative Example 6-8 is insufficient and the other samples are excellent in corrosion resistance. The sample shown in Comparative Example 6-8 has a composition ratio of Ag at 48 wt. %, and any of the other samples has a composition ratio of Ag at less than 48 wt. %. Accordingly, Condition B is satisfied when the composition ratio of Ag is less than 48 wt. %.

Condition C)

The samples satisfying both the aforementioned Conditions A and B have joining strengths of 590 MPa even at the minimum, and any of them exhibited a value better than those of the conventional brazing filler metals. Accordingly, the samples satisfying both the aforementioned Conditions A and B satisfy Condition C.

Further, in both cases where the composition ratio of Au is 33 wt. % as shown in Comparative Example 6-5 and where the composition ratio of Ag is 5 wt. % as shown in Comparative Example 6-7, any of the samples is insufficient in wettability against stainless steel. Therefore, even when the aforementioned Conditions A and B are satisfied, it is preferable that the composition ratio of Au is more than 33 wt. %, and the composition ratio of Ag is more than 5 wt. %. In particular, from any of the samples of Examples 6-1 to 6-13 being excellent in wettability, it is preferable to satisfy the following two more conditions. It can be said that this results from the effect of lowering the melting point by the second additive element.

The composition ratio of Au is in a range of about 34 to about 77 wt. %.

The composition ratio of Ag is in a range of about 6 to about 47 wt. %.

As described in the foregoing, the Au—Ag—Cu—Pd based brazing filler metal becomes a brazing filler metal satisfying all of the three requirements, that is, enabling low temperature joining and securing excellent corrosion resistance and sufficient joining strength, provided that the composition ratios of the first and second additive elements, Au, and Pd fall within the ranges satisfying Condition A, and the composition ratio of Ag falls within the range satisfying Condition B. Furthermore, provided that the composition ratios of Au and Ag ate respectively within the above-described ranges for excellent wettability against stainless steel, the Au—Ag—Cu—Pd based brazing filler metal is improved in wettability against stainless steel. In this case, the brazing filler metal spreads extensively on the surfaces of the stainless steel members, thus facilitating the joining work, and, as a result, the brazing filler metal becomes more preferable.

Since the Au—Ag—Cu—Pd based brazing filler metal composed of those metal elements at respective specified ratios as described above is produced by adding Pd and the first and second additive elements to Au—Ag—Cu, there is a conceivable composition utilizing a eutectic of Ag—Cu and the above-described eutectic of additive element. Furthermore, Ag might form a eutectic composition with the first additive element (for example, Si), and Pd might form a eutectic composition with the first additive element (for example, Ge). It can be reasoned that this brazing filler metal is lowered in temperature due to the formation of these eutectic compositions. Moreover, since Mn or Li being the second additive element has the effect of lowering the melting point, it can be reasoned that the melting point of the Au—Ag—Cu—Pd based brazing filler metal is lowered due to the addition of the second additive element. Therefore, the respective composition ratios of Au, Ag, Cu, Pd, and the first and second additive elements, composing the Au—Ag—Cu—Pd based brazing filler metal, have respective ranges required for obtaining the brazing filler metal as the object of the invention, and it is reasoned that the respective composition ratios fall within the ranges found from the results of the tests shown in Tables 12 and 13 described above.

To sum up, the Au—Ag—Cu—Pd based brazing filler metal according to the invention is turned into a brazing filler metal which is capable of low temperature joining and is excellent both in joining strength and corrosion resistance, utilizing at least the two eutectics, that is, the eutectic of Ag—Cu and the eutectic of additive element, provided that the same satisfies all of the following conditions 32) to 36).

Condition 32) The total composition ratio of at least one kind of element of the first additive element is in a range of more than 1 to less than 38 wt. %.

Condition 33) The composition ratio of Au is less than 78 wt. %.

Condition 34) The total composition ratio of the second additive element is less than 3 wt. %.

Condition 35) The composition ratio of Pd is less than 32 wt. %.

Condition 36) The composition ratio of Ag is less than 48 wt. %.

Further, the Au—Ag—Cu—Pd based brazing filler metal even with the above composition can be improved in wettability against stainless steel, provided that the same satisfies both the following conditions 37) and 38).

Condition 37) The composition ratio of Au is more than 33 wt. %.

Condition 38) The composition ratio of Ag is more than 5 wt. %.

Furthermore, the Au—Ag—Cu—Pd based brazing filler metal can be further improved in wettability against stainless steel, provided that the same satisfies both the following conditions 39) and 40).

Condition 39) The composition ratio of Au is in a range of about 34 to about 77 wt. %.

Condition 40) The composition ratio of Ag is in a range of about 6 to about 47 wt. %.

(Seventh Brazing Filler Metal)

Subsequently, a Au—Ag—Cu—Pd—Ni based brazing filler metal which is a seventh brazing filler metal according to the invention is described hereinafter. This brazing filler metal is composed of, as main constituents, five kinds of elements Au, Ag, Cu, Pd having homogeneous solubility with Au, Ag, and Cu added thereto, and Ni having homogeneous solubility with Au and Cu added thereto, with a first additive element and a second additive element added to the main constituents. The first and second additive elements are the same as those of the sixth brazing filler metal. This Au—Ag—Cu—Pd—Ni based brazing filler metal is different in element but is produced by the same method as that of the first brazing filler metal.

Fourteen samples being Examples numbered from 7-1 to 7-14 shown in Table 14 and 12 samples being Comparative Examples numbered from 7-1 to 7-12 shown in Table 15, 26 samples, in total, of different Au—Ag—Cu—Pd—Ni based brazing filler metals, were prepared by varying a composition ratio (wt. %) of each of Au, Ag, Cu, Pd, and Ni as appropriate as well as varying the kind and a composition ratio (wt. %) of each of the elements constituting the first additive element as appropriate, and varying a composition ratio (wt. %) of each of the elements constituting the second additive element as appropriate. In this event, the samples were prepared using one kind of element out of Si, Tl, and Pb and using two or more kinds of elements out of them as the first additive element. The two or more kinds of elements of the first additive element are as follows:

Ge and In (Example 7-2); Pb, Sn, and In (Example 7-3)

Sn, Sb and Bi (Example 7-4); Ge, Al, and Tl (Example 7-5)

Bi, In, and Si (Example 7-6)

Ge and Bi (Example 7-7, Comparative Example 7-5)

In and Si (Examples 7-8 and 7-12, Comparative Example 7-8)

Al and Te (Example 7-9, Comparative Example 7-6)

Sn and Tl (Example 7-10, Comparative Example 7-7)

Ga and Al (Example 7-11)

Bi and Sb (Example 7-13, Comparative Example 7-9)

Ge and Te (Example 7-14, Comparative Example 7-12)

Si, In, and Al (Comparative Example 7-3); Bi, Ga, and Ge (Comparative Example 7-4)

Sn and Sb (Comparative Example 7-10); Ge and Al (Comparative Example 7-11)

The respective prepared samples were examined in properties on the selected six items which are the same as those of the first brazing filler metal. It should be noted that the indication of "Example" and "Comparative Example" is the same as that of the first brazing filler metal. The e) joining strength and f) corrosion resistance are checked in the same manner as that of the first brazing filler metal.

As shown in Tables 14 and 15, the melting points of the samples of Examples 7-1 to 7-14 are 732° C. (Example 7-14) even at the maximum, and the melting point of any of the samples is thus not higher than 800° C. The melting points of the brazing filler metals of Comparative Examples 7-1 to 7-4, 7-6, and 7-9 to 7-12, however, exceed 800° C.

Regarding the wettability against SUS316L, while the samples of Examples 7-1 to 7-14 provided excellent results, any of the samples of Comparative Examples other than Comparative Examples 7-8 to 7-11 provided a just slightly good result which was not sufficient. Besides, the brazing temperature for any of the samples of Examples 7-1 to 7-14 was lower than 800° C. Crystal coarsening of SUS316L occurred in Comparative Examples 7-1 to 7-4, 7-6, and 7-9 to 7-12, and not in the other samples. The joining strengths of the samples were 640 MPa even at the minimum, and any of them was better than those of the conventional brazing filler metals. Regarding the corrosion resistance, any of the samples other than Comparative Example 7-8 exhibited an excellent result.

From the results shown in Tables 14 and 15, the conditions for the Au—Ag—Cu—Pd—Ni based brazing filler metal to satisfy the above-described three conditions A, B and C, are as follows:

Condition A)

Since Comparative Examples 7-1 to 7-4, 7-6, and 7-9 to 7-12 and Examples 7-1 to 7-13 have common ranges of respective composition ratios of Au, Ag, and Cu, it is difficult to specify Condition A based only on the respective composition ratios of Au, Ag, and Cu.

Next, when the total composition ratio of the first additive element is no more than 1 wt. % and when it is 35 wt. % as shown in Comparative Examples 7-1 to 7-4, the melting points exceed 800° C., so that samples thereof do not satisfy Condition A. However, any of samples satisfying Condition A as shown in Example 7-1 to 7-14 has a total composition ratio of the first additive element which is in a range of more than 1 wt. % to less than 35 wt. %. Therefore, to satisfy Condition A, the total composition ratio of the first additive element needs to be in a range of more than 1 wt. % to less than 35 wt. %. In this point of view, it can be said, particularly on the basis of values shown in Examples 7-1 to 7-14, that the total composition ratio of the first additive element is preferably in a range of about 2 to about 34 wt. %. However, even if the total composition ratio of the first additive element is within this range, when the composition ratio of Au reaches 74 wt. % as shown in Comparative Example 7-6, the melting point exceeds 800° C., so that the sample does not satisfy Condition A. In contrast to this, when the composition ratio of Au is less than 74 wt. % as shown in Examples 7-1 to 7-14, any of the samples satisfies Condition A. Accordingly, in order to satisfy Condition A, the composition ratio of Au is only required to be less than 74 wt. %. Further, even if the composition ratio of Au is within this range, when the second additive element is added at the composition ratio 3 wt. % in total as shown in Comparative Examples 7-10 and 7-11, the melting points exceed 800° C., so that the samples do not satisfy Condition A. Accordingly, in order to satisfy Condition A, the total composition ratio of the second additive element needs to be less than 3 wt. %. Further, when the composition ratio of Pd reaches 31 wt. % as shown in Comparative Example 7-9, the melting point exceeds 800° C., so that the sample does not satisfy Condition A. However, if the composition ratio of Pd is less than 31 wt. %, any of the samples satisfies Condition A. Accordingly, in order to satisfy Condition A, the composition ratio of Pd needs to be less than 31 wt. %. Further, when the composition ratio of Ni reaches 16 wt. % as shown in Comparative Example 7-12, the melting point exceeds 800° C., so that the sample does not satisfy Condition A. However, if the composition ratio of Ni is less than 16 wt. %, any of the samples satisfies Condition A. Accordingly, in order to satisfy Condition A, the composition ratio of Ni is only required to be less than 16 wt. %, and is preferably not more than about 15 wt. %.

Condition B)

Only the sample of Comparative Example 7-8 is insufficient and the other samples are excellent in corrosion resistance. The sample shown in Comparative Example 7-8 has a composition ratio of Ag at 47 wt. %, and any of the other samples has a composition ratio of Ag at less than 47 wt. %. Accordingly, Condition B is satisfied when the composition ratio of Ag is less than 47 wt. %.

Condition C)

The samples satisfying both the aforementioned Conditions A and B have joining strengths of 640 MPa even at the minimum, and any of them exhibited a value better than those of the conventional brazing filler metals. Accordingly, the samples satisfying both the aforementioned Conditions A and B satisfy Condition C. The Au—Ag—Cu—Pd—Ni based brazing filler metal is better than each of the first, fifth and sixth brazing filler metals in joining strength. It can be said that this results from the addition of Ni.

On the other hand, in both cases where the composition ratio of Au is 35 wt. % as shown in Comparative Example 7-5 and where the composition ratio of Ag is 6 wt. % as shown in Comparative Example 7-7, any of the samples is insufficient in wettability against stainless steel. Therefore, even when the aforementioned Conditions A and B are satisfied, it is preferable that the composition ratio of Au is more than 35 wt. %, and the composition ratio of Ag is more than 6 wt. %.

From Examples 7-1 to 7-14, in order to improve the wettability against stainless steel, it is preferable to satisfy the following two conditions. It can be said that the improvement in wettability results from the effect of lowering the melting point by the second additive element.

The composition ratio of Au is in a range of about 36 to about 73 wt. %.

The composition ratio of Ag is in a range of about 7 to about 46 wt. %.

As described in the foregoing, the Au—Ag—Cu—Pd—Ni based brazing filler metal becomes a brazing filler metal satisfying all of the three requirements, that is, enabling low temperature joining and securing excellent corrosion resistance and sufficient joining strength, provided that the composition ratios of the first and second additive elements, Au, Pd, and Ni fall within the ranges satisfying Condition A, and the composition ratio of Ag falls within the range satisfying Condition B. Furthermore, provided that the composition ratios of Au and Ag are respectively within the above-described ranges for excellent wettability against stainless steel, the Au—Ag—Cu—Pd—Ni based brazing filler metal is improved in wettability against stainless steel. In this case, the brazing filler metal spreads extensively on the surfaces of the stainless steel members, thus facilitating the joining work, and, as a result, the brazing filler metal becomes more preferable.

Since there is a conceivable composition of the Au—Ag—Cu—Pd—Ni based brazing filler metal utilizing a eutectic of Ag—Cu and the above-described eutectic of additive element, it can be reasoned that this brazing filler metal is lowered in temperature due to the formation of these eutectics. Furthermore, Ag or Pd might form a eutectic composition with the first additive element (for example, Ge). Further, since Mn or Li being the second additive element has the effect of lowering the melting point, it is reasoned that the melting point of the Au—Ag—Cu—Pd—Ni based brazing filler metal is lowered due to the addition of the second additive element. Therefore, the respective composition ratios of Au, Ag, Cu, Pd, and Ni, and the first and second additive elements, composing the Au—Ag—Cu—Pd—Ni based brazing filler metal have ranges required for obtaining the brazing filler metal as the object of the invention, and it is reasoned that the composition ratios fall within the ranges found from the results of the tests shown in Tables 14 and 15 described above.

To sum up, it is reasoned that the Au—Ag—Cu—Pd—Ni based brazing filler metal according to the invention is turned into a brazing filler metal which is capable of low temperature joining and is excellent both in joining strength and corrosion resistance, utilizing the eutectic of Ag—Cu and the eutectics of additive elements, provided that the same satisfies all of the following conditions 41) to 46).

Condition 41) The total composition ratio of at least one kind of element of the first additive element is in a range of more than 1 wt. % to less than 35 wt. %.

Condition 42) The composition ratio of Au is less than 74 wt. %.

Condition 43) The total composition ratio of the second additive element is less than 3 wt. %.

Condition 44) The composition ratio of Pd is less than 31 wt. %.

Condition 45) The composition ratio of Ni is less than 16 wt. %.

Condition 46) The composition ratio of Ag is less than 47 wt. %.

Further, the Au—Ag—Cu—Pd—Ni based brazing filler metal even with the above composition can be improved in wettability against stainless steel, provided that the same satisfies both the following conditions 47) and 48).

Condition 47) The composition ratio of Au is more than 35 wt. %.

Condition 48) The composition ratio of Ag is more than 6 wt. %.

Furthermore, the Au—Ag—Cu—Pd—Ni based brazing filler metal can be further improved in wettability against stainless steel, provided that the same satisfies both the following conditions 49) and 50).

Condition 49) The composition ratio of Au is in a range of about 36 to about 73 wt. %.

Condition 50) The composition ratio of Ag is in a range of about 7 to about 46 wt. %.

(Eighth Brazing Filler Metal)

Subsequently, a Au—Ag—Cu—Pd—Ge based brazing filler metal which is an eighth brazing filler metal according to the invention is described hereinafter. This brazing filler metal is composed of elements Au, Ag, Cu, Pd having homogeneous solubility with Au, Ag, and Cu added thereto, and Ge added thereto, and is thus produced by limiting the first additive element of the above-described fifth brazing filler metal only to one kind of element Ge. This eighth brazing filler metal is also different in element but is produced by the same method as that of the first brazing filler metal.

Nine samples being Examples numbered from 8-1 to 8-9 shown in Table 16 and 7 samples being Comparative Examples numbered from 8-1 to 8-7, 16 samples, in total, of different Au—Ag—Cu—Pd—Ge based brazing filler metals, were prepared by varying a composition ratio (wt. %) of each of Au, Ag, Cu, Pd, and Ge as appropriate. The respective prepared samples were examined, similarly to the second brazing filler metal, on the two items, a) melting point and c) wettability against SUS316L. The samples of Examples 8-7 to 8-9 and Comparative Examples 8-5 and 8-6 were examined on the other four items b), d), e), and f). The results thereof are as shown in Table 17. It should be noted that the indication of "Example" and "Comparative Example" is the same as that of the first brazing filler metal. The e) joining strength and f) corrosion resistance are checked in the same manner as that of the first brazing filler metal.

As shown in Table 16, the melting points of the brazing filler metals of Examples 8-1 to 8-9 are 740° C. (Example 8-3) even at the maximum, and the melting point of any of the samples is thus not higher than 800° C. The melting points of the brazing filler metals of Comparative Examples 8-1 to 8-4 and 8-7, however, exceed 800° C. Regarding the wettability against SUS316L, while the samples of Examples 8-1 to 8-9 provided excellent results, the samples of Comparative Examples 8-1 to 8-5 provided just slightly good results which were not sufficient. Besides, as shown in Table 17, while the brazing temperature for the sample of Comparative Example 8-5 exceeded 800° C., that for any of the other samples was lower than 800° C. Crystal coarsening of SUS316L occurred in the sample of Comparative Example 8-5, and not in the other samples. The joining strengths of the samples were 730 MPa even at the minimum, and any of them was better than those of the conventional brazing filler metals. Regarding the corrosion resistance, any of the samples other than Comparative Example 8-6 exhibited an excellent result.

From the results shown in Tables 16 and 17, the conditions for the Au—Ag—Cu—Pd—Ge based brazing filler metal to satisfy the above-described three conditions A, B and C, are as follows:

Condition A)

Since Comparative Examples 8-1 to 8-4 and 8-7 and Examples 8-1 to 8-9 have common ranges of respective composition ratios of Au, Ag, and Cu, it is difficult to specify Condition A based only on the respective composition ratios of Au, Ag, and Cu.

Next, when the composition ratio of Ge is 4 wt. % and 26 wt. % as shown in Comparative Examples 8-1 and 8-2, the melting points exceed 800° C., so that samples thereof do not satisfy Condition A. However, if the composition ratio of Ge is in a range of more than 4 wt. % to less than 26 wt. % as shown in Example 8-1 to 8-9, the samples satisfy Condition A. Therefore, to satisfy Condition A, the composition ratio of Ge needs to be in a range of more than 4 wt. % to less than 26 wt. %. In this point of view, it can be said, particularly on the basis of values shown in Examples 8-1 to 8-9, that the composition ratio of Ge is preferably in a range of about 5 to about 25 wt. %. However, even if the composition ratio of Ge is within this range, when the composition ratio of Au reaches 28 wt. % as shown in Comparative Example 8-3 and when the composition ratio of Au reaches 76 wt. % as shown in Comparative Example 8-4, the melting points exceed 800° C., so that the samples do not satisfy Condition A. In contrast to this, when the composition ratio of Au is in a range of more than 28 wt. % to less than 76 wt. % as shown in Examples 8-1 to 8-9, the melting points become lower than 800° C., so that the samples satisfy Condition A. Accordingly, in order to satisfy Condition A, the composition ratio of Au needs to be in a range of more than 28 wt. % to less than 76 wt. %. Further, even if the composition ratio of Au is limited to this range, when the composition ratio of Pd reaches 36 wt. % as shown in Comparative Example 8-7, the sample does not satisfy Condition A. However, if the composition ratio of Pd is less than 36 wt. % as in Examples 8-1 to 8-9, the samples satisfy Condition A. Accordingly, in order to satisfy Condition A, the composition ratio of Pd is only required to be less than 36 wt. %, and is preferably not more than about 35 wt. %.

Condition B)

Only the sample of Comparative Example 8-6 is insufficient and the other samples are excellent in corrosion resistance. The sample shown in Comparative Example 8-6 has a composition ratio of Ag at 51 wt. %, and any of the other samples has a composition ratio of Ag at less than 51 wt. %. Accordingly, Condition B is satisfied when the composition ratio of Ag is less than 51 wt. %.

Condition C)

The samples satisfying both the aforementioned Conditions A and B have joining strengths of 730 MPa even at the minimum, and any of them exhibited a value better than those of the conventional brazing filler metals. Accordingly, the samples satisfying both the aforementioned Conditions A and B satisfy Condition C.

Further, even the samples satisfying Conditions A and B can be particularly improved in wettability against stainless steel, provided that Au and Ag satisfy both the following conditions as in Examples 8-4 to 8-9.

The composition ratio of Au is in a range of about 29 to about 75 wt. %.

The composition ratio of Ag is in a range of about 5 to about 50 wt. %.

As described in the foregoing, the Au—Ag—Cu—Pd—Ge based brazing filler metal becomes a brazing filler metal satisfying all of the three requirements, that is, enabling low temperature joining and securing excellent corrosion resistance and sufficient joining strength, provided that the composition ratios of Ge, Au, and Pd fall within the ranges satisfying Condition A, and the composition ratio of Ag falls within the range satisfying Condition B. Furthermore, provided that the composition ratios of Au and Ag are respectively within the above-described ranges for excellent wettability against stainless steel, the Au—Ag—Cu—Pd—Ge based brazing filler metal is improved in wettability against stainless steel. In particular, by adding Pd at a composition ratio of less than 35 wt. %, the color of the brazing filler metal preferably becomes silver gray.

Figure 16:
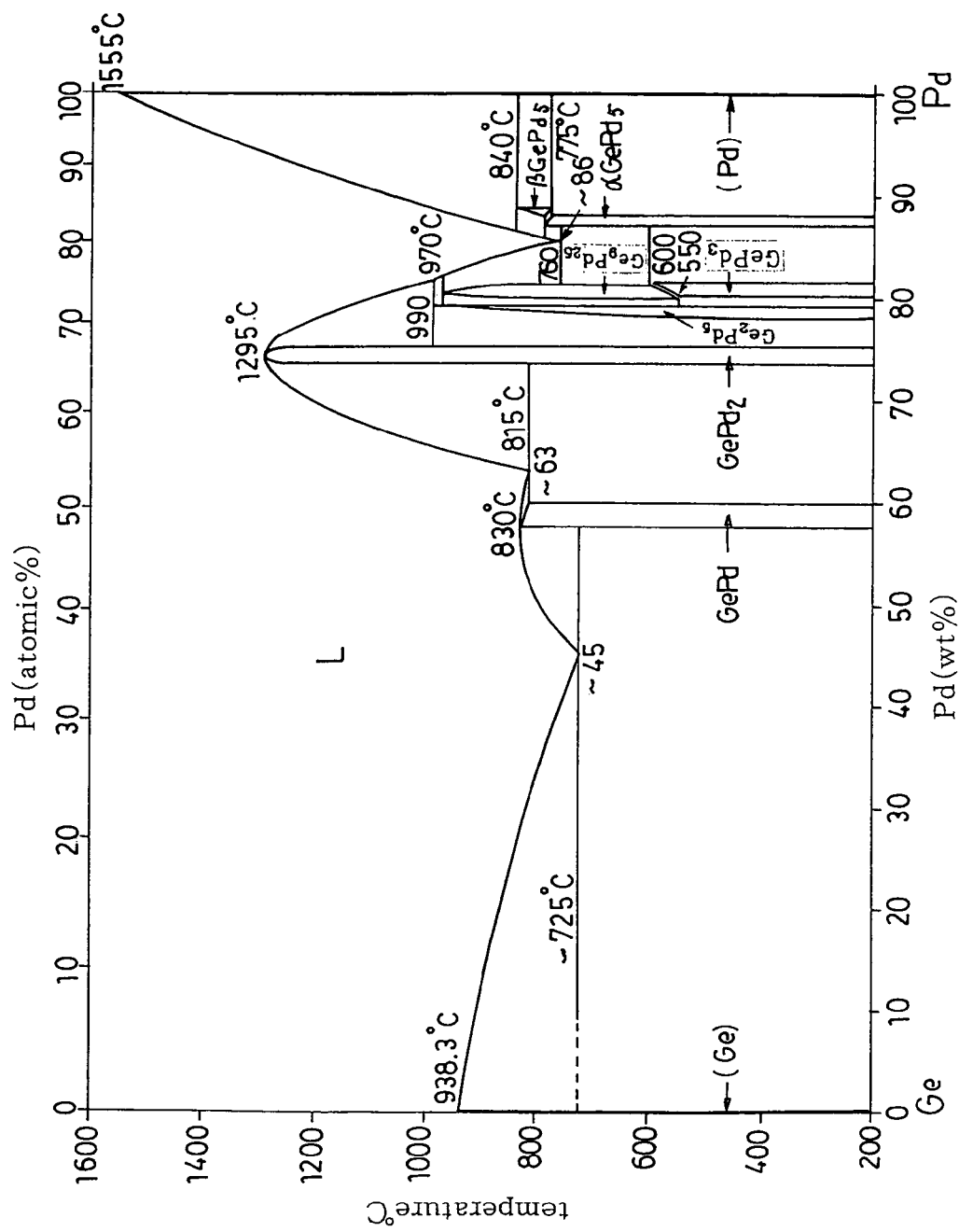
FIG. 16 is a phase diagram of a, binary system of Ge—Pd, the horizontal axis thereof showing a composition ratio of Pd to Ge while the vertical axis thereof showing a melting point.

Besides, the Au—Ag—Cu—Pd—Ge based brazing filler metal contains Pd and Ge. The melting point of a Pd—Ge alloy is gradually lowered from about 938° C. according as the composition ratio of Pd is increased as shown in FIG. 16. Upon the composition ratio of Pd reaching about 45 wt. %, the melting point reaches the lowest temperature of about 725° C. and thereafter repeatedly rises and falls twice, and upon the composition ratio of Pd reaching 100, the melting point reaches about 1555° C. There occurs a eutectic composition of the Pd—Ge alloy in this state where the melting point is at the lowest. A state of such a eutectic composition is designated as a eutectic of Pd—Ge. In this point of view, it is reasoned that the melting point of the Au—Ag—Cu—Pd—Ge based brazing filler metal is lowest when the same has a composition capable of utilizing the eutectic of Pd—Ge in addition to a eutectic of Ag—Cu, a eutectic of Au—Ge, a eutectic of Ag—Ge, and a eutectic of Cu—Ge, similarly to the second brazing filler metal. Therefore, the respective composition ratios of Au, Ag, Cu, Pd, and Ge, composing the Au—Ag—Cu—Pd—Ge based brazing filler metal, have respective ranges required for obtaining the brazing filler metal as the object of the invention, and it is reasoned that the respective composition ratios fall within the ranges found from the results of the tests shown in Tables 16 and 17 described above.

To sum up, it is reasoned that the Au—Ag—Cu—Pd—Ge based brazing filler metal according to the invention is turned into a brazing filler metal which is capable of low temperature joining and is excellent both in joining strength and corrosion resistance, utilizing five eutectics, that is, the eutectic of Ag—Cu, the eutectic of Au—Ge, the eutectic of Ag—Ge, the eutectic of Cu—Ge, and the eutectic of Pd—Ge, provided that the same satisfies all of the following conditions 51) to 54).

Condition 51) The composition ratio of Ge is in a range of more than 4 wt. % to less than 26 wt. %.

Condition 52) The composition ratio of Au is in a range of more than 28 wt. % to less than 76 wt. %.

Condition 53) The composition ratio of Pd is less than 36 wt. %.

Condition 54) The composition ratio of Ag is less than 51 wt. %.

Furthermore, the Au—Ag—Cu—Pd—Ge based brazing filler metal with the composition satisfying the above conditions can be improved in wettability against stainless steel, provided that the composition ratios of Au and Ag satisfy both the following conditions 55) and 56).

Condition 55) The composition ratio of Au is in a range of about 29 to about 75 wt. %.

Condition 56) The composition ratio of Ag is in a range of about 5 to about 50 wt. %.

(Ninth Brazing Filler Metal)

Subsequently, a Au—Ag—Cu—Pd—Si based brazing filler metal which is a ninth brazing filler metal according to the invention is described hereinafter. This brazing filler metal is composed of elements Au, Ag, Cu, Pd having homogeneous solubility with Au, Ag, and Cu added thereto, and Si added thereto, and is thus produced by limiting the first additive element of the above-described fifth brazing filler metal only to one kind of element Si. This ninth based brazing filler metal is also different in element but is produced by the same method as that of the first brazing filler metal.

Nine samples being Examples numbered from 9-1 to 9-9 shown in Table 18 and 7 samples being Comparative Examples numbered from 9-1 to 9-7, 16 samples, in total, of different Au—Ag—Cu—Pd—Si based brazing filler metals, were prepared by varying a composition ratio (wt. %) of each of Au, Ag, Cu, Pd, and Si as appropriate. The respective prepared samples were examined, similarly to the second brazing filler metal, on the two items, a) melting point and c) wettability against SUS316L. The samples of Examples 9-7 to 9-9 and two samples of Comparative Examples 9-5 and 9-6 were examined on the other four items b), d), e), and f). The results thereof are as shown in Table 19. It should be noted that the indication of "Example" and "Comparative Example" is the same as that of the first brazing filler metal. The e) joining strength and f) corrosion resistance are checked in the same manner as that of the first brazing filler metal.

As shown in Table 18, the melting points of the samples of Examples 9-1 to 9-9 are 746° C. (Example 9-1) even at the maximum, and the melting point of any of the samples is thus not higher than 800° C. The melting points of the samples of Comparative Examples 9-1 to 9-5 and 9-7, however, exceed 800° C. Regarding the wettability against SUS316L, while the samples of Examples 9-1 to 9-9 provided excellent results, the samples of Comparative Examples 9-1 to 95 provided just slightly good results which were not sufficient. Besides, as shown in Table 19, while the brazing temperature for the sample of Comparative Example 9-5 exceeded 800° C., that for any of the other samples was lower than 800° C. Crystal coarsening of SUS316L occurred in the sample of Comparative Example 9-5, and not in the other samples. The joining strengths of the samples were 760 MPa even at the minimum, and any of them was better than those of the conventional brazing filler metals. Regarding the corrosion resistance, any of the samples other than Comparative Example 9-6 exhibited an excellent result.

From the results shown in Tables 18 and 19, the conditions for the Au—Ag—Cu—Pd—Si based brazing filler metal to satisfy the above-described three conditions A, B and C, are as follows:

Condition A)

Since Comparative Examples 9-1 to 9-5 and 9-7 and Examples 9-1 to 9-9 have common ranges of respective composition ratios of Au, Ag, and Cu, it is difficult to specify Condition A based only on the respective composition ratios of Au, Ag, and Cu.

Next, when the composition ratio of Si is 0.9 wt. % and 17 wt. % as shown in Comparative Examples 9-1 and 9-2, the melting points exceed 800° C., so that samples thereof do not satisfy Condition A. However, any of samples satisfying Condition A as shown in Example 9-1 to 9-9 has a composition ratio of Si which is in a range of more than 0.9 wt. % to less than 17 wt. %. Therefore, to satisfy Condition A, the composition ratio of Si needs to be in a range of more than 0.9 wt. % to less than 17 wt. %. In this point of view, it can be said, particularly on the basis of values shown in Examples 9-1 to 9-3, that the composition ratio of Si is preferably in a range of about 1 to about 16 wt. %. However, even if the composition ratio of Si is within this range, when the composition ratio of Au reaches 30 wt. % as shown in Comparative Example 9-3 and when the composition ratio of Au reaches 72 wt. % as shown in Comparative Example 9-4, the melting points exceed 800° C., so that the samples do not satisfy Condition A. In contrast to this, when the composition ratio of Au is in a range of more than 30 wt. % to less than 72 wt. % as shown in Examples 9-1 to 9-9, the melting points become lower than 800° C., so that the samples satisfy Condition A. Accordingly, in order to satisfy Condition A, the composition ratio of Au needs to be in a range of more than 30 wt. % to less than 72 wt. %. Further, even if the composition ratio of Au is limited to this range, when the composition ratio of Pd reaches 38 wt. % as shown in Comparative Example 9-7, the sample does not satisfy Condition A. However, if the composition ratio of Pd is less than 38 wt. % as in Examples 9-1 to 9-9, the samples satisfy Condition A. Accordingly, in order to satisfy Condition A, the composition ratio of Pd needs to be less than 38 wt. %. Further, when the composition ratio of Ag reaches 2 wt. % as shown in Comparative Example 9-5, the sample does not satisfy Condition A. However, if the composition ratio of Ag is more than 2 wt. % as in Examples 9-1 to 9-9, the samples satisfy Condition A. Accordingly, in order to satisfy Condition A, the composition ratio of Ag is only required to be more than 2 wt. %, and is preferably not less than about 3 wt. %.

Condition B)

Only the sample of Comparative Example 9-6 is insufficient and the other samples are excellent in corrosion resistance. The sample shown in Comparative Example 9-6 has a composition ratio of Ag at 34 wt. %, and any of the other samples has a composition ratio of Ag at less than 34 wt. %. Accordingly, Condition B is satisfied when the composition ratio of Ag is less than 34 wt. %.

Condition C)

The samples satisfying both the aforementioned Conditions A and B have joining strengths of 780 MPa even at the minimum, and any of them exhibited a value better than those of the conventional brazing filler metals. Accordingly, the samples satisfying both the aforementioned Conditions A and B satisfy Condition C.

Further, even the samples satisfying Conditions A and B can be particularly improved in wettability against stainless steel, provided that Au, Ag, and Pd satisfy all of the following conditions as in Examples 9-4 to 9-9.

The composition ratio of Au is in a range of about 40 to about 71 wt. %.

The composition ratio of Ag is in a range of about 3 to about 32 wt. %.

The composition ratio of Pd is in a range of about 5 to about 37 wt. %.

As described in the foregoing, the Au—Ag—Cu—Pd—Si based brazing filler metal becomes a brazing filler metal satisfying all of the three requirements, that is, enabling low temperature joining and securing excellent corrosion resistance and sufficient joining strength, provided that the composition ratios of Si, Au, Pd, and Ag fall within the ranges satisfying Condition A, and the composition ratio of Ag falls within the range satisfying Condition B. In particular, by adding Pd at a composition ratio of less than 38 wt. %, the color of the brazing filler metal preferably becomes silver gray.

Besides, it is reasoned that since the ninth brazing filler metal is produced by adding Pd and Si to Au—Ag—Cu, the melting point of the ninth brazing filler metal is lowered when the same has a composition utilizing three eutectics, that is, a eutectic of Ag—Cu, a eutectic of Au—Si, and a eutectic of Ag—Si, similarly to the third brazing filler metal. Therefore, the respective composition ratios of Au, Ag, Cu, Pd, and Si, composing the Au—Ag—Cu—Pd—Si based brazing filler metal, have respective ranges required for obtaining the brazing filler metal as the object of the invention, and it is reasoned that the respective composition ratios fall within the ranges found from the results of the tests shown in Tables 18 and 19 described above.

To sum up, it is reasoned that the Au—Ag—Cu—Pd—Si based brazing filler metal according to the invention is turned into a brazing filler metal which is capable of low temperature joining and is excellent both in joining strength and corrosion resistance, utilizing the three eutectics, that is, the eutectic of Ag—Cu, the eutectic of Au—Si, and the eutectic of Ag—Si, provided that the same satisfies the following conditions 57) to 60).

Condition 57) The composition ratio of Si is in a range of more than 0.9 wt. % to less than 17 wt. %.

Condition 58) The composition ratio of Au is in a range of more than 30 wt. % to less than 72 wt. %.

Condition 59) The composition ratio of Pd is less than 38 wt. %.

Condition 60) The composition ratio of Ag is in a range of more than 2 wt. % to less than 34 wt. %.

Furthermore, the Au—Ag—Cu—Pd—Si based brazing filler metal with the composition satisfying the above conditions can be improved in wettability against stainless steel, provided that the composition ratios of Au, Ag, and Pd satisfying all of the following conditions 61) and 63)).

Condition 61) The composition ratio of Au is in a range of about 40 to about 71 wt. %.

Condition 62) The composition ratio of Ag is in a range of about 3 to about 32 wt. %.

Condition 63) The composition ratio of Pd is in a range of about 5 to about 37 wt. %.

(Tenth Brazing Filler Metal)

Subsequently, a Au—Ag—Cu—Pd—Ge—Si—Sn based brazing filler metal which is a tenth brazing filler metal according to the invention is described hereinafter. This brazing filler metal is composed of Au, Ag, Cu, Pd, and at least one kind of element out of Ge, Si, and Sn added thereto, and is thus produced by limiting the first additive element of the above-described fifth brazing filler metal to the three kinds of elements Ge, Si, and Sn. The tenth brazing filler metal is also different in element but is produced by the same method as that of the first brazing filler metal.

Twenty-seven samples being Examples numbered from 10-1 to 10-27 shown in Table 20 and 12 samples being Comparative Examples numbered from 10-1 to 10-12 shown in Table 21, 39 samples, in total, of different Au—Ag—Cu—Pd—Ge—Si—Sn based brazing filler metals, were prepared by varying a composition ratio (wt. %) of each of Au, Ag, Cu, Pd, Ge, Si, and Sn as appropriate. The respective prepared samples were examined in properties on the selected six items which are the same as those of the first brazing filler metal. It should be noted that the indication of "Example" and "Comparative Example" is the same as that of the first brazing filler metal. The e) joining strength and f) corrosion resistance are checked in the same manner as that of the first brazing filler metal.

As shown in Tables 20 and 21, the melting points of the samples of Examples 10-1 to 10-27 are 743° C. (Examples 10-3 and 10-27) even at the maximum, and the melting point of any of the samples is thus not higher than 800° C. The melting points of the samples of Comparative Examples 10-1 to 107, 10-9, and 10-12, however, exceed 800° C. Regarding the wettability against SUS316L, while the samples of Examples 10-1 to 10-27 provided excellent results, the samples of Comparative Examples 10-1 to 10-12 and 10-12 provided just slightly good results which were not sufficient. Besides, the brazing temperature for any of the samples of Examples 10-1 to 10-27 was lower than 800° C. Crystal coarsening of SUS316L occurred in the samples of Comparative Examples 10-1 to 10-7, 10-9, and 10-12, and not in the other samples. The joining strengths of the samples were 590 MPa even at the minimum, and any of them was better than those of the conventional brazing filler metals. Regarding the corrosion resistance, any of the samples other than Comparative Example 10-11 exhibited an excellent result.

From the results shown in Tables 20 and 21, the conditions for the Au—Ag—Cu—Pd—Ge—Si—Sn based brazing filler metal to satisfy the above-described three conditions A, B and C, are as follows:

Condition A)

Since Comparative Examples 10-1 to 10-7, 10-9, and 10-12 and Examples 10-1 to 10-27 have common ranges of respective composition ratios of Au, Ag, and Cu, it is difficult to specify Condition A based only on the respective composition ratios of Au, Ag, and Cu.

Next, when the total composition ratio of Ge, Si, and Sn is no more than 1 wt. % and when it is 38 wt. % and 39 wt. % as shown in Comparative Examples 10-1 to 10-7, the melting points exceed 800° C., so that samples thereof do not satisfy Condition A. However, any of samples satisfying Condition A as shown in Example 10-1 to 10-27 has a total composition ratio of Ge, Si, and Sn which is in a range of more than 1 wt. % to less than 38 wt. %. In this point of view, it can be said, particularly on the basis of values shown in Examples 10-1 to 10-27, that the total composition ratio of the Ge, Si, and Sn is preferably in a range of about 2 to about 37 wt. %. Further, even if the total composition ratio of Ge, Si, and Sn is within this range, when the composition ratio of Au reaches 83 wt. % as shown in Comparative Example 10-9, the melting point exceeds 800° C., so that the sample does not satisfy Condition A. In contrast to this, when the composition ratio of Au is less than 83 wt. % as shown in Examples 10-1 to 10-27, any of the samples satisfies Condition A. Accordingly, in order to satisfy Condition A, the composition ratio of Au is only required to be less than 83 wt. %. Further, even if the composition ratio of Au is within this range, when the composition ratio of Pd reaches 35 wt. % as shown in Comparative Example 10-12, the sample does not satisfy Condition A. In contrast to this, when the composition ratio of Pd is less than 35 wt. % as shown in Examples 10-1 to 10-27, any of the samples satisfies Condition A. Accordingly, in order to satisfy Condition A, the composition ratio of Pd is only required to be less than 35 wt. %, and is preferably not more than about 34 wt. %.

Condition B)

Only the sample of Comparative Example 10-11 is insufficient and the other samples are excellent in corrosion resistance. The sample shown in Comparative Example 10-11 has a composition ratio of Ag at 49 wt. %, and any of the other samples has a composition ratio of Ag at less than 49 wt. %. Accordingly, Condition B is satisfied when the composition ratio of Ag is less than 49 wt. %.

Condition C)

The samples satisfying both the aforementioned Conditions A and B have joining strengths of 590 MPa even at the minimum, and any of them exhibited a value better than those of the conventional brazing filler metals. Accordingly, the samples satisfying both the aforementioned Conditions A and B satisfy Condition C.

In consideration that the samples of Examples 10-24 and 10-25 are very excellent in wettability against stainless steel, it is preferable that at least one of Au and Ag satisfies the following conditions.

The composition ratio of Au is in a range of about 53 to about 56 wt. %.

The composition ratio of Ag is in a range of about 5 to about 18 wt. %.

As described in the foregoing, the Au—Ag—Cu—Pd—Ge—Si—Sn based brazing filler metal becomes a brazing filler metal satisfying all of the three requirements, that is, enabling low temperature joining and securing excellent corrosion resistance and sufficient joining strength, provided that the total composition ratio of Ge, Si, and Sn, and the composition ratios of Au and Pd fall within the ranges satisfying Condition A, and the composition ratio of Ag falls within the range satisfying Condition B. Furthermore, provided that the composition ratio of at least one of Au and Ag is within the above-described range for excellent wettability against stainless steel, the Au—Ag—Cu—Pd—Ge—Si—Sn based brazing filler metal is improved in wettability against stainless steel.

It is reasoned that since the Au—Ag—Cu—Pd—Ge—Si—Sn based brazing filler metal is produced by adding Ge, Si, and Sn to Au—Ag—Cu—Pd, the melting point of the Au—Ag—Cu—Pd—Ge—Si—Sn based brazing filler metal is lowest when the same has a composition utilizing any of five eutectics, that is, a eutectic of Ag—Cu, a eutectic of Au—Ge, a eutectic of Ag—Ge, a eutectic of Cu—Ge, and a eutectic of Pd—Ge, similarly to the eighth brazing filler metal, and additionally utilizing any of four eutectics, that is, a eutectic of Au—Si, a eutectic of Au—Sn, a eutectic of Ag—Si, and a eutectic of Ag—Sn. Therefore, the respective composition ratios of Au, Ag, Cu, Pd, Ge, Si, and Sn, composing this brazing filler metal, have respective ranges required for obtaining the brazing filler metal as the object of the invention, and it is reasoned that the respective composition ratios fall within the ranges found from the results of the tests shown in Tables 20 and 21 described above.

To sum up, it is reasoned that the Au—Ag—Cu—Pd—Ge—Si—Sn based brazing filler metal according to the invention is turned into a brazing filler metal which is capable of low temperature joining and is excellent both in joining strength and corrosion resistance, utilizing nine eutectics, that is, the eutectic of Ag—Cu, the eutectic of Au—Ge, the eutectic of Ag—Ge, the eutectic of Cu—Ge, the eutectic of Pd—Ge, the eutectic of Au—Si, the eutectic of Au—Sn, the eutectic of Ag—Si, and the eutectic of Ag—Sn, provided that the same satisfies all of the following conditions 64) to 67).

Condition 64) The total composition ratio of Ge, Si, and Sn is in a range of more than 1 wt. % to less than 38 wt. %.

Condition 65) The composition ratio of Au is less than 83 wt. %.

Condition 66) The composition ratio of Pd is less than 35 wt. %.

Condition 67) The composition ratio of Ag is less than 49 wt. %.

Furthermore, the Au—Ag—Cu—Pd—Ge—Si—Sn based brazing filler metal can be improved in wettability against stainless steel, provided that the same satisfies the following conditions 68) or 69).

Condition 68) The composition ratio of Au is in a range of about 53 to about 56 wt. %.

Condition 69) The composition ratio of Ag is in a range of about 5 to about 18 wt. %.

(Eleventh Brazing Filler Metal)

Subsequently, a Au—Ag—Cu—Pd—Ge—Si—Sn—Ni based brazing filler metal which is an eleventh brazing filler metal according to the invention is described hereinafter. This brazing filler metal is composed of Au, Ag, Cu, Pd, at least one kind of element out of Ge, Si, and Sn added thereto, and Ni added thereto. The eleventh brazing filler metal is also different in element but is produced by the same method as that of the first brazing filler metal.

Twenty-eight samples being Examples numbered from 11-1 to 11-28, shown in Table 22 and 13 samples being Comparative Examples numbered from 11-1 to 11-13 shown in Table 23, 41 samples, in total, of different Au—Ag—Cu—Pd—Ge—Si—Sn—Ni based brazing filler metals, were prepared by varying a composition ratio (wt. %) of each of Au, Ag, Cu, Pd, Ge, Si, Sn, and Ni as appropriate. The respective prepared samples were examined in properties on the selected six items which are the same as those of the first brazing filler metal. It should be noted that the indication of "Example" and "Comparative Example" is the same as that of the first brazing filler metal. The e) joining strength and f) corrosion resistance are checked in the same manner as that of the first brazing filler metal.

As shown in Tables 22 and 23, the melting points of the samples of Examples 11-1 to 11-28 are 753° C. (Example 11-15) even at the maximum, and the melting point of any of the samples is thus not higher than 800° C. The melting points of the samples of Comparative Examples 11-1 to 11-7, 11-9, 11-12, and 11-13, however, exceed 800° C. Regarding the wettability against SUS316L, while the samples of Examples 11-1 to 11-28 provided excellent results, the samples of Comparative Examples other than Comparative Example 11-11 provided just slightly good results which were not sufficient. Besides, the brazing temperature for any of the samples of Examples 11-1 to 11-28 was lower than 800° C. Crystal coarsening of SUS316L occurred in the samples of Comparative Examples 11-1 to 11-7, 11-9, 11-12, and 11-13, and not in the other samples. The joining strengths of the samples were 680 MPa even at the minimum, and any of them was better than those of the conventional brazing filler metals. Regarding the corrosion resistance, any of the samples other than Comparative Example 11-11 exhibited an excellent result.

From the results shown in Tables 22 and 23, the conditions for the Au—Ag—Cu—Pd—Ge—Si—Sn—Ni based brazing filler metal to satisfy the above-described three conditions A, B and C, are as follows:

Condition A)

Since Comparative Examples 11-1 to 11-7, 11-9, 11-12, and 11-13 and Examples 11-1 to 11-28 have common ranges of respective composition ratios of Au, Ag, and Cu, it is difficult to specify Condition A based only on the respective composition ratios of Au, Ag, and Cu.

Next, when the total composition ratio of Ge, Si, and Sn is no more than 1 wt. % and when it is 37 wt. % as shown in Comparative Examples 11-1 to 117, the melting points exceed 800° C., so that samples thereof do not satisfy Condition A. However, any of samples satisfying Condition A as shown in Example 11-1 to 11-28 has a total composition ratio of Ge, Si, and Sn which is in a range of more than 1 wt. % to less than 37 wt. %. Accordingly, in order to satisfy Condition A, the total composition ratio of Ge, Si, and Sn needs to be in a range of more than 1 wt. % to less than 37 wt. %. In this point of view, it can be said, particularly on the basis of values shown in Examples 11-1 to 11-28, that the total composition ratio of the Ge, Si, and Sn is preferably in a range of about 2 to about 36 wt. %. However, even if the total composition ratio of Ge, Si, and Sn is within this range, when the composition ratio of Au reaches 74 wt. % as shown in Comparative Example 11-9, the melting point exceeds 800° C., so that the sample does not satisfy Condition A. In contrast to this, when the composition ratio of Au is less than 74 wt. % as shown in Examples 11-1 to 11-28, any of the samples satisfies Condition A. Accordingly, in order to satisfy Condition A, the composition ratio of Au is only required to be less than 74 wt. %. Further, even if the composition ratio of Au is within this range, when the composition ratio of Pd reaches 27 wt. % as shown in Example 11-12, the sample does not satisfy Condition A. In contrast to this, when the composition ratio of Pd is less than 27 wt. % as shown in Examples 11-1 to 11-28, any of the samples satisfies Condition A. Accordingly, in order to satisfy Condition A, the composition ratio of Pd needs to be less than 27 wt. %. Further, even if the composition ratio of Pd is within this range, when the composition ratio of Ni reaches 18 wt. % as shown in Comparative Example 11-13, the sample does not satisfy Condition A. In contrast to this, when the composition ratio of Ni is less than 18 wt. % as shown in Examples 11-1 to 11-28, any of the samples satisfies Condition A.

Condition B)

Only the sample of Comparative Example 11-11 is insufficient and the other samples are excellent in corrosion resistance. The sample shown in Comparative Example 11-11 has a composition ratio of Ag at 47 wt. %, and any of the other samples has a composition ratio of Ag at less than 47 wt. %.

Accordingly, Condition B is satisfied when the composition ratio of Ag is less than 47 wt. %.

Condition C)

The samples satisfying both the aforementioned Conditions A and B have joining strengths of 680 MPa even at the minimum, and any of them exhibited a value better than those of the conventional brazing filler metals. Accordingly, the samples satisfying both the aforementioned Conditions A and B satisfy Condition C. The Au—Ag—Cu—Pd—Ge—Si—Sn—Ni based brazing filler metal is excellent in joining strength than the respective tenth brazing filler metals. It is reasoned that this results from the addition of Ni.

In consideration that the samples of Examples 11-24 and 11-25 are excellent in wettability against stainless steel, it is preferable that Au and Ag satisfy the following conditions.

The composition ratio of Au is in a range of about 52 to about 54 wt. %.

The composition ratio of Ag is in a range of about 5 to about 19 wt. %.

As described in the foregoing, the Au—Ag—Cu—Pd—Ge—Si—Sn—Ni based brazing filler metal becomes a brazing filler metal satisfying all of the three requirements, that is, enabling low temperature joining and securing excellent corrosion resistance and sufficient joining strength, provided that the total composition ratio of Ge, Si, and Sn, and the composition ratios of Au, Pd, and Ni fall within the ranges satisfying Condition A, and the composition ratio of Ag falls within the range satisfying Condition B. Furthermore, provided that the composition ratios of Au and Ag are respectively within the above-described ranges for excellent wettability against stainless steel, the Au—Ag—Cu—Pd—Ge—Si—Sn—Ni based brazing filler metal is improved in wettability against stainless steel.

It is reasoned that the melting point of the Au—Ag—Cu—Pd—Ge—Si—Sn—Ni based brazing filler metal is lowered when the same has a composition utilizing, similarly to the tenth brazing filler metal, any of nine eutectics, that is, a eutectic of Ag—Cu, a eutectic of Au—Ge, a eutectic of Ag—Ge, a eutectic of Cu—Ge, a eutectic of Pd—Ge, a eutectic of Au—Si, a eutectic of Au—Sn, a eutectic of Ag—Si, and a eutectic of Ag—Sn. Therefore, the respective composition ratios of Au, Ag, Cu, Pd, Ge, Si, Sn, and Ni, composing this brazing filler metal, have respective ranges required for obtaining the brazing filler metal as the object of the invention, and it is reasoned that the respective composition ratios fall within the ranges found from the results of the tests shown in Tables 22 and 23 described above.

To sum up, it is reasoned that the Au—Ag—Cu—Pd—Ge—Si—Sn—Ni based brazing filler metal according to the invention is turned into a brazing filler metal which is capable of low temperature joining and is excellent both in joining strength and corrosion resistance, utilizing nine eutectics, that is, the eutectic of Ag—Cu, the eutectic of Au—Ge, the eutectic of Ag—Ge, the eutectic of Cu—Ge, the eutectic of Pd—Ge, the eutectic of Au—Si, the eutectic of Au—Sn, the eutectic of Ag—Si, and the eutectic of Ag—Sn, provided that the same satisfies the following conditions 70) to 74).

Condition 70) The total composition ratio of Ge, Si, and Sn is in a range of more than 1 wt. % to less than 37 wt. %.

Condition 71) The composition ratio of Au is less than 74 wt. %.

Condition 72) The composition ratio of Pd is less than 27 wt. %.

Condition 73) The composition ratio of Ni is less than 18 wt. %.

Condition 74) The composition ratio of Ag is less than 47 wt. %.

Furthermore, the Au—Ag—Cu—Pd—Ge—Si—Sn—Ni based brazing filler metal can be a preferable brazing filler metal having improved wettability against stainless steel, provided that the same satisfies both the following conditions 75) and 76).

Condition 75) The composition ratio of Au is in a range of about 52 to about 54 wt. %.

Condition 76) The composition ratio of Ag is in a range of about 5 to about 19 wt. %.

(Joining of Components to a Case with the Brazing Filler Metal)

Now, with a case which is an exterior component of a timepiece, description is given hereinafter on a case of joining watch appearance portions thereof to a case body with the brazing filler metals according to the invention.

FIG. 1 is a perspective view showing a case 2 fabricated by joining 4 pieces of the watch appearance portions 3, 5, 7, and 9 to a case body 1 with the brazing filler metal according to the invention. The case body 1 comprises a sidewall made of stainless steel, formed in the shape of a cylinder thin in wall thickness, and a bottom made of stainless steel, and is polished so as to have a mirror-finished surface including contacting surfaces thereof, opposite to the watch appearance portions. Each of the watch appearance portions 3, 5, 7, and 9, made of stainless steel, is formed by applying grinding and polishing thereto, and the outside surface thereof except a contacting surface with the case body 1, is polished so as to have a hairline finished surface. Further, each of the watch appearance portions 3, 5, 7, and 9 is worked on beforehand for drilling an end-piece hole 11 therein. The case body 1 and the watch appearance portions 3, 5, 7, and 9 are formed by forging, respectively.

Figure 2:
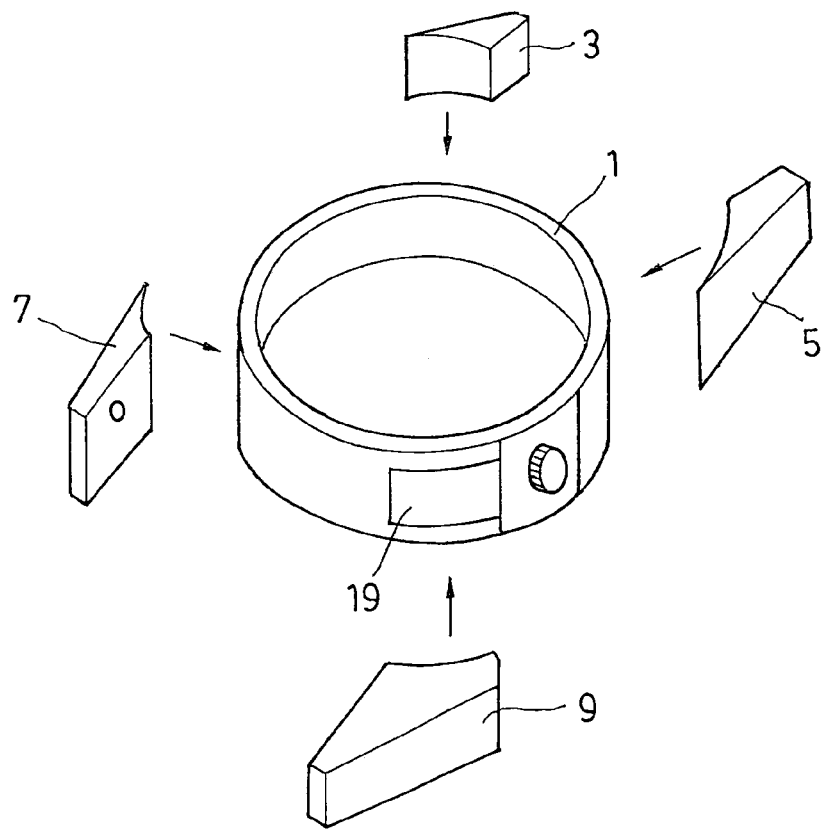
FIG. 2 is a disassembly view showing the case body and the four pieces of the watch appearance portions before joining the four pieces of the watch appearance portions to the case body.

As shown in FIG. 2, a brazing filler metal 19 according to the invention was sandwiched between the faying surface of the case body 1 and that of the respective watch-appearance portions 3, 5, 7, and 9, and was pressed into contact with the respective contacting surfaces before secured by tools (not shown). Thereafter, the case body 1 and respective watch appearance portions 3, 5, 7, and 9 were heated to a temperature at about 650 to about 700° C. in a hydrogen reducing atmosphere for 20 minutes, and subsequently, were rapidly cooled. The working of joining was conducted using the above-described first to eleventh brazing filler metals for the brazing filler metal 19 to fabricate cases 2 with the first to eleventh brazing filler metals respectively. For example, the sample of Example 7-8 (Au at 50 wt. %, Ag at 9 wt. %, Cu at 9 wt. %, In at 8 wt. %, Si at 7 wt. %, Pd at 7 wt. %, Mn at 1 wt. %, Li at 1 wt. %, and Ni at 8 wt. %) was used as the seventh brazing filler metal, and the sample of Example 8-7 (Au at 56 wt. %, Ag at 22 wt. %, Cu at 5 wt. %, Pd at 5 wt. %, and Ge at 12 wt. %) was used as the eighth brazing filler metal. Further, the sample of Example 11-24 (Au at 54 wt. %, Ag at 5 wt. %, Cu at 6 wt. %, Ge at 7 wt. %, Si at 3 wt. %, Sn at 9 wt. %, Pd at 6 wt. %, and Ni at 10 wt. %) was used as the eleventh brazing filler metal.

As a result, there occurred full penetration of the brazing filler metal 19 into joined portions between the case body 1 and the respective watch appearance portions 3, 5, 7 and 9, whereupon the case 2 wherein the case body 1 was found fully integral with the respective watch appearance portions 3, 5, 7, and 9 in the external appearance was obtained. With the case 2, a temperature at which the same was heated was not higher than the crystal coarsening temperature of the base metals (800° C.), and consequently, the surface condition of the components thereof, prior to joining, was found maintained without causing the crystal structure of stainless steel to be coarsened, thereby forming clean interfaces between the case body 1 and the respective watch appearance portions 3, 5, 7 and 9. Furthermore, the joined potions therebetween were able to have a sufficient tensile strength (joining strength).

As described in the foregoing, if the metallic articles, that is, the case body 1 and the respective watch appearance portions 3, 5, 7 and 9, are joined with each other by use of the brazing filler metal according to the invention, both the metallic articles can be joined together in a preferable condition.

Meanwhile, in view of recent demand for expanding flexibility in designing, there has been increasing requirement that a case body and respective watch appearance portions are to be fabricated separately, and finished in a different surface condition, respectively. For example, the case body is to be finished so as to have a mirror-finished surface while the respective watch appearance portions are to be finished so as to have a hairline finished surface. However, since a conventional case has been fabricated as an integrally formed component comprising the respective watch appearance portions to be linked with a bracelet, the conventional case has problems as follows:

First, the interface between case body and watch appearance portion of the case is continuous surface by the integral formation thereof, it has been difficult to definitely identify the interfaces between the case body to be finished to have the mirror-finished surface, and the respective watch appearance portions to be finished to have the hairline finished surface. In the case of forming a single-piece case, it has an advantage in terms of cost to fabricate the same by forging, however, there is then a drawback in that the shape of the respective watch appearance portions is subject to considerable constraints in terms of designing.

Figure 5:
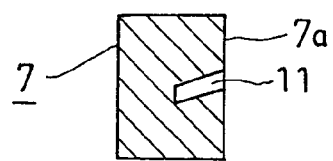
FIG. 5 is a sectional view of one of the watch appearance portions shown in FIG. 1, cut along a plane containing an end-piece hole.

On the other hand, the respective watch appearance portions needs to be provided with an end-piece hole for inserting a spring bar with which the bracelet is secured thereto, formed in a post-working process using a drill, and there has been no choice but to drill the end-piece hole from the inside of the respective watch appearance portions not to be seen from the outside for good external appearance of the case. The drilling of the end-piece hole from the inside of the respective watch appearance portions, however, has rendered a working for drilling the end-piece hole difficult to execute, and furthermore, the respective watch appearance portions, disposed opposite to each other, interfere with the working for drilling the end-piece hole, so that it has become impossible to form the end-piece hole 11 vertically to a work face 7a of the watch appearance portion 7, as shown in FIG. 5 by way of example, and consequently, there has been no choice but to form the same on the skew. For this-reason, there has arisen the need for forming the end-piece hole somewhat larger in size than the spring bar. This results in an excess clearance formed between the spring bar and the end-piece hole 11, and thereby creating a cause for the slack (rattle) of the spring bar.

As described hereinbefore, however, if the case body 1 is joined to the respective watch appearance portions 3, 5, 7, and 9 by use of the brazing filler metal according to the invention, it is possible to obtain the case 2 wherein both components thereof are found fully integral with each other in external appearance as well. This completely prevents occurrence of the problems as encountered with the conventional case even if the case body 1 and respective watch appearance portions 3, 5, 7, and 9 are fabricated separately and finished in different surface conditions, respectively.

The above-described first to eleventh brazing filler metals are described taking, as examples, brazing filler metals using Ag and Cu as metals having homogenously solubility with Au. In addition to Ag and Cu, Pt and Ni are also metals having homogenous solubility with Au, so that platinum (Pt) and Ni may be used in place of Ag and Cu.

In the above-described embodiments, since properties of the brazing filler metals are examined with stainless steel members set as base metals, the melting point not higher than 800° C. is set as the condition required for obtaining the brazing filler metal of the object of the invention. If a member made of a metal other than stainless steel is set as the base metal, its melting point is not necessarily limited to 800° C.

In the foregoing, a kind of metal suitable for satisfactory joining to the other of the same by use of the brazing filler metal according to the invention is stainless steel. The brazing filler metal according to the invention is, however, adequate for application to various metals of which decorativeness in external appearance is required, for example, titanium metal and a titanium alloy.

In addition, the brazing filler metal according to the invention has no limitation in its shape. Considering convenience in executing a joining work, the same is preferably produced in the shape of a sheet, foil, wire, and so forth. However, there can be cases where the brazing filler metal is accompanied by brittleness to some extent, depending on the chemical composition thereof. In this case the brazing filler metal may be used after reducing the same to powders, and pressing the powders for molding.

A heating temperature at the time of brazing is in a range of 620 to 800° C., preferably ranging from 650 to 750° C., brazing time is preferably in the order of from about 5 minutes to about 1 hour, and an atmosphere in a furnace at the time of brazing is preferably a reducing atmosphere of hydrogen or the like or vacuum.

INDUSTRIAL APPLICABILITY

With the brazing filler metal according to the invention, joining of metallic articles by brazing can be implemented at a temperature not higher than the crystal coarsening temperature of the base metals, and sufficient joining strength as well as excellent corrosion resistance of the metallic articles joined together can be secured. Accordingly, the brazing filler metal according to the invention is suitable for use in brazing of metals such as stainless steel of which decorativeness in external appearance is required.

TABLE 1

|  | Au | Ag | Cu | additive element | | | a) | b) | c) | d) | e) | f) |
|---|---|---|---|---|---|---|---|---|---|---|---|---|
| Example 1-1 | 63 | 25 | 10 | Si 2 | | | 507 | 560 | ○ | no | 610 | ○ |
| Example 1-2 | 70 | 15 | 6 | Si 4 | In 5 | | 410 | 460 | ○ | no | 600 | ○ |
| Example 1-3 | 66 | 9 | 7 | Ge 8 | Al 3 | Sb 7 | 590 | 640 | ○ | no | 610 | ○ |
| Example 1-4 | 58 | 11 | 10 | Ge 8 | In 7 | Ga 6 | 533 | 580 | ○ | no | 600 | ○ |
| Example 1-5 | 55 | 14 | 5 | Bi 4 | Sn 15 | Te 7 | 572 | 620 | ○ | no | 620 | ○ |
| Example 1-6 | 51 | 9 | 5 | Pb 15 | Si 5 | Tl 15 | 557 | 610 | ○ | no | 600 | ○ |
| Example 1-7 | 35 | 25 | 20 | Si 5 | In 15 | | 547 | 600 | ○ | no | 600 | ○ |
| Example 1-8 | 55 | 15 | 10 | Si 5 | In 15 | | 525 | 580 | ○ | no | 610 | ○ |
| Example 1-9 | 79 | 6 | 2 | Si 4 | In 9 | | 662 | 710 | ○ | no | 620 | ○ |
| Example 1-10 | 64 | 6 | 10 | Ge 13 | Sb 7 | | 562 | 610 | ◎ | no | 620 | ○ |
| Example 1-11 | 47 | 20 | 13 | Ge 13 | Sb 7 | | 610 | 660 | ◎ | no | 600 | ○ |
| Example 1-12 | 37 | 41 | 5 | Ge 9 | Sb 8 | | 664 | 710 | ○ | no | 600 | ○ |

(unit: wt %)

a) melting point(° C.)
b) brazing temperature(° C.)
c) wettability against SUS316L
d) crystal coarsening of SUS316L
e) joining strength (MPa)
f) corrosion resistance
wettability ◎: very good
○: good
Δ: slightly good

TABLE 2

| | Au | Ag | Cu | additive element | | | a) | b) | c) | d) | e) | f) |
|---|---|---|---|---|---|---|---|---|---|---|---|---|
| Comp Ex 1-1 | 59 | 25 | 15 | Te 1 | | | 980 | 1030 | Δ | exist | 590 | ○ |
| Comp Ex 1-2 | 66 | 22 | 11 | Bi 1 | | | 975 | 1030 | Δ | exist | 610 | ○ |
| Comp Ex 1-3 | 51 | 7 | 6 | Pb 8 | Si 10 | Tl 18 | 851 | 900 | Δ | exist | 600 | ○ |
| Comp Ex 1-4 | 51 | 7 | 6 | Al 15 | In 15 | Te 6 | 832 | 880 | Δ | exist | 600 | ○ |
| Comp Ex 1-5 | 34 | 25 | 20 | Si 5 | In 16 | | 593 | 640 | Δ | no | 590 | ○ |
| Comp Ex 1-6 | 80 | 6 | 2 | Si 6 | In 6 | | 807 | 860 | Δ | exist | 590 | ○ |
| Comp Ex 1-7 | 65 | 5 | 10 | Ge 13 | Sb 7 | | 577 | 630 | Δ | no | 610 | ○ |
| Comp Ex 1-8 | 37 | 42 | 5 | Ge 8 | Sb 8 | | 701 | 750 | ○ | no | 600 | X |

(unit: wt %)

a) melting point(° C.)
b) brazing temperature(° C.)
c) wettability against SUS316L
d) crystal coarsening of SUS316L
e) joining strength (MPa)
f) corrosion resistance
wettability ⊚: very good
○: good
Δ: slightly good

TABLE 3

| | brazing filler metal(wt %) | a) | b) | c) | d) | e) | f) |
|---|---|---|---|---|---|---|---|
| Comp EX 1-9 | $Ni_{82.45}Cr_7B_3Si_{4.5}Fe_3C_{0.05}$ | 1050 | 1100 | ○ | exist | 580 | ○ |
| Comp Ex 1-10 | $Ag_{58}Cu_{32}Pd_{10}$ | 850 | 900 | Δ | exist | 530 | X | a) melting point(° C.)
b) brazing temperature(° C.)
c) wettability against SUS316L
d) crystal coarsening of SUS316L
e) joining strength (MPa)
f) corrosion resistance
wettability ⊚: very good
○: good
Δ: slightly good

TABLE 4

(unit: wt %)

| Sample | Au | Ag | Cu | Ge | a) | wettability against SUS316L |
|---|---|---|---|---|---|---|
| Example 2-1 | 85 | 4 | 6 | 5 | 714 | ○ |
| Example 2-2 | 82 | 4 | 4 | 10 | 612 | ○ |
| Example 2-3 | 66 | 4 | 7 | 23 | 777 | ○ |
| Example 2-4 | 35 | 30 | 25 | 10 | 780 | ⊚ |
| Example 2-5 | 60 | 15 | 15 | 10 | 741 | ⊚ |
| Example 2-6 | 80 | 5 | 5 | 10 | 720 | ⊚ |
| Example 2-7 | 70 | 6 | 5 | 19 | 550 | ⊚ |
| Example 2-8 | 66 | 11 | 11 | 12 | 410 | ⊚ |
| Example 2-9 | 60 | 16 | 5 | 19 | 490 | ⊚ |
| Example 2-10 | 40 | 40 | 10 | 10 | 700 | ⊚ |
| Comp Ex 2-1 | 86 | 4 | 6 | 4 | 815 | Δ |
| Comp Ex 2-2 | 69 | 4 | 3 | 24 | 810 | Δ |
| Comp Ex 2-3 | 34 | 31 | 25 | 10 | 832 | Δ |
| Comp Ex 2-4 | 81 | 8 | 4 | 7 | 749 | Δ |
| Comp Ex 2-5 | 60 | 5 | 14 | 21 | 780 | Δ |
| Comp Ex 2-6 | 39 | 41 | 10 | 10 | 710 | ○ |
| Comp Ex 2-7 | 30 | 35 | 25 | 10 | 782 | Δ | a) melting point(° C.)
⊚: very good
○: good
Δ: slightly good

TABLE 5

(unit: wt %)

| Sample | Au | Ag | Cu | Ge | a) | b) | d) | e) | f) |
|---|---|---|---|---|---|---|---|---|---|
| Example 2-8 | 66 | 11 | 11 | 12 | 410 | 460 | no | 980 | ○ |
| Example 2-9 | 60 | 16 | 5 | 19 | 490 | 540 | no | 880 | ○ |
| Comp Ex 2-6 | 39 | 41 | 10 | 10 | 710 | 760 | no | 840 | X |
| Comp Ex 2-7 | 30 | 35 | 25 | 10 | 782 | 830 | exist | 880 | ○ | a) melting point(° C.)
b) brazing temperature(° C.)
d) crystal coarsening of SUS316L
e) joining strength (MPa)
f) corrosion resistance

TABLE 6

(unit: wt %)

| Sample | Au | Ag | Cu | Si | a) | wettability against SUS316L |
|---|---|---|---|---|---|---|
| Example 3-1 | 76 | 11 | 12 | 1 | 782 | ○ |
| Example 3-2 | 78 | 9 | 10 | 3 | 692 | ○ |
| Example 3-3 | 80 | 5 | 5 | 10 | 713 | ○ |
| Example 3-4 | 70 | 6 | 6 | 18 | 777 | ○ |
| Example 3-5 | 41 | 29 | 20 | 10 | 742 | ⊚ |
| Example 3-6 | 65 | 10 | 10 | 15 | 713 | ⊚ |
| Example 3-7 | 79 | 5 | 5 | 11 | 741 | ⊚ |
| Example 3-8 | 65 | 5 | 22 | 8 | 721 | ⊚ |
| Example 3-9 | 72 | 12 | 12 | 4 | 663 | ⊚ |
| Example 3-10 | 67 | 17 | 12 | 4 | 702 | ⊚ |
| Example 3-11 | 45 | 36 | 9 | 10 | 766 | ⊚ |
| Comp Ex 3-1 | 76.1 | 11 | 12 | 0.9 | 822 | ○ |

TABLE 6-continued

| Sample | Au | Ag | Cu | Si | a) | (unit: wt %) wettability against SUS316L |
|---|---|---|---|---|---|---|
| Comp Ex 3-2 | 68 | 6 | 7 | 19 | 813 | Δ |
| Comp Ex 3-3 | 40 | 29 | 20 | 11 | 814 | Δ |
| Comp Ex 3-4 | 80 | 10 | 5 | 5 | 761 | Δ |
| Comp Ex 3-5 | 64 | 4 | 22 | 10 | 810 | Δ |
| Comp Ex 3-6 | 44 | 37 | 9 | 10 | 731 | ◯ | a) melting point(° C.)
◉: very good
◯: good
Δ: slightly good

TABLE 7

| Sample | Au | Ag | Cu | Si | a) | b) | d) | e) | f) |
|---|---|---|---|---|---|---|---|---|---|
| Example 3-9 | 72 | 12 | 12 | 4 | 663 | 710 | no | 890 | ◯ |
| Example 3-10 | 87 | 17 | 12 | 4 | 702 | 750 | no | 860 | ◯ |
| Comp Ex 3-5 | 64 | 4 | 22 | 10 | 810 | 860 | exist | 770 | ◯ |
| Comp Ex 3-6 | 44 | 37 | 9 | 10 | 731 | 780 | no | 810 | X |

(unit: wt %)

a) melting point(° C.)
b) brazing temperature(° C.)
d) crystal coarsening of SUS316L
e) joining strength (MPa)
f) corrosion resistance

TABLE 8

| Sample | Au | Ag | Cu | Ge | Si | Sn | a) | b) | c) | d) | e) | f) |
|---|---|---|---|---|---|---|---|---|---|---|---|---|
| Example 4-1 | 70 | 19 | 6 | 5 | — | — | 730 | 780 | ◯ | no | 610 | ◯ |
| Example 4-2 | 72 | 20 | 6 | — | 2 | — | 732 | 780 | ◯ | no | 620 | ◯ |
| Example 4-3 | 72 | 19 | 6 | — | — | 3 | 738 | 790 | ◯ | no | 650 | ◯ |
| Example 4-4 | 70 | 18 | 7 | 2 | 3 | — | 698 | 750 | ◯ | no | 610 | ◯ |
| Example 4-5 | 74 | 14 | 7 | 3 | — | 2 | 743 | 790 | ◯ | no | 640 | ◯ |
| Example 4-6 | 72 | 16 | 7 | — | 3 | 2 | 693 | 740 | ◯ | no | 610 | ◯ |
| Example 4-7 | 70 | 18 | 7 | 1 | 3 | 1 | 697 | 750 | ◯ | no | 610 | ◯ |
| Example 4-8 | 69 | 14 | 4 | 13 | — | — | 432 | 480 | ◯ | no | 630 | ◯ |
| Example 4-9 | 68 | 18 | 7 | — | 7 | — | 662 | 710 | ◯ | no | 600 | ◯ |
| Example 4-10 | 67 | 17 | 5 | — | — | 11 | 604 | 650 | ◯ | no | 620 | ◯ |
| Example 4-11 | 67 | 16 | 5 | 10 | 2 | — | 462 | 510 | ◯ | no | 610 | ◯ |
| Example 4-12 | 67 | 16 | 5 | 9 | — | 3 | 481 | 530 | ◯ | no | 600 | ◯ |
| Example 4-13 | 67 | 16 | 5 | — | 6 | 6 | 641 | 690 | ◯ | no | 600 | ◯ |
| Example 4-14 | 67 | 16 | 5 | 8 | 3 | 1 | 502 | 550 | ◯ | no | 620 | ◯ |
| Example 4-15 | 67 | 15 | 5 | 7 | 4 | 2 | 511 | 560 | ◯ | no | 620 | ◯ |
| Example 4-16 | 66 | 7 | 7 | 20 | — | — | 637 | 690 | ◯ | no | 640 | ◯ |
| Example 4-17 | 64 | 11 | 9 | — | 16 | — | 741 | 790 | ◯ | no | 630 | ◯ |
| Example 4-18 | 58 | 10 | 5 | — | — | 27 | 574 | 620 | ◯ | no | 630 | ◯ |
| Example 4-19 | 66 | 7 | 7 | 14 | 6 | — | 491 | 540 | ◯ | no | 620 | ◯ |
| Example 4-20 | 60 | 10 | 8 | 12 | — | 10 | 456 | 510 | ◯ | no | 610 | ◯ |
| Example 4-21 | 62 | 6 | 5 | — | 8 | 19 | 502 | 550 | ◯ | no | 600 | ◯ |
| Example 4-22 | 56 | 8 | 2 | 14 | 3 | 17 | 603 | 650 | ◯ | no | 600 | ◯ |
| Example 4-23 | 35 | 25 | 20 | 7 | 3 | 10 | 538 | 590 | ◯ | no | 620 | ◯ |
| Example 4-24 | 53 | 17 | 10 | 7 | 3 | 10 | 497 | 550 | ◯ | no | 640 | ◯ |
| Example 4-25 | 79 | 6 | 2 | 5 | 3 | 5 | 651 | 700 | ◯ | no | 640 | ◯ |
| Example 4-26 | 64 | 6 | 10 | 8 | 2 | 10 | 510 | 560 | ◉ | no | 640 | ◯ |
| Example 4-27 | 47 | 20 | 13 | 8 | 2 | 10 | 541 | 590 | ◉ | no | 660 | ◯ |
| Example 4-28 | 37 | 41 | 5 | 8 | 2 | 7 | 702 | 750 | ◯ | no | 630 | ◯ |

(unit: wt %)

a) melting point(° C.)
b) brazing temperature(° C.)
c) wettability against SUS316L
d) crystal coarsening of SUS316L
e) joining strength (MPa)
f) corrosion resistance
wettability ◉: very good
◯: good
Δ: slightly good

TABLE 9

| Sample | Au | Ag | Cu | Ge | Si | Sn | a) | b) | c) | d) | e) | f) |
|---|---|---|---|---|---|---|---|---|---|---|---|---|
| Comp Ex 4-1 | 79 | 15 | 5 | 1 | — | — | 821 | 870 | Δ | exist | 620 | ◯ |
| Comp Ex 4-2 | 79 | 15 | 5 | — | 1 | — | 803 | 850 | Δ | exist | 620 | ◯ |
| Comp Ex 4-3 | 79 | 15 | 5 | — | — | 1 | 861 | 910 | Δ | exist | 620 | ◯ |
| Comp Ex 4-4 | 53 | 7 | 5 | 35 | — | — | 815 | 870 | Δ | exist | 610 | ◯ |

TABLE 9-continued

| Sample | Au | Ag | Cu | Ge | Si | Sn | a) | b) | c) | d) | e) | f) |
|---|---|---|---|---|---|---|---|---|---|---|---|---|
| Comp Ex 4-5 | 53 | 7 | 5 | — | 35 | — | 862 | 910 | Δ | exist | 640 | ○ |
| Comp Ex 4-6 | 51 | 8 | 6 | — | — | 35 | 830 | 880 | Δ | exist | 600 | ○ |
| Comp Ex 4-7 | 55 | 6 | 4 | 2 | 6 | 27 | 867 | 920 | Δ | exist | 610 | ○ |
| Comp Ex 4-8 | 34 | 25 | 20 | 7 | 3 | 11 | 591 | 640 | Δ | no | 610 | ○ |
| Comp Ex 4-9 | 80 | 6 | 2 | 4 | 3 | 5 | 812 | 860 | Δ | exist | 600 | ○ |
| Comp Ex 4-10 | 69 | 5 | 7 | 7 | 3 | 9 | 542 | 590 | Δ | no | 610 | ○ |
| Comp Ex 4-11 | 40 | 42 | 3 | 5 | 3 | 7 | 733 | 780 | ○ | no | 640 | X |

(unit: wt %)

a) melting point(° C.)
b) brazing temperature(° C.)
c) wettability against SUS316L
d) crystal coarsening of SUS316L
wettability ⊚: very good
○: good
Δ: slightly good

TABLE 10

| | Au | Ag | Cu | additive element | | | Pd | a) | b) | c) | d) | e) | f) |
|---|---|---|---|---|---|---|---|---|---|---|---|---|---|
| Example 5-1 | 64 | 16 | 12 | Ga 2 | | | 6 | 698 | 750 | ○ | no | 610 | ○ |
| Example 5-2 | 68 | 10 | 6 | Bi 5 | Si 3 | | 8 | 507 | 560 | ○ | no | 600 | ○ |
| Example 5-3 | 59 | 10 | 10 | In 5 | Ga 5 | Te 4 | 7 | 713 | 760 | ○ | no | 610 | ○ |
| Example 5-4 | 60 | 8 | 6 | Al 7 | Ge 8 | Te 5 | 6 | 561 | 610 | ○ | no | 600 | ○ |
| Example 5-5 | 53 | 7 | 7 | Pb 10 | Sn 15 | 3 | 5 | 611 | 660 | ○ | no | 620 | ○ |
| Example 5-6 | 47 | 6 | 6 | Sb 15 | Ge 15 | Te 7 | 4 | 698 | 750 | ○ | no | 600 | ○ |
| Example 5-7 | 34 | 18 | 13 | Sn 18 | Bi 8 | | 9 | 593 | 640 | ○ | no | 610 | ○ |
| Example 5-8 | 55 | 12 | 9 | Al 9 | Ge 9 | | 6 | 577 | 630 | ○ | no | 620 | ○ |
| Example 5-9 | 81 | 6 | 4 | Ge 4 | Ga 2 | | 3 | 724 | 770 | ○ | no | 620 | ○ |
| Example 5-10 | 56 | 5 | 7 | Sn 16 | Sb 8 | | 8 | 572 | 620 | ⊚ | no | 580 | ○ |
| Example 5-11 | 51 | 20 | 6 | Ge 10 | Pb 7 | | 6 | 544 | 590 | ⊚ | no | 610 | ○ |
| Example 5-12 | 35 | 46 | 5 | In 5 | Sn 3 | | 6 | 674 | 720 | ○ | no | 600 | ○ |
| Example 5-13 | 35 | 14 | 6 | In 7 | Tl 5 | | 33 | 712 | 760 | ○ | no | 600 | ○ |

(unit: wt %)

a) melting point(° C.)
b) brazing temperature(° C.)
c) wettability against SUS316L
d) crystal coarsening of SUS316L
e) joining strength (MPa)
f) corrosion resistance
wettability ⊚: very good
○: good
Δ: slightly good

TABLE 11

| | Au | Ag | Cu | additive element | | | Pd | a) | b) | c) | d) | e) | f) |
|---|---|---|---|---|---|---|---|---|---|---|---|---|---|
| Comp Ex 5-1 | 65 | 16 | 12 | Al 1 | | | 6 | 981 | 1030 | Δ | exist | 590 | ○ |
| Comp Ex 5-2 | 65 | 16 | 12 | Bi 1 | | | 6 | 977 | 1030 | Δ | exist | 610 | ○ |
| Comp Ex 5-3 | 46 | 6 | 6 | Ga 15 | Si 15 | Te 8 | 4 | 834 | 880 | Δ | exist | 600 | ○ |
| Comp Ex 5-4 | 46 | 6 | 6 | Te 9 | Ga 20 | Pb 9 | 4 | 983 | 1030 | Δ | exist | 600 | ○ |
| Comp Ex 5-5 | 33 | 18 | 14 | Sn 18 | Bi 8 | | 9 | 614 | 660 | Δ | no | 610 | ○ |
| Comp Ex 5-6 | 82 | 5 | 4 | Ge 4 | Ga 2 | | 3 | 837 | 890 | Δ | exist | 600 | ○ |
| Comp Ex 5-7 | 57 | 4 | 7 | Sn 16 | Sb 8 | | 8 | 543 | 590 | Δ | no | 620 | ○ |

TABLE 11-continued

| | Au | Ag | Cu | additive element | | | Pd | a) | b) | c) | d) | e) | f) |
|---|---|---|---|---|---|---|---|---|---|---|---|---|---|
| Comp Ex 5-8 | 35 | 47 | 5 | In 5 | Sn 3 | | 5 | 741 | 790 | ○ | no | 590 | X |
| Comp Ex 5-9 | 35 | 13 | 6 | In 7 | Tl 5 | | 34 | 807 | 860 | Δ | exist | 610 | ○ |

(unit: wt %)

a) melting point (° C.)
b) brazing temperature (° C.)
c) wettability against SUS316L
d) crystal coarsening of SUS316L
e) joining strength (MPa)
f) corrosion resistance
wettability
◎: very good
○: good
Δ: slightly good

TABLE 12

| | Au | Ag | Cu | first additive element | | | Pd | second additive element | | a) | b) | c) | d) | e) | f) |
|---|---|---|---|---|---|---|---|---|---|---|---|---|---|---|---|
| Example 6-1 | 63 | 14 | 13 | Si 2 | | | 7 | Mn 1 | | 644 | 690 | ◎ | no | 600 | ○ |
| Example 6-2 | 67 | 8 | 6 | Te 5 | Si 3 | | 10 | Li 1 | | 510 | 560 | ◎ | no | 620 | ○ |
| Example 6-3 | 60 | 14 | 6 | Ge 5 | Sn 5 | Ga 4 | 4 | Mn 1 | Li 1 | 639 | 690 | ◎ | no | 610 | ○ |
| Example 6-4 | 58 | 8 | 7 | Al 7 | Sn 7 | Bi 6 | 5 | Mn 2 | | 522 | 570 | ◎ | no | 610 | ○ |
| Example 6-5 | 51 | 7 | 5 | Ge 10 | Sn 15 | Sb 3 | 7 | Li 2 | | 563 | 610 | ◎ | no | 600 | ○ |
| Example 6-6 | 45 | 6 | 4 | Sb 10 | Sn 20 | Pb 7 | 6 | Mn 2 | | 633 | 680 | ◎ | no | 610 | ○ |
| Example 6-7 | 34 | 19 | 12 | Sn 20 | Al 6 | | 7 | Mn 1 | Li 1 | 542 | 590 | ◎ | no | 600 | ○ |
| Example 6-8 | 51 | 11 | 10 | Bi 9 | Ge 9 | | 8 | Mn 1 | Li 1 | 534 | 580 | ◎ | no | 610 | ○ |
| Example 6-9 | 77 | 6 | 4 | Si 3 | In 3 | | 5 | Mn 1 | Li 1 | 644 | 690 | ◎ | no | 600 | ○ |
| Example 6-10 | 56 | 6 | 6 | Ge 12 | Pb 12 | | 6 | Mn 1 | Li 1 | 513 | 560 | ◎ | no | 610 | ○ |
| Example 6-11 | 47 | 21 | 8 | In 9 | Ga 8 | | 5 | Li 2 | | 483 | 530 | ◎ | no | 590 | ○ |
| Example 6-12 | 35 | 47 | 5 | In 5 | Sn 3 | | 3 | Mn 1 | Li 1 | 643 | 690 | ◎ | no | 610 | ○ |
| Example 6-13 | 37 | 6 | 4 | In 17 | Tl 3 | | 31 | Mn 1 | Li 1 | 644 | 690 | ◎ | no | 600 | ○ |

(unit: wt %)

a) melting point (° C.)
b) brazing temperature (° C.)
c) wettability against SUS316L
d) crystal coarsening of SUS316L
e) joining strength (MPa)
f) corrosion resistance
wettability
◎: very good
○: good
Δ: slightly good

TABLE 13

| | Au | Ag | Cu | first additive element | | | Pd | second additive element | | a) | b) | c) | d) | e) | f) |
|---|---|---|---|---|---|---|---|---|---|---|---|---|---|---|---|
| Comp Ex 6-1 | 61 | 14 | 14 | Pb 1 | | | 8 | Mn 1 | Li 1 | 920 | 970 | Δ | exist | 590 | ○ |
| Comp Ex 6-2 | 64 | 18 | 10 | Sb 1 | | | 5 | Mn 1 | Li 1 | 955 | 1010 | Δ | exist | 600 | ○ |
| Comp Ex 6-3 | 43 | 6 | 4 | In 8 | Ge 12 | Ga 18 | 7 | Mn 1 | Li 1 | 833 | 880 | Δ | exist | 610 | ○ |
| Comp Ex 6-4 | 41 | 6 | 6 | Ga 15 | Si 15 | Al 8 | 7 | Mn 1 | Li 1 | 943 | 990 | Δ | exist | 610 | ○ |

TABLE 13-continued

|  | Au | Ag | Cu | first additive element | | | Pd | second additive element | | a) | b) | c) | d) | e) | f) |
|---|---|---|---|---|---|---|---|---|---|---|---|---|---|---|---|
| Comp Ex 6-5 | 33 | 20 | 12 | Sn 20 | Al 6 | | 7 | Mn 1 | Li 1 | 563 | 610 | Δ | no | 620 | ○ |
| Comp Ex 6-6 | 78 | 6 | 4 | Si 3 | In 3 | | 4 | Mn 1 | Li 1 | 807 | 860 | Δ | exist | 620 | ○ |
| Comp Ex 6-7 | 57 | 5 | 6 | Ge 12 | Pb 12 | | 6 | Mn 1 | Li 1 | 490 | 540 | Δ | no | 610 | ○ |
| Comp Ex 6-8 | 34 | 48 | 5 | In 5 | Sn 3 | | 3 | Mn 1 | Li 1 | 641 | 690 | ⊚ | no | 610 | X |
| Comp Ex 6-9 | 36 | 6 | 4 | In 17 | Tl 3 | | 32 | Mn 1 | Li 1 | 806 | 860 | ○ | exist | 610 | ○ |
| Comp Ex 6-10 | 52 | 6 | 7 | Sn 16 | Sb 8 | | 8 | Mn 2 | Li 1 | 813 | 860 | ⊚ | exist | 600 | ○ |
| Comp Ex 6-11 | 52 | 6 | 7 | Sn 16 | Te 8 | | 8 | Mn 1 | Li 2 | 802 | 850 | ⊚ | exist | 600 | ○ |

(unit: wt %)

a) melting point (° C.)
b) brazing temperature (° C.)
c) wettability against SUS316L
d) crystal coarsening of SUS316L
e) joining strength (MPa)
f) corrosion resistance
wettability
⊚: very good
○: good
Δ: slightly good

TABLE 14

|  | Au | Ag | Cu | first additive element | | | Pd | second additive element | | Ni | a) | b) | c) | d) | e) | f) |
|---|---|---|---|---|---|---|---|---|---|---|---|---|---|---|---|---|
| Example 7-1 | 58 | 11 | 18 | Si 2 | | | 7 | Li 1 | | 3 | 728 | 780 | ⊚ | no | 690 | ○ |
| Example 7-2 | 58 | 11 | 9 | Ge 9 | In 2 | | 5 | Mn 1 | | 5 | 593 | 640 | ⊚ | no | 660 | ○ |
| Example 7-3 | 56 | 12 | 8 | Pb 8 | Sn 5 | In 2 | 3 | Mn 1 | Li 1 | 4 | 672 | 720 | ⊚ | no | 710 | ○ |
| Example 7-4 | 55 | 9 | 5 | Sn 8 | Sb 7 | Bi 4 | 6 | Mn 2 | | 4 | 601 | 650 | ⊚ | no | 700 | ○ |
| Example 7-5 | 52 | 9 | 4 | Ge 10 | Al 9 | Tl 7 | 4 | Mn 2 | | 3 | 666 | 720 | ⊚ | no | 660 | ○ |
| Example 7-6 | 47 | 7 | 5 | Bi 18 | In 10 | Si 6 | 3 | Li 2 | | 2 | 724 | 770 | ⊚ | no | 680 | ○ |
| Example 7-7 | 36 | 15 | 12 | Ge 18 | Bi 6 | | 5 | Mn 1 | Li 1 | 6 | 617 | 670 | ⊚ | no | 680 | ○ |
| Example 7-8 | 50 | 9 | 9 | In 8 | Si 7 | | 7 | Mn 1 | Li 1 | 8 | 603 | 650 | ⊚ | no | 670 | ○ |
| Example 7-9 | 73 | 7 | 4 | Al 5 | Te 4 | | 2 | Mn 1 | Li 1 | 3 | 724 | 770 | ⊚ | no | 700 | ○ |
| Example 7-10 | 56 | 7 | 6 | Sn 11 | Tl 6 | | 7 | Mn 1 | Li 1 | 5 | 607 | 660 | ⊚ | no | 680 | ○ |
| Example 7-11 | 41 | 25 | 8 | Ga 11 | Al 4 | | 5 | Mn 2 | | 4 | 550 | 600 | ⊚ | no | 670 | ○ |
| Example 7-12 | 37 | 46 | 3 | In 4 | Si 3 | | 2 | Mn 1 | Li 1 | 3 | 684 | 730 | ⊚ | no | 700 | ○ |
| Example 7-13 | 37 | 7 | 4 | Bi 13 | Sb 4 | | 30 | Mn 1 | Li 1 | 3 | 711 | 760 | ⊚ | no | 690 | ○ |
| Example 7-14 | 49 | 8 | 5 | Ge 9 | Te 6 | | 6 | Li 2 | | 15 | 732 | 780 | ⊚ | no | 690 | ○ |

(unit: wt %)

a) melting point (° C.)
b) brazing temperature (° C.)
c) wettability against SUS316L
d) crystal coarsening of SUS316L
e) joining strength (MPa)
f) corrosion resistance
wettability
⊚: very good
○: good
Δ: slightly good

TABLE 15

| | Au | Ag | Cu | first additive element | | | | Pd | second additive element | | | Ni | a) | b) | c) | d) | e) | f) |
|---|---|---|---|---|---|---|---|---|---|---|---|---|---|---|---|---|---|---|
| Comp Ex 7-1 | 63 | 13 | 10 | Tl 1 | | | | 7 | Mn 1 | Li 1 | | 4 | 987 | 1040 | Δ | exist | 640 | ○ |
| Comp Ex 7-2 | 63 | 18 | 5 | Pb 1 | | | | 4 | Mn 1 | Li 1 | | 7 | 1011 | 1060 | Δ | exist | 660 | ○ |
| Comp Ex 7-3 | 44 | 7 | 4 | Si 17 | In 10 | Al 8 | | 5 | Mn 1 | Li 1 | | 3 | 882 | 930 | Δ | exist | 650 | ○ |
| Comp Ex 7-4 | 47 | 7 | 4 | Bi 14 | Ga 12 | Ge 9 | | 2 | Mn 1 | Li 1 | | 3 | 1001 | 1050 | Δ | exist | 690 | ○ |
| Comp Ex 7-5 | 35 | 16 | 12 | Ge 18 | Bi 6 | | | 5 | Mn 1 | Li 1 | | 6 | 603 | 650 | Δ | no | 660 | ○ |
| Comp Ex 7-6 | 74 | 7 | 4 | Al 5 | Te 4 | | | 2 | Mn 1 | Li 1 | | 2 | 928 | 980 | Δ | exist | 680 | ○ |
| Comp Ex 7-7 | 57 | 6 | 6 | Sn 11 | Tl 6 | | | 7 | Mn 1 | Li 1 | | 5 | 582 | 630 | Δ | no | 680 | ○ |
| Comp Ex 7-8 | 36 | 47 | 3 | In 4 | Si 3 | | | 2 | Mn 1 | Li 1 | | 3 | 733 | 780 | ◎ | no | 670 | X |
| Comp Ex 7-9 | 36 | 7 | 4 | Bi 13 | Sb 4 | | | 31 | Mn 1 | Li 1 | | 3 | 852 | 900 | ○ | exist | 690 | ○ |
| Comp Ex 7-10 | 49 | 7 | 7 | Sn 16 | Sb 8 | | | 7 | Mn 2 | Li 1 | | 3 | 847 | 900 | ◎ | exist | 700 | ○ |
| Comp Ex 7-11 | 49 | 7 | 7 | Ge 16 | Al 8 | | | 7 | Mn 1 | Li 2 | | 3 | 838 | 890 | ◎ | exist | 670 | ○ |
| Comp Ex 7-12 | 49 | 8 | 5 | Ge 9 | Te 6 | | | 5 | Mn 1 | Li 1 | | 16 | 814 | 860 | Δ | exist | 670 | ○ |

(unit: wt %)

a) melting point (° C.)
b) brazing temperature (° C.)
c) wettability against SUS316L
d) crystal coarsening of SUS316L
e) joining strength (MPa)
f) corrosion resistance
wettability
◎: very good
○: good
Δ: slightly good

TABLE 16

(unit: wt %)

| Sample | Au | Ag | Cu | Pd | Ge | a) | wettability against SUS316L |
|---|---|---|---|---|---|---|---|
| Example 8-1 | 50 | 11 | 5 | 29 | 5 | 732 | ○ |
| Example 8-2 | 47 | 10 | 5 | 23 | 15 | 726 | ○ |
| Example 8-3 | 44 | 11 | 8 | 12 | 25 | 740 | ○ |
| Example 8-4 | 31 | 16 | 11 | 17 | 25 | 726 | ◎ |
| Example 8-5 | 75 | 5 | 6 | 6 | 8 | 703 | ◎ |
| Example 8-6 | 75 | 5 | 6 | 6 | 8 | 720 | ◎ |
| Example 8-7 | 56 | 22 | 5 | 5 | 12 | 642 | ◎ |
| Example 8-8 | 33 | 50 | 4 | 7 | 6 | 707 | ◎ |
| Example 8-9 | 29 | 8 | 9 | 35 | 19 | 733 | ◎ |
| Comp Ex 8-1 | 51 | 11 | 5 | 29 | 4 | 812 | Δ |
| Comp Ex 8-2 | 43 | 11 | 8 | 12 | 26 | 805 | Δ |
| Comp Ex 8-3 | 28 | 45 | 10 | 12 | 5 | 836 | Δ |
| Comp Ex 8-4 | 76 | 5 | 6 | 6 | 7 | 810 | Δ |
| Comp Ex 8-5 | 76 | 4 | 6 | 6 | 8 | 760 | Δ |
| Comp Ex 8-6 | 32 | 51 | 5 | 7 | 5 | 723 | ○ |
| Comp Ex 8-7 | 31 | 10 | 10 | 36 | 13 | 822 | ○ | a) melting point (° C.)
◎: very good
○: good
Δ: slightly good

TABLE 17

(unit: wt %)

| Sample | Au | Ag | Cu | Pd | Ge | a) | b) | d) | e) | f) |
|---|---|---|---|---|---|---|---|---|---|---|
| Example 8-7 | 56 | 22 | 5 | 5 | 12 | 642 | 690 | no | 870 | ○ |
| Example 8-8 | 33 | 50 | 4 | 7 | 8 | 707 | 760 | no | 860 | ○ |
| Example 8-9 | 29 | 8 | 9 | 35 | 19 | 733 | 780 | no | 880 | ○ |
| Comp Ex 8-5 | 76 | 4 | 6 | 6 | 8 | 760 | 810 | exist | 790 | ○ |
| Comp Ex 8-6 | 32 | 51 | 5 | 7 | 5 | 723 | 770 | no | 730 | x | a) melting point (° C.)
b) brazing temperature (° C.)
d) crystal coarsening of SUS316L
e) joining strength (MPa)
f) corrosion resistance

TABLE 18

(unit: wt %)

| Sample | Au | Ag | Cu | Pd | Si | a) | wettability against SUS316L |
|---|---|---|---|---|---|---|---|
| Example 9-1 | 70 | 12 | 6 | 11 | 1 | 746 | ○ |
| Example 9-2 | 71 | 13 | 2 | 4 | 10 | 723 | ○ |
| Example 9-3 | 66 | 7 | 7 | 4 | 16 | 744 | ○ |
| Example 9-4 | 31 | 25 | 15 | 20 | 9 | 731 | ◎ |
| Example 9-5 | 71 | 11 | 5 | 5 | 8 | 722 | ◎ |
| Example 9-6 | 70 | 3 | 8 | 9 | 10 | 716 | ◎ |
| Example 9-7 | 57 | 19 | 10 | 10 | 4 | 686 | ◎ |
| Example 9-8 | 53 | 32 | 3 | 6 | 6 | 724 | ◎ |
| Example 9-9 | 40 | 10 | 6 | 37 | 7 | 737 | ◎ |

TABLE 18-continued (unit: wt %)

| Sample | Au | Ag | Cu | Pd | Si | a) | wettability against SUS316L |
|---|---|---|---|---|---|---|---|
| Comp Ex 9-1 | 64.1 | 15 | 9 | 11 | 0.9 | 810 | Δ |
| Comp Ex 9-2 | 65 | 7 | 7 | 4 | 17 | 823 | Δ |
| Comp Ex 9-3 | 30 | 20 | 20 | 20 | 10 | 803 | Δ |
| Comp Ex 9-4 | 72 | 11 | 5 | 5 | 7 | 813 | Δ |
| Comp Ex 9-5 | 71 | 2 | 8 | 9 | 10 | 803 | Δ |
| Comp Ex 9-6 | 44 | 34 | 3 | 10 | 9 | 737 | ○ |
| Comp Ex 9-7 | 39 | 10 | 6 | 38 | 7 | 811 | ○ | a) melting point (° C.)
◎: very good
○: good
Δ: slightly good

TABLE 19

(unit: wt %)

| Sample | Au | Ag | Cu | Pd | Si | a) | b) | d) | e) | f) |
|---|---|---|---|---|---|---|---|---|---|---|
| Example 9-7 | 57 | 19 | 10 | 10 | 4 | 686 | 740 | no | 820 | ○ |
| Example 9-8 | 45 | 40 | 3 | 6 | 6 | 724 | 780 | no | 880 | ○ |
| Example 9-9 | 40 | 10 | 6 | 37 | 7 | 737 | 790 | no | 880 | ○ |
| Comp Ex 9-5 | 71 | 2 | 8 | 9 | 10 | 803 | 850 | exist | 760 | ○ |
| Comp Ex 9-6 | 44 | 34 | 3 | 10 | 9 | 737 | 790 | no | 800 | X | a) melting point (° C.)
b) brazing temperature (° C.)
d) crystal coarsening of SUS316L
e) joining strength (MPa)
f) corrosion resistance

TABLE 20

| Sample | Au | Ag | Cu | Ge | Si | Sn | Pd | a) | b) | c) | d) | e) | f) |
|---|---|---|---|---|---|---|---|---|---|---|---|---|---|
| Example 10-1 | 70 | 13 | 6 | 5 | — | — | 6 | 741 | 790 | ○ | no | 630 | ○ |
| Example 10-2 | 66 | 20 | 4 | — | 3 | — | 7 | 740 | 790 | ○ | no | 670 | ○ |
| Example 10-3 | 73 | 15 | 6 | — | — | 2 | 4 | 743 | 790 | ○ | no | 680 | ○ |
| Example 10-4 | 63 | 9 | 5 | 2 | 3 | — | 18 | 731 | 780 | ○ | no | 640 | ○ |
| Example 10-5 | 65 | 20 | 4 | 3 | — | 2 | 6 | 742 | 790 | ○ | no | 640 | ○ |
| Example 10-6 | 69 | 10 | 5 | — | 3 | 2 | 11 | 741 | 790 | ○ | no | 600 | ○ |
| Example 10-7 | 61 | 11 | 6 | 11 | — | — | 11 | 512 | 560 | ○ | no | 610 | ○ |
| Example 10-8 | 63 | 15 | 5 | — | 8 | — | 9 | 551 | 600 | ○ | no | 590 | ○ |
| Example 10-9 | 61 | 10 | 8 | — | — | 14 | 7 | 547 | 600 | ○ | no | 600 | ○ |
| Example 10-10 | 65 | 7 | 5 | 10 | 3 | — | 10 | 508 | 560 | ○ | no | 600 | ○ |
| Example 10-11 | 63 | 5 | 7 | 9 | — | 4 | 12 | 526 | 580 | ○ | no | 640 | ○ |
| Example 10-12 | 61 | 5 | 3 | — | 2 | 14 | 15 | 540 | 590 | ○ | no | 610 | ○ |
| Example 10-13 | 58 | 6 | 7 | 11 | 3 | 5 | 10 | 531 | 580 | ○ | no | 660 | ○ |
| Example 10-14 | 58 | 7 | 7 | 20 | — | — | 8 | 642 | 690 | ○ | no | 640 | ○ |
| Example 10-15 | 68 | 6 | 8 | — | 15 | — | 5 | 742 | 790 | ○ | no | 630 | ○ |
| Example 10-16 | 56 | 6 | 5 | — | — | 26 | 7 | 611 | 660 | ○ | no | 630 | ○ |
| Example 10-17 | 59 | 8 | 6 | 15 | 4 | — | 8 | 532 | 580 | ○ | no | 620 | ○ |
| Example 10-18 | 58 | 7 | 8 | 12 | — | 10 | 5 | 530 | 580 | ○ | no | 620 | ○ |
| Example 10-19 | 55 | 5 | 4 | — | 5 | 20 | 11 | 551 | 600 | ○ | no | 600 | ○ |
| Example 10-20 | 50 | 5 | 5 | 13 | 4 | 20 | 3 | 502 | 550 | ○ | no | 610 | ○ |
| Example 10-21 | 33 | 16 | 17 | 8 | 4 | 9 | 13 | 591 | 640 | ○ | no | 610 | ○ |
| Example 10-22 | 55 | 6 | 7 | 6 | 3 | 11 | 12 | 532 | 580 | ○ | no | 620 | ○ |
| Example 10-23 | 82 | 5 | 2 | 4 | 3 | 3 | 1 | 691 | 740 | ○ | no | 620 | ○ |
| Example 10-24 | 56 | 5 | 9 | 7 | 4 | 9 | 10 | 583 | 630 | ◎ | no | 610 | ○ |
| Example 10-25 | 53 | 18 | 6 | 7 | 3 | 7 | 6 | 612 | 660 | ◎ | no | 610 | ○ |
| Example 10-26 | 34 | 48 | 2 | 5 | 3 | 4 | 4 | 735 | 790 | ○ | no | 610 | ○ |
| Example 10-27 | 45 | 5 | 3 | 7 | 3 | 3 | 34 | 743 | 790 | ○ | no | 640 | ○ |

(unit: wt %)

a) melting point (° C.)
b) brazing temperature (° C.)
c) wettability against SUS316L
d) crystal coarsening of SUS316L
e) joining strength (MPa)
f) corrosion resistance
wettability
◎: very good
○: good
Δ: slightly good

TABLE 21

| Sample | Au | Ag | Cu | Ge | Si | Sn | Pd | a) | b) | c) | d) | e) | f) |
|---|---|---|---|---|---|---|---|---|---|---|---|---|---|
| CompEx10-1 | 78 | 8 | 7 | 1 | — | — | 6 | 851 | 900 | Δ | exist | 600 | ○ |
| CompEx10-2 | 78 | 8 | 7 | — | 1 | — | 6 | 820 | 870 | Δ | exist | 600 | ○ |
| CompEx10-3 | 78 | 8 | 7 | — | — | 1 | 6 | 873 | 920 | Δ | exist | 640 | ○ |
| CompEx10-4 | 51 | 5 | 4 | 38 | — | — | 2 | 831 | 880 | Δ | exist | 630 | ○ |
| CompEx10-5 | 52 | 5 | 4 | — | 38 | — | 1 | 882 | 930 | Δ | exist | 630 | ○ |
| CompEx10-6 | 50 | 5 | 5 | — | — | 39 | 1 | 823 | 870 | Δ | exist | 630 | ○ |
| CompEx10-7 | 46 | 8 | 4 | 3 | 8 | 27 | 4 | 903 | 950 | Δ | exist | 620 | ○ |
| CompEx10-8 | 32 | 14 | 17 | 10 | 4 | 10 | 13 | 612 | 660 | Δ | no | 600 | ○ |
| CompEx10-9 | 83 | 5 | 2 | 3 | 2 | 3 | 2 | 807 | 860 | Δ | exist | 630 | ○ |
| CompEx10-10 | 57 | 4 | 9 | 7 | 4 | 9 | 10 | 590 | 640 | Δ | no | 620 | ○ |
| CompEx10-11 | 34 | 49 | 2 | 5 | 3 | 4 | 3 | 731 | 780 | ○ | no | 630 | X |
| CompEx10-12 | 43 | 6 | 3 | 6 | 3 | 4 | 35 | 807 | 860 | Δ | exist | 600 | ○ |

(unit: wt %)

a) melting point (° C.)
b) brazing temperature (°C.)
c) wettability against SUS316L
d) crystal coarsening of SUS316L
e) joining strength (MPa)
f) corrosion resistance
wettability
⊚: very good
○: good
Δ: slightly good

TABLE 22

| Sample | Au | Ag | Cu | Ge | Si | Sn | Pd | Ni | a) | b) | c) | d) | e) | f) |
|---|---|---|---|---|---|---|---|---|---|---|---|---|---|---|
| Example11-1 | 66 | 14 | 6 | 5 | — | — | 5 | 4 | 748 | 800 | ○ | no | 710 | ○ |
| Example11-2 | 64 | 18 | 5 | — | 2 | — | 6 | 5 | 743 | 790 | ○ | no | 710 | ○ |
| Example11-3 | 69 | 15 | 6 | — | — | 3 | 4 | 3 | 743 | 790 | ○ | no | 690 | ○ |
| Example11-4 | 65 | 5 | 10 | 2 | 3 | — | 10 | 5 | 741 | 790 | ○ | no | 700 | ○ |
| Example11-5 | 64 | 9 | 9 | 3 | — | 2 | 7 | 6 | 744 | 790 | ○ | no | 700 | ○ |
| Example11-6 | 66 | 7 | 8 | — | 3 | 2 | 8 | 6 | 739 | 790 | ○ | no | 710 | ○ |
| Example11-7 | 60 | 8 | 8 | 11 | — | — | 8 | 5 | 552 | 600 | ○ | no | 690 | ○ |
| Example11-8 | 66 | 6 | 7 | — | 8 | — | 7 | 6 | 583 | 630 | ○ | no | 710 | ○ |
| Example11-9 | 60 | 5 | 7 | — | — | 14 | 6 | 8 | 595 | 650 | ○ | no | 680 | ○ |
| Example11-10 | 59 | 5 | 5 | 10 | 3 | — | 8 | 10 | 548 | 600 | ○ | no | 700 | ○ |
| Example11-11 | 60 | 6 | 7 | 9 | — | 4 | 10 | 4 | 577 | 630 | ○ | no | 710 | ○ |
| Example11-12 | 60 | 5 | 5 | — | 2 | 14 | 7 | 7 | 583 | 630 | ○ | no | 740 | ○ |
| Example11-13 | 60 | 7 | 7 | 8 | 3 | 6 | 4 | 5 | 588 | 640 | ○ | no | 700 | ○ |
| Example11-14 | 54 | 8 | 7 | 20 | — | — | 5 | 6 | 700 | 750 | ○ | no | 710 | ○ |
| Example11-15 | 58 | 8 | 6 | — | 15 | — | 6 | 7 | 753 | 800 | ○ | no | 720 | ○ |
| Example11-16 | 49 | 10 | 5 | — | — | 25 | 7 | 4 | 632 | 680 | ○ | no | 710 | ○ |
| Example11-17 | 53 | 6 | 5 | 15 | 5 | — | 8 | 8 | 588 | 640 | ○ | no | 700 | ○ |
| Example11-18 | 52 | 8 | 7 | 12 | — | 10 | 7 | 4 | 591 | 640 | ○ | no | 710 | ○ |
| Example11-19 | 48 | 7 | 8 | — | 5 | 18 | 8 | 6 | 603 | 650 | ○ | no | 700 | ○ |
| Example11-20 | 46 | 5 | 6 | 13 | 4 | 19 | 4 | 3 | 543 | 590 | ○ | no | 700 | ○ |
| Example11-21 | 35 | 16 | 6 | 8 | 4 | 9 | 11 | 11 | 712 | 760 | ○ | no | 710 | ○ |
| Example11-22 | 61 | 8 | 6 | 7 | 3 | 7 | 4 | 4 | 599 | 650 | ○ | no | 760 | ○ |
| Example11-23 | 73 | 5 | 4 | 4 | 3 | 5 | 3 | 3 | 744 | 790 | ○ | no | 760 | ○ |
| Example11-24 | 54 | 5 | 6 | 7 | 3 | 9 | 6 | 10 | 613 | 660 | ⊚ | no | 720 | ○ |
| Example11-25 | 52 | 19 | 5 | 8 | 3 | 5 | 4 | 4 | 655 | 710 | ⊚ | no | 780 | ○ |
| Example11-26 | 36 | 46 | 3 | 4 | 4 | 2 | 2 | 3 | 741 | 790 | ○ | no | 710 | ○ |
| Example11-27 | 35 | 5 | 6 | 10 | 3 | 10 | 26 | 5 | 744 | 790 | ○ | no | 740 | ○ |
| Example11-28 | 37 | 5 | 5 | 4 | 3 | 3 | 26 | 17 | 747 | 800 | ○ | no | 710 | ○ |

(unit: wt %)

a) melting point (° C.)
b) brazing temperature (° C.)
c) wettability against SUS316L
d) crystal coarsening of SUS316L
e) joining strength (MPa)
f) corrosion resistance
wettability
⊚: very good
○: good
Δ: slightly good

TABLE 23

| Sample | Au | Ag | Cu | Ge | Si | Sn | Pd | Ni | a) | b) | c) | d) | e) | f) |
|---|---|---|---|---|---|---|---|---|---|---|---|---|---|---|
| CompEx11-1 | 72 | 7 | 6 | 1 | — | — | 7 | 7 | 903 | 950 | Δ | exist | 730 | ○ |
| CompEx11-2 | 72 | 7 | 6 | — | 1 | — | 6 | 8 | 861 | 910 | Δ | exist | 730 | ○ |
| CompEx11-3 | 72 | 7 | 6 | — | — | 1 | 7 | 7 | 910 | 960 | Δ | exist | 730 | ○ |
| CompEx11-4 | 46 | 5 | 4 | 37 | — | — | 5 | 3 | 876 | 930 | Δ | exist | 720 | ○ |
| CompEx11-5 | 43 | 5 | 4 | — | 37 | — | 4 | 7 | 914 | 960 | Δ | exist | 740 | ○ |
| CompEx11-6 | 43 | 5 | 4 | — | — | 37 | 5 | 6 | 863 | 910 | Δ | exist | 740 | ○ |
| CompEx11-7 | 41 | 5 | 4 | 5 | 6 | 26 | 3 | 10 | 933 | 980 | Δ | exist | 710 | ○ |
| CompEx11-8 | 34 | 16 | 6 | 8 | 5 | 9 | 11 | 11 | 732 | 780 | Δ | no | 730 | ○ |
| CompEx11-9 | 74 | 6 | 2 | 3 | 4 | 3 | 2 | 6 | 806 | 860 | Δ | exist | 720 | ○ |
| CompEx11-10 | 55 | 4 | 5 | 8 | 3 | 9 | 6 | 10 | 621 | 670 | Δ | no | 730 | ○ |
| CompEx11-11 | 36 | 47 | 3 | 4 | 3 | 2 | 2 | 3 | 743 | 790 | ○ | no | 730 | X |
| CompEx11-12 | 38 | 7 | 6 | 5 | 4 | 5 | 27 | 8 | 811 | 860 | Δ | no | 700 | ○ |
| CompEx11-13 | 40 | 5 | 5 | 4 | 3 | 1 | 24 | 18 | 802 | 850 | Δ | no | 700 | ○ |

(unit: wt %)

a) melting point (° C.)
b) brazing temperature (° C.)
c) wettability against SUS316L
d) crystal coarsening of SUS316L
e) joining strength (MPa)
f) corrosion resistance
wettability
◎: very good
○: good
Δ: slightly good

What is claimed is:

1. A brazing filler metal having a composition consisting of gold, silver, copper, and silicon, as main constituents thereof, wherein
a composition ratio of the silicon is in a range of more than 0.9 wt. % to less than 19 wt. %, a composition ratio of the gold is more than 40 wt. %, and a composition ratio of the silver is in a range of more than 4 wt. % to less than 37 wt. %.

2. A brazing filler metal according to claim 1, wherein the composition ratio of the silicon is in a range of about 1 to about 18 wt. %.

3. A brazing filler metal according to claim 2, wherein the composition ratio of the gold is in a range of about 41 to about 79 wt. %, and the composition ratio of the silver is in a range of about 5 to about 36 wt. %.

4. A brazing filler metal according to claim 1, wherein the composition ratio of the gold is in a range of about 41 to about 79 wt. %, and the composition ratio of the silver is in a range of about 5 to about 36 wt. %.

5. A brazing filler metal having a composition comprising gold, silver, copper, and silicon, as main constituents thereof, wherein
a composition ratio of the silicon is in a range of more than 0.9 wt % to less than 19 wt %, a composition ratio of the gold is more than 40 wt %, and a composition ratio of the silver is in a range of more than 4 wt % to less than 37 wt %; and
wherein the melting point of the composition is no higher than 800° C.

6. A brazing filler metal according to claim 5, wherein the composition ratio of the silicon is in a range of about 1 to about 18 wt %.

7. A brazing filler metal according to claim 5, wherein the composition ratio of the gold is in a range of about 41 to about 79 wt. %, and the composition ratio of the silver is in a range of about 5 to about 36 wt. %.

8. A brazing filler metal according to claim 5, wherein the composition ratio of the gold is in a range of about 41 to about 79 wt. %, and the composition ratio of the silver is in a range of about 5 to about 36 wt %.

* * * * *